United States Patent
Kim et al.

(10) Patent No.: US 12,160,180 B2
(45) Date of Patent: Dec. 3, 2024

(54) POWER CONVERTING APPARATUS AND PHOTOVOLTAIC MODULE INCLUDING THE SAME

(71) Applicant: LG Electronics Inc., Seoul (KR)

(72) Inventors: Daejoong Kim, Seoul (KR); Daihyun Kim, Seoul (KR); Seungwook Hyun, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 17/625,620

(22) PCT Filed: Jul. 7, 2020

(86) PCT No.: PCT/KR2020/008859
§ 371 (c)(1),
(2) Date: Jan. 7, 2022

(87) PCT Pub. No.: WO2021/006601
PCT Pub. Date: Jan. 14, 2021

(65) Prior Publication Data
US 2022/0263428 A1 Aug. 18, 2022

(30) Foreign Application Priority Data
Jul. 9, 2019 (KR) .................. 10-2019-0082479

(51) Int. Cl.
*H02M 7/5395* (2006.01)
*H02M 1/12* (2006.01)
(Continued)

(52) U.S. Cl.
CPC ........... *H02M 7/4826* (2013.01); *H02M 1/12* (2013.01); *H02M 3/33573* (2021.05);
(Continued)

(58) Field of Classification Search
CPC ........ H02M 1/007; H02M 1/12; H02M 1/123; H02M 1/26; H02M 3/335; H02M 3/33569;
(Continued)

(56) References Cited

U.S. PATENT DOCUMENTS

| 9,621,064 B2* | 4/2017 | Yuzurihara | ......... H02M 3/1582 |
| 10,291,023 B2* | 5/2019 | Chae | ..................... H02M 1/08 |

(Continued)

FOREIGN PATENT DOCUMENTS

| KR | 10-2005-0024734 | 3/2005 |
| KR | 10-2013-0088447 | 8/2013 |
| KR | 10-2019-0033976 | 4/2019 |

OTHER PUBLICATIONS

Han et al., "Improvement of Current Distortion of PWM Converter under Unbalanced Grid Voltage," The Korean Institute of Power Electronics, Jul. 2, 2013, pp. 504-505 (with English abstract).
(Continued)

*Primary Examiner* — Gary L Laxton
(74) *Attorney, Agent, or Firm* — Fish & Richardson P.C.

(57) ABSTRACT

A power converting apparatus includes: an inverter configured to convert input DC power into AC power by a switching operation; an output voltage detector configured to detect an output voltage of the inverter; and a controller configured to control the inverter. The controller is configured to perform proportional resonant control based on the output voltage, and output a switching control signal to the inverter based on the proportional resonant control. Accordingly, it is possible to remove harmonics generated due to connection of a nonlinear load.

17 Claims, 36 Drawing Sheets

(51) Int. Cl.
  *H02M 3/335*      (2006.01)
  *H02M 7/48*       (2007.01)
  *H02M 7/5387*     (2007.01)

(52) U.S. Cl.
  CPC ... *H02M 3/33576* (2013.01); *H02M 7/53871* (2013.01); *H02J 2300/26* (2020.01)

(58) Field of Classification Search
  CPC ......... H02M 3/33573; H02M 3/33576; H02M 7/53; H02M 7/5387; H02M 7/53871; H02M 7/539; H02M 7/5395
  See application file for complete search history.

(56) References Cited

U.S. PATENT DOCUMENTS

| | | | |
|---|---|---|---|
| 2016/0049880 A1* | 2/2016 | Kim | H02M 1/12 363/35 |
| 2017/0025943 A1* | 1/2017 | Eren | H02M 7/539 |
| 2018/0006575 A1* | 1/2018 | Chapman | H02M 1/15 |

OTHER PUBLICATIONS

International Search Report in International Appln. No. PCT/KR2020/008859, mailed on Oct. 29, 2020, 6 pages (with English translation).
Lim et al., "Output voltage regulation considering the harmonic compensation in islanded mode of microgrid," The Korean Institute of Electrical Engineers, Apr. 2014, pp. 256-259 (with English abstract).

* cited by examiner

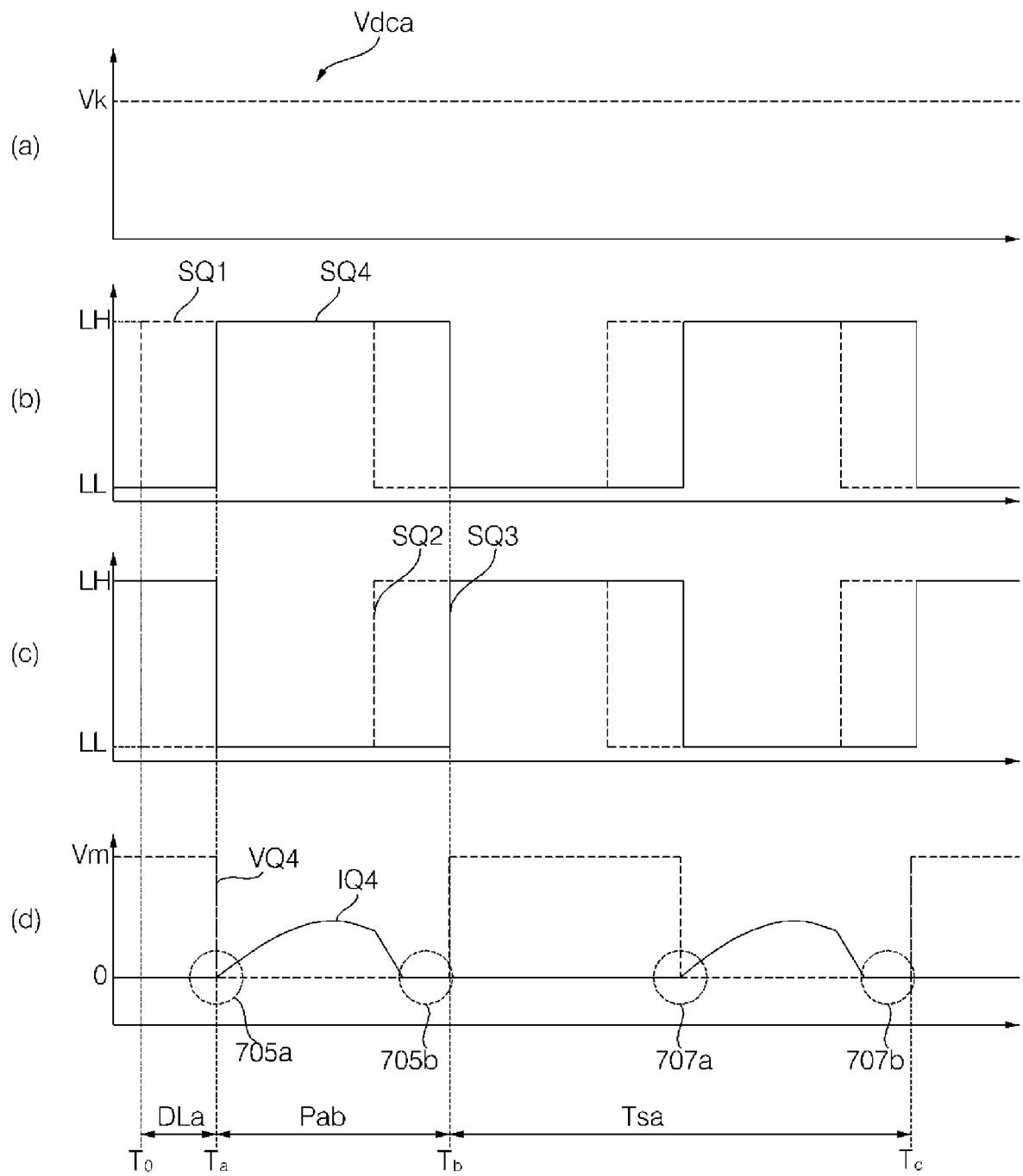

POWER CONVERTING APPARATUS AND PHOTOVOLTAIC MODULE INCLUDING THE SAME

CROSS-REFERENCE TO RELATED APPLICATIONS

This application is a National Stage application under 35 U.S.C. 371 of No. International Application PCT/KR2020/008859, filed on Jul. 7, 2020, which claims the benefit of Korean Patent Application No. 10-2019-0082479, filed on Jul. 9, 2019. The disclosures of the prior applications are incorporated by reference in their entirety.

BACKGROUND OF THE INVENTION

1. Field of the Invention

The present disclosure relates to a power converting apparatus and a photovoltaic module including the same, and more particularly to a power converting apparatus capable of removing harmonics generated due to connection of a nonlinear load, and a photovoltaic module including the power converting apparatus.

2. Description of the Related Art

A power converting apparatus is used for converting a level of input power or converting input DC power into AC power.

Recently, active research is underway to develop the power converting apparatus to save energy.

The power converting apparatus may be used in various electronic devices, particularly, energy supply devices and the like for supplying new renewable energy.

Examples of the energy supply devices may include a wind power generator, a tidal power generator, a photovoltaic module, and the like.

Meanwhile, when AC power is output by the power converting apparatus, distortion occurs in the output voltage of the power converting apparatus according to a load that receives the AC power.

Particularly, if the AC power is output while the power converting apparatus performs an autonomous operation, distortion occurs in the output voltage of the power converting apparatus according to a load that receives the AC power.

SUMMARY

It is an object of the present disclosure to provide a power converting apparatus capable of removing harmonics generated due to connection of a nonlinear load, and a photovoltaic module including the power converting apparatus.

It is another object of the present disclosure to provide a power converting apparatus capable of removing generated harmonics while performing an autonomous operation, and a photovoltaic module including the power converting apparatus.

It is yet another object of the present disclosure to provide a power converting apparatus capable of improving the quality of output AC power, and a photovoltaic module including the power converting apparatus.

In accordance with an aspect of the present disclosure, the above and other objects can be accomplished by providing a power converting apparatus and a photovoltaic module including the same, the power converting apparatus including: an inverter configured to convert input DC power into AC power by a switching operation; an output voltage detector configured to detect an output voltage of the inverter; and a controller configured to control the inverter, wherein the controller is configured to perform proportional resonant control based on the output voltage, and output a switching control signal to the inverter based on the proportional resonant control.

Meanwhile, by performing the proportional resonant control based on the output voltage, the controller may calculate a harmonic compensation value, and may output the switching control signal to the inverter based on the calculated harmonic compensation value.

Meanwhile, the controller may extract harmonics from the output voltage, may calculate the harmonic compensation value based on the extracted harmonics, and may output the switching control signal to the inverter based on the calculated harmonic compensation value.

Meanwhile, the controller may extract the harmonics from the output voltage, may perform the proportional resonant control by using respective proportional resonant controllers for each order of the harmonics, and may outputs the switching control signal to the inverter based on the calculated harmonic compensation value.

Meanwhile, the controller may include a band pass filter located on a front end of the respective proportional resonant controllers and configured to pass frequency bands of each order of harmonics.

Meanwhile, in response to an order of the harmonics being lower than or equal to a reference order, the controller may control a gain of a corresponding proportional resonant controller to be infinite.

Meanwhile, in response to an order of the harmonics being lower than or equal to the reference order, the controller may calculate the harmonic compensation value so that a harmonic component in a corresponding proportional resonant controller may be zero, and may output the switching control signal to the inverter based on the calculated harmonic compensation value.

Meanwhile, in response to harmonic components of each harmonic order being generated in the output voltage during a first period, the controller may perform the proportional resonant control and may output the switching control signal Sic based on the proportional resonant control, and may prevent each order harmonic component from being generated in the output voltage during a second period after the first period.

Meanwhile, in response to the harmonic components of each harmonic order not being generated in the output voltage during the first period, the controller may not perform the proportional resonant control.

Meanwhile, the controller may include a repetitive controller configured to extract harmonics from the output voltage and to perform repetitive control on the harmonics, wherein the controller may output the switching control signal to the inverter based on the harmonic compensation value from the repetitive controller.

Meanwhile, the repetitive controller may correspond to summation of a plurality of resonant controllers.

Meanwhile, in response to a nonlinear load being connected to an output terminal of the inverter, the controller may perform the proportional resonant control based on the output voltage, and may output the switching control signal to the inverter based on the proportional resonant control; and in response to a linear load being connected to the output terminal of the inverter, the controller may not perform the proportional resonant control.

Meanwhile, in response to the output voltage output from the inverter increasing to a level outside a first range, the controller may restart the inverter after turning off the inverter.

Meanwhile, when restarting the inverter, the controller may control the inverter to operate based on a second gain higher than a first gain before the inverter is turned off.

Meanwhile, the converter may include: a full bridge switching device configured to convert the input DC power, and including a first leg including a first switching element and a second switching element connected in series to each other, and a second leg including a third switching element and a fourth switching element connected in series to each other; a transformer having an input side connected to an output terminal of the full bridge switching device; and a half bridge switching device electrically connected to an output side of the transformer, and including third leg including a fifth switching element and a sixth switching element connected in series to each other.

Meanwhile, the converter may further include a resonant inductor connected between the transformer and the half bridge switching device.

Meanwhile, the converter may further include a first capacitor and a second capacitor connected in series to each other and connected to a DC terminal corresponding to an output terminal of the half bridge switching device.

Meanwhile, the inverter may include a fourth leg including seventh and eighth switching elements connected in series to each other and connected to the DC terminal corresponding to the output terminal of the half bridge switching device, and a fifth leg including ninth and tenth switching elements connected in series to each other, and may convert a voltage at the DC terminal to output an AC voltage.

In accordance with another aspect of the present disclosure, the above and other objects can be accomplished by providing a power converting apparatus and a photovoltaic module including the same, the power converting apparatus including: an inverter configured to convert input DC power into AC power by a switching operation; an output voltage detector configured to detect an output voltage of the inverter; and a controller configured to control the inverter, wherein in response to harmonic components of each harmonic order being generated in the output voltage during a first period, the controller is configured to perform proportional resonant control and output a switching control signal based on the proportional resonant control, and prevent each order harmonic component from being generated in the output voltage during a second period after the first period.

Meanwhile, in response to a nonlinear load being connected to an output terminal of the inverter during the first period, the controller may perform the proportional resonant control based on the output voltage, and may output the switching control signal to the inverter based on the proportional resonant control.

Effects

A power converting apparatus and a photovoltaic module including the same according to an embodiment of the present disclosure include: an inverter configured to convert input DC power into AC power by a switching operation; an output voltage detector configured to detect an output voltage of the inverter; and a controller configured to control the inverter, wherein the controller is configured to perform proportional resonant control based on the output voltage, and output a switching control signal to the inverter based on the proportional resonant control. Accordingly, it is possible to remove harmonics generated due to connection of a nonlinear load. Particularly, it is possible to remove the generated harmonics while performing an autonomous operation, thereby improving the quality of the output AC power.

Meanwhile, by performing the proportional resonant control based on the output voltage, the controller may calculate a harmonic compensation value, and may output the switching control signal to the inverter based on the calculated harmonic compensation value. Accordingly, it is possible to remove harmonics generated due to connection of the nonlinear load. Particularly, it is possible to remove the generated harmonics while performing an autonomous operation.

Meanwhile, the controller may extract harmonics from the output voltage, may calculate the harmonic compensation value based on the extracted harmonics, and may output the switching control signal to the inverter based on the calculated harmonic compensation value. Accordingly, it is possible to remove harmonics generated due to connection of the nonlinear load. Particularly, it is possible to remove the generated harmonics while performing an autonomous operation.

Meanwhile, the controller may extract the harmonics from the output voltage, may perform the proportional resonant control by using respective proportional resonant controllers for each order of the harmonics, and may outputs the switching control signal to the inverter based on the calculated harmonic compensation value. Accordingly, it is possible to remove harmonics generated due to connection of the nonlinear load. Particularly, it is possible to remove the generated harmonics while performing an autonomous operation.

Meanwhile, the controller may include a band pass filter located on a front end of the respective proportional resonant controllers and configured to pass frequency bands of each order of harmonics, thereby stably performing the proportional resonant control for each order of the harmonics.

Meanwhile, in response to an order of the harmonics being lower than or equal to a reference order, the controller may control a gain of a corresponding proportional resonant controller to be infinite, thereby removing harmonics of the order lower than or equal to a reference order.

Meanwhile, in response to an order of the harmonics being lower than or equal to the reference order, the controller may calculate the harmonic compensation value so that a harmonic component in a corresponding proportional resonant controller may be zero, and may output the switching control signal to the inverter based on the calculated harmonic compensation value, thereby removing harmonics of the order lower than or equal to a reference order.

Meanwhile, in response to harmonic components of each harmonic order being generated in the output voltage during a first period, the controller may perform the proportional resonant control and may output the switching control signal Sic based on the proportional resonant control, and may prevent each order harmonic component from being generated in the output voltage during a second period after the first period. Accordingly, it is possible to remove harmonics generated due to connection of the nonlinear load. Particularly, it is possible to remove the generated harmonics while performing an autonomous operation.

Meanwhile, in response to the harmonic components of each harmonic order not being generated in the output voltage during the first period, the controller may not perform the proportional resonant control. Accordingly, the controller may selectively perform the proportional resonant control, thereby improving the control performance.

Meanwhile, the controller may include a repetitive controller configured to extract harmonics from the output voltage and to perform repetitive control on the harmonics, wherein the controller may output the switching control signal to the inverter based on the harmonic compensation value from the repetitive controller, thereby simplifying the configuration of the controller.

Meanwhile, the repetitive controller may correspond to summation of a plurality of resonant controllers, thereby simplifying the configuration of the controller.

Meanwhile, in response to a nonlinear load being connected to an output terminal of the inverter, the controller may perform the proportional resonant control based on the output voltage, and may output the switching control signal to the inverter based on the proportional resonant control; and in response to a linear load being connected to the output terminal of the inverter, the controller may not perform the proportional resonant control. Accordingly, the controller may selectively perform the proportional resonant control, thereby improving the control performance.

Meanwhile, in response to the output voltage output from the inverter increasing to a level outside a first range, the controller may restart the inverter after turning off the inverter. Accordingly, it is possible to reduce overvoltage occurring due to a change in load connected to the output terminal of the inverter. Further, circuit elements may be protected when there is no filter at the output terminal of the inverter.

Meanwhile, when restarting the inverter, the controller may control the inverter to operate based on a second gain higher than a first gain before the inverter is turned off. Accordingly, it is possible to stably operate the inverter when restarting the inverter due to a sudden load change.

Meanwhile, the converter may include: a full bridge switching device configured to convert the input DC power, and including a first leg including a first switching element and a second switching element connected in series to each other, and a second leg including a third switching element and a fourth switching element connected in series to each other; a transformer having an input side connected to an output terminal of the full bridge switching device; and a half bridge switching device electrically connected to an output side of the transformer, and including third leg including a fifth switching element and a sixth switching element connected in series to each other. Accordingly, it is possible to stably perform power conversion.

Meanwhile, the converter may further include a resonant inductor connected between the transformer and the half bridge switching device. Accordingly, an inductor current flows by a voltage difference between both ends of the resonant inductor, and the converted power may be controlled by controlling a phase difference between both ends of the inductor.

Meanwhile, the converter may further include a first capacitor and a second capacitor connected in series to each other and connected to a DC terminal corresponding to an output terminal of the half bridge switching device. Accordingly, it is possible to output a half-wave voltage or a pulsating voltage to the DC terminal.

Meanwhile, the inverter may include a fourth leg including seventh and eighth switching elements connected in series to each other and connected to the DC terminal corresponding to the output terminal of the half bridge switching device, and a fifth leg including ninth and tenth switching elements connected in series to each other, and may convert a voltage at the DC terminal to output an AC voltage. Accordingly, by an unfolding switching operation, an AC voltage having a frequency corresponding to a system voltage may be output.

A power converting apparatus and a photovoltaic module including the same according to another embodiment of the present disclosure include: an inverter configured to convert input DC power into AC power by a switching operation; an output voltage detector configured to detect an output voltage of the inverter; and a controller configured to control the inverter, wherein in response to harmonic components of each harmonic order being generated in the output voltage during a first period, the controller is configured perform proportional resonant control and output a switching control signal based on the proportional resonant control, and prevent each order harmonic component from being generated in the output voltage during a second period after the first period. Accordingly, it is possible to remove harmonics generated due to connection of a nonlinear load. Particularly, it is possible to remove the generated harmonics while performing an autonomous operation, thereby improving the quality of the output AC power.

Meanwhile, in response to a nonlinear load being connected to an output terminal of the inverter during the first period, the controller may perform the proportional resonant control based on the output voltage, and may output the switching control signal to the inverter based on the proportional resonant control. Accordingly, it is possible to remove harmonics generated due to connection of the nonlinear load.

BRIEF DESCRIPTION OF THE DRAWINGS

The embodiments will be described in detail with reference to the following drawings in which like reference numerals refer to like elements wherein:

FIG. 23 is a diagram referred to in the description of operation in a buck mode.

DETAILED DESCRIPTION OF THE PREFERRED EMBODIMENTS

The present disclosure proposes a method of reducing the ripple on an input current which is input to a converter of a photovoltaic module.

Hereinafter, the present disclosure will be described in detail with reference to the accompanying drawings.

In the following description, the suffixes "module" and "unit" of elements herein are used for convenience of description and need not have any distinguishable meanings or functions. Accordingly, the suffixes "module" and "unit" can be used interchangeably.

Figure 1A:
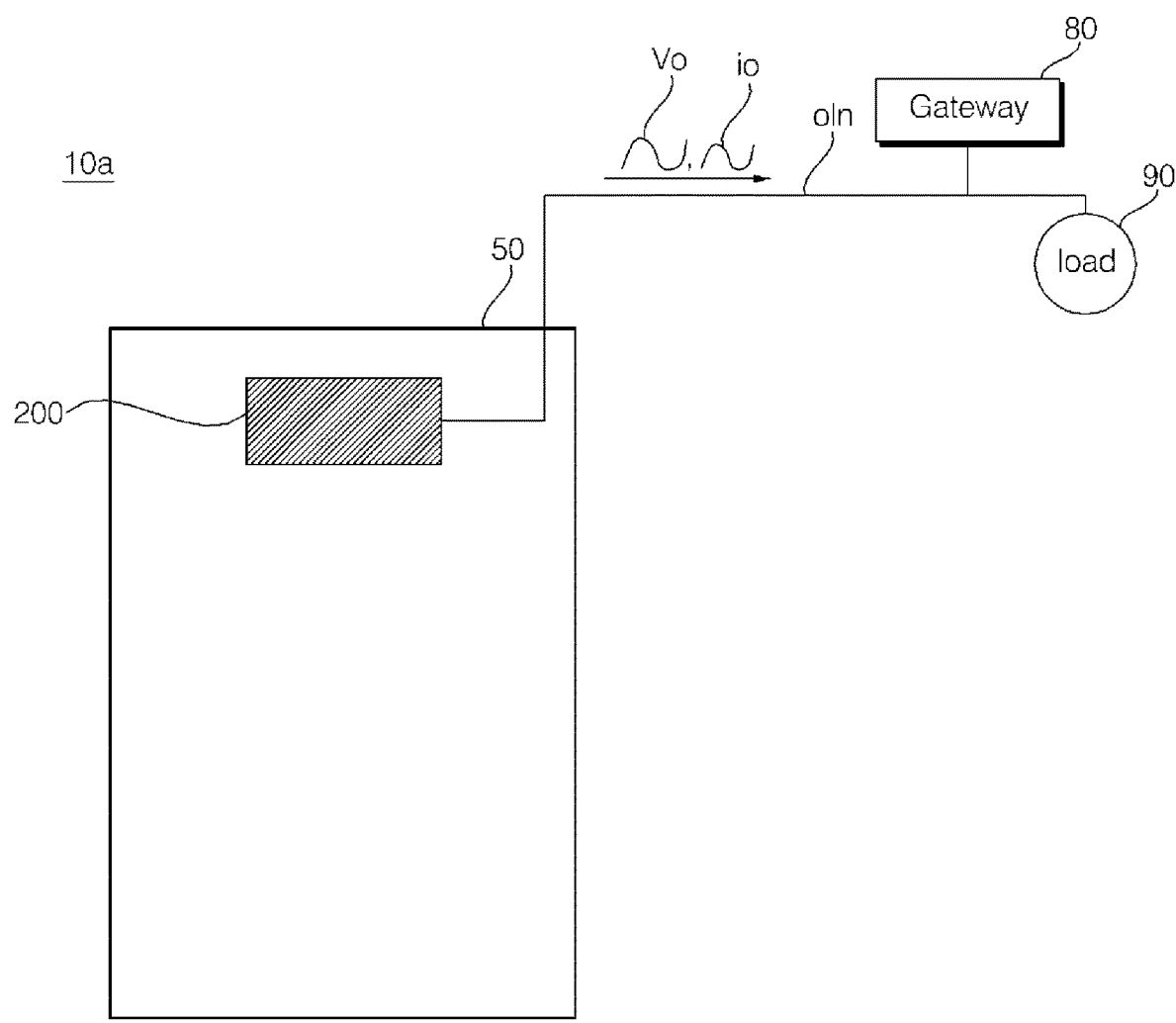
FIG. 1A is a diagram illustrating a photovoltaic system including a photovoltaic module according to an embodiment of the present disclosure.

FIG. 1A is a diagram illustrating an example of a photovoltaic system including a photovoltaic module according to an embodiment of the present disclosure.

Referring to the drawing, a photovoltaic system 10a according to an embodiment of the present disclosure may include a photovoltaic module 50 and a gateway 80.

The photovoltaic module 50 may include a solar cell module 100, and a junction box 200 including a power converting apparatus 500 (see FIG. 2) for converting DC power from the solar cell module and outputting the converted power, in which the solar cell module 110 and the junction box 200 are integrally formed with each other.

While FIG. 1 illustrates an example in which the junction box 200 is attached to a rear surface of the solar cell module 100, but aspects of the present disclosure are not limited thereto. The junction box 200 may be separated from and provided separately from the solar cell module 100.

Meanwhile, a cable oln for supplying AC power output from the junction box 200 to a load 90 may be electrically connected to an output terminal of the junction box 200.

Meanwhile, the gateway 80 may be disposed between the junction box 200 and the load 90.

Meanwhile, the gateway 80 may detect an AC current io and an AC voltage vo that flow through the cable oln and are output from the photovoltaic module 50.

Meanwhile, based on a phase difference between the AC current io and the AC voltage vo which are output from the photovoltaic module 50, the gateway 80 may output a power factor control signal for controlling a power factor.

To this end, the gateway 80 and the photovoltaic module 50 may perform power line communication (PLC) using a cable 323.

Meanwhile, the power converting apparatus 500 (see FIG. 2) in the photovoltaic module 50 may convert DC power output from the solar cell module 100 into AC power, and output the AC power.

To this end, a converter 530 (see FIG. 2) and an inverter 540 (see FIG. 2) may be provided in the power converting apparatus 500 (see FIG. 2) of the photovoltaic module 50.

Meanwhile, the power converting apparatus 500 (see FIG. 2) may be referred to as a micro-inverter. Accordingly, the micro-inverter may include the converter 530 (see FIG. 2) and the inverter 540 (see FIG. 2).

Meanwhile, the inverter 540 (see FIG. 2) may include a first leg including a first switching element and a second switching element connected in series to each other; and a second leg including a third switching element and a fourth switching element connected in series to each other.

Meanwhile, in the present disclosure, the photovoltaic module 50 is not connected to a system but is connected to the load 90, such that the present disclosure provides a method of preventing distortion in the output AC power, which occurs due to the load 90 during an autonomous operation.

To this end, the power converting apparatus 500 (see FIG. 2) in the photovoltaic module 50 may include the inverter 540 for converting input DC power into AC power by a switching operation; an output voltage detector F for detecting an output voltage of the inverter 540; and a controller 550 for controlling the inverter 540.

Further, the controller 550 according to an embodiment of the present disclosure performs proportional resonant control based on the output voltage, and outputs a switching control signal Sic to the inverter 540 based on the proportional resonant control. Accordingly, it is possible to remove harmonics generated due to connection of a nonlinear load. Particularly, it is possible to remove the generated harmonics while performing an autonomous operation, thereby improving the quality of the output AC power.

Alternatively, when harmonic components of each harmonic order are generated in the output voltage during a first period, the controller 550 according to another embodiment of the present disclosure may perform proportional resonant control and may output the switching control signal Sic based on the proportional resonant control; and the controller 550 prevents each order harmonic component from be generated in the output voltage during a second period after the first period. Accordingly, it is possible to remove harmonics generated due to connection of a nonlinear load. Particularly, it is possible to remove the generated harmonics while performing an autonomous operation, thereby improving the quality of the output AC power.

Figure 1B:
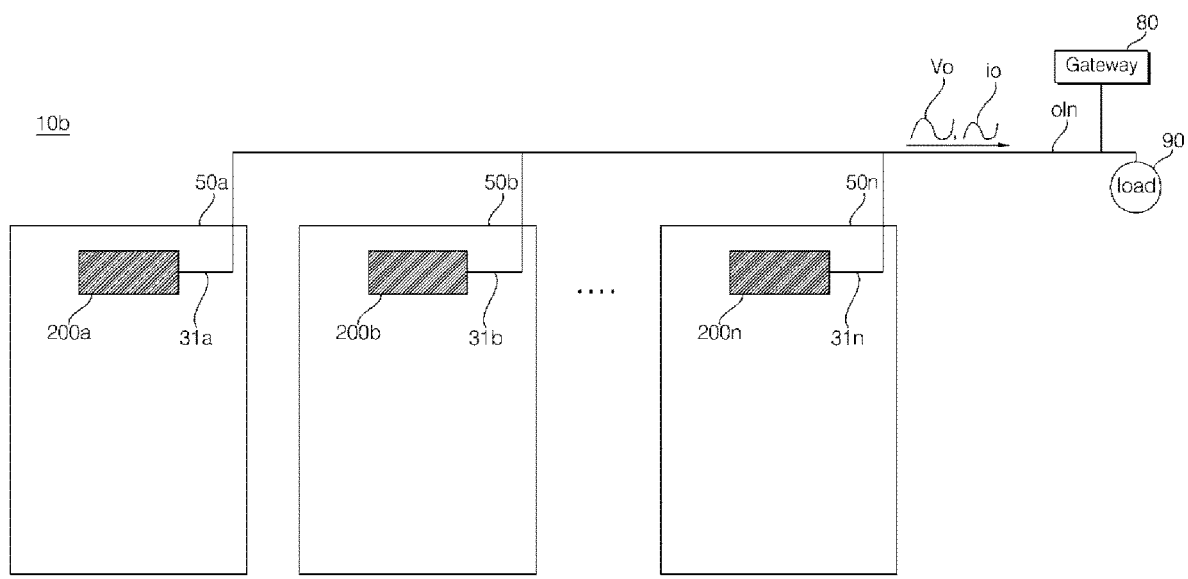
FIG. 1B is a diagram illustrating a photovoltaic system including a photovoltaic module according to another embodiment of the present disclosure.

Then, FIG. 1B is a diagram illustrating another example of a photovoltaic system including a photovoltaic module according to an embodiment of the present disclosure.

Referring to the drawing, a photovoltaic system 10b according to an embodiment of the present disclosure may include a plurality of photovoltaic modules 50a, 50b, . . . , and 50n, and a gateway 80.

The photovoltaic system 10b of FIG. 1B is different from the photovoltaic system 10a of FIG. 1A in that the plurality of photovoltaic modules 50a, 50b, . . . , and 50n are connected in parallel to each other.

The plurality of photovoltaic modules 50a, 50b, . . . , 50n may respectively include solar cell modules 100a, 100b, 100n, and junction boxes 200a, 200b, . . . , 200n for converting DC power from the respective solar cell modules and outputting converted power.

FIG. 1B shows the case where the junction boxes 200a, 200b, 200n are attached to rear surfaces of the respective solar cell modules 100a, 100b, 100n, but aspects of the present disclosure are not limited thereto. The junction boxes 200a, 200b, 200n may be separated from and provided separately from the respective solar cell modules 100a, 100b, . . . , 100n.

Meanwhile, cables 31a, 31b, . . . , and 01n for supplying AC power from the respective junction boxes 200a, 200b, . . . , and 200n to the load 90 may be electrically connected to output terminals of the respective junction boxes 200a, 200b, . . . 200n.

Meanwhile, the controller 550 of each power converting apparatus 500 in the plurality of photovoltaic modules 50a, 50b, . . . , and 50n of FIG. 1B performs proportional resonant control based on the output voltage and outputs the switching control signal Sic to the inverter 540 based on the proportional resonant control, as described above with reference to FIG. 1A. Accordingly, it is possible to remove harmonics generated due to connection of a nonlinear load. Particularly, it is possible to remove the generated harmonics while performing an autonomous operation, thereby improving the quality of the output AC power.

Alternatively, when harmonic components of each harmonic order are generated in the output voltage during a first period, the controller 550 of each power converting apparatus 500 in the plurality of photovoltaic modules 50a, 50b, . . . , and 50n of FIG. 1B performs proportional resonant control and outputs the switching control signal Sic based on the proportional resonant control, and the controller 550 prevents each order harmonic component from being generated in the output voltage during a second period after the first period. Accordingly, it is possible to remove harmonics generated due to connection of a nonlinear load. Particularly, it is possible to remove the generated harmonics while performing an autonomous operation, thereby improving the quality of the output AC power.

Figure 2:
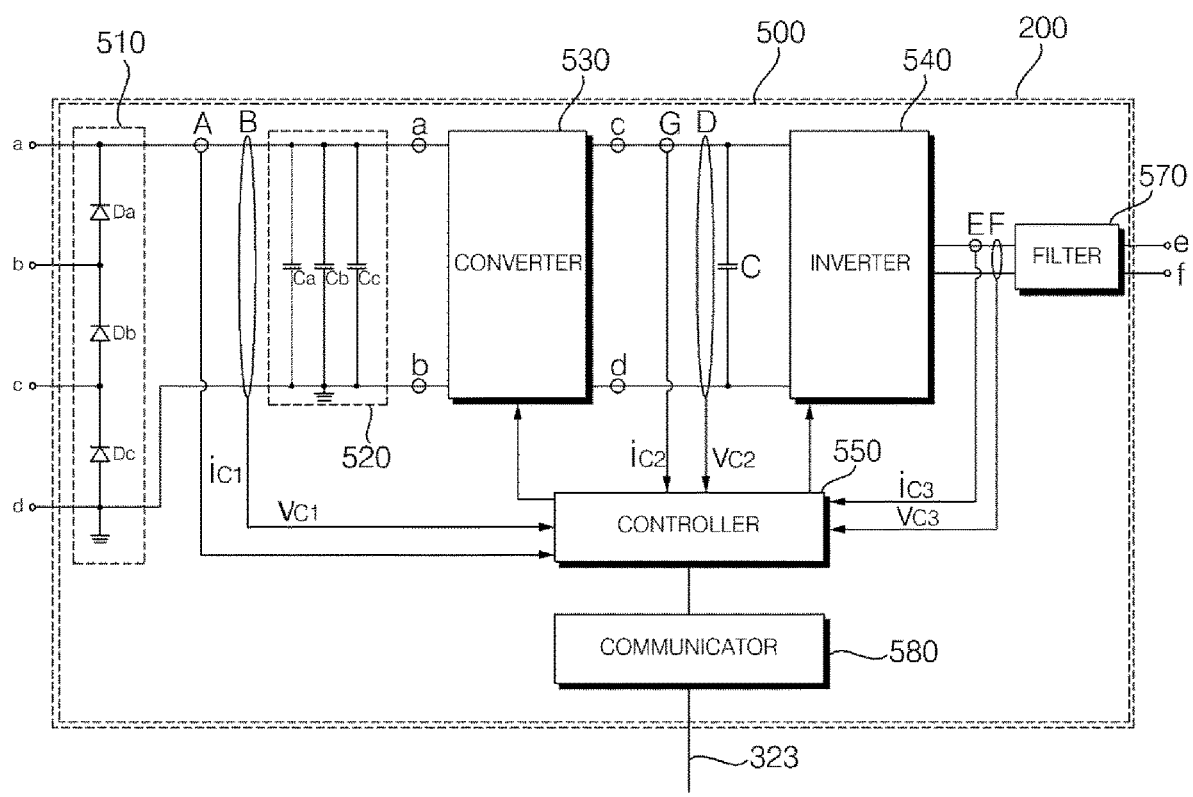
FIG. 2 is a diagram illustrating an internal circuit of a junction box in the photovoltaic module of FIG. 1A or 1B.

FIG. 2 is an internal circuit diagram of the junction box in the photovoltaic module of FIG. 1A or 1B.

Referring to the drawing, the junction box 200 may convert DC power output from the solar cell module 100 into AC power, and output the AC power.

Particularly, the junction box 200 according to the present disclosure may include a power converting apparatus 500 for outputting AC power.

To this end, the power converting apparatus 500 may include the converter 530, the inverter 540, and the controller 500 for controlling the same.

In addition, the power converting apparatus 500 may further include a bypass diode assembly 510 for bypass, a capacitor assembly 520 for storing DC power, and a filter 570 for filtering output AC power.

Meanwhile, the power converting apparatus 500 may further include a communicator 580 for communication with an external gateway 80.

Meanwhile, the power converting apparatus 500 may further include an input current detector A, an input voltage detector B, a converter output current detector C, a converter output voltage detector D, an inverter output current detector E and an inverter output voltage detector F.

Meanwhile, the controller 550 may control the converter 530, the inverter 540, and the communicator 580.

The bypass diode assembly 510 can include the bypass diodes Dc, Db and Da arranged between the first to fourth conductive lines (not shown) of the solar cell module 100. Here, the number of bypass diodes is one or more, for example, less than the number of conductive lines by one.

The bypass diodes Dc, Db and Da receive photovoltaic DC power from the solar cell module 100, particularly, from the first to fourth conductive lines (not shown) in the solar cell module 100. When a reverse voltage is generated in DC power from at least one of the first to fourth conductive lines (not shown), the bypass diodes Dc, Db and Da can bypass the DC power.

DC power which has passed through the bypass diode assembly 510 can be input to the capacitor assembly 520.

The capacitor assembly 520 can store the DC power input through the solar cell module 100 and the bypass diode assembly 510.

Although the figure shows that the capacitor assembly 520 includes a plurality of capacitors Ca, Cb and Cc connected in parallel, a plurality of capacitors can be connected in series and parallel or connected in series to a ground terminal. Alternatively, the capacitor assembly 520 can include only one capacitor.

The converter 530 can convert the level of an input voltage from the solar cell module 100, which has passed through the bypass diode assembly 510 and the capacitor assembly 520.

Particularly, the converter 530 can perform power conversion using DC power stored in the capacitor assembly 520.

Switching elements in the converter 530 can be turned on/off based on a converter switching control signal from the controller 550. Accordingly, level-converted DC power can be output.

The inverter 540 can convert the DC power converted by the converter 530 into AC power.

The figure shows a full-bridge inverter. That is, upper arm switching elements SW1 and SW3 connected in series and lower arm switching elements SW2 and SW4 connected in series are paired, and the two pairs of upper and lower arm switching elements SW1, SW2, SW3, and SW4 are connected in parallel. Diodes D1 to D4 can be connected in anti-parallel with the respective switching elements SW1 to SW4.

The switching elements SW1 to SW4 in the inverter 540 can be turned on/off based on an inverter switching control signal from the controller 550. Accordingly, AC power having a predetermined frequency can be output. Desirably, AC power having the same frequency (about 60 Hz or 50 Hz) as the AC frequency of the grid is output.

The capacitor C can be disposed between the converter 530 and the inverter 540.

The capacitor C can store the DC power having the level converted by the converter 530. Both terminals of the capacitor C can be called DC terminals and thus the capacitor C can be called a DC-terminal capacitor.

The input current detector A can detect input current ic1 supplied from the solar cell module 100 to the capacitor assembly 520.

The input voltage detector B can detect an input voltage Vc1 supplied from the solar cell module 100 to the capacitor assembly 520. Here, the input voltage Vc1 can be the same as the voltage stored in the capacitor assembly 520.

The detected input current ic1 and input voltage vc1 can be input to the controller 550.

The converter output current detector C detects output current ic2 from the converter 530, that is, DC-terminal current, and the converter output voltage detector D detects an output voltage vc2 from the converter 530, that is, a DC-terminal voltage. The detected output current ic2 and output voltage vc2 can be input to the controller 550.

The inverter output current detector E detects current ic3 output from the inverter 540 and an inverter output voltage detector F detects a voltage vc3 output from the inverter 540. The detected current ic3 and voltage vc3 are input to the controller 550.

In the present disclosure, the voltage vc3 output from the inverter 540 may be referred to as an output AC voltage vo, and the current ic3 output from the inverter 540 may be referred to as an AC current io.

The controller 550 can output control signals for controlling the switching elements of the converter 530. Particularly, the controller 550 can output a turn-on timing signal of the switching elements included in the converter 530 based on at least one of the detected input current ic1, input voltage vc1, output current ic2, output voltage vc2, output current ic3 and output voltage vc3.

Further, the controller 550 may output inverter control signals or inverter switching control signals Sic for controlling the respective switching elements SW1 to SW4 of the inverter 540. Particularly, the controller 550 may output turn-on timing signals of the respective switching elements SW1 to SW4 of the inverter 540 based on at least one of the detected input current ic1, input voltage vc1, output current ic2, output voltage vc2, output current ic3, or output voltage vc3.

Further, the controller 550 can calculate a maximum power point with respect to the solar cell module 100 and control the converter 530 to output DC power corresponding to maximum power according thereto.

Meanwhile, the communicator 580 may perform communication with the gateway 80.

For example, the communicator 580 may exchange data with the gateway 80 through power line communication.

Meanwhile, the communicator 580 may transmit current information, voltage information, power information, and the like regarding the photovoltaic module 50 through the gateway 80.

A filter 570 may be disposed at the output terminals of the inverter 540.

In addition, the filter 570 may include a plurality of passive elements and control a phase difference between an AC current io and an AC voltage vo output from the inverter 540 based on at least some of the plurality of passive elements.

Figure 3:
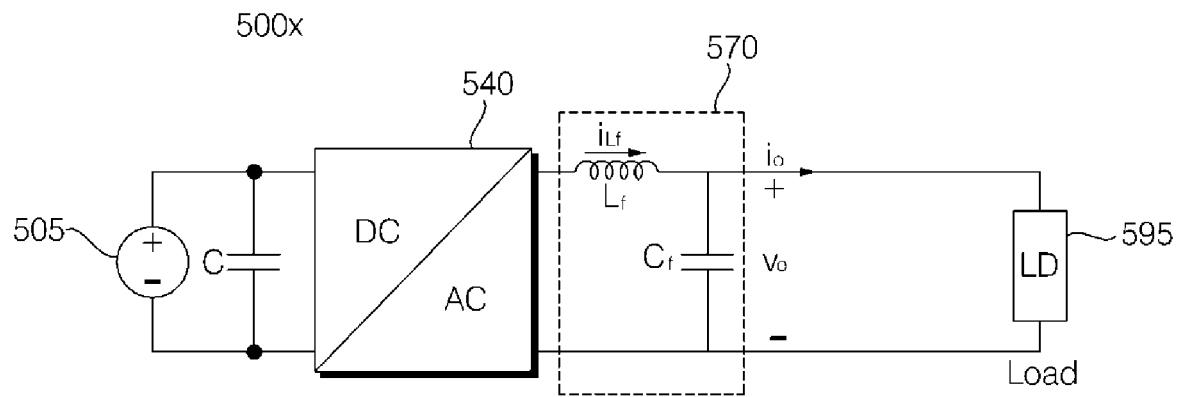
FIG. 3 is an example of a circuit diagram of a power converting apparatus according to a linear load.
Figure 4A:
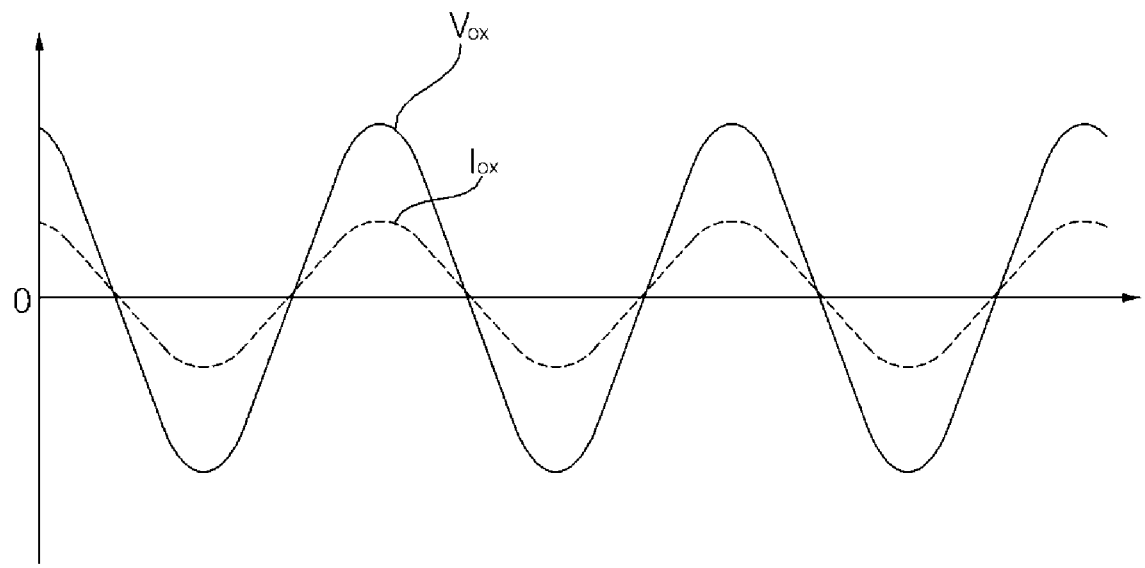
FIGS. 4A and 4B are diagrams referred to in the description of operation of FIG. 3.
Figure 4B:
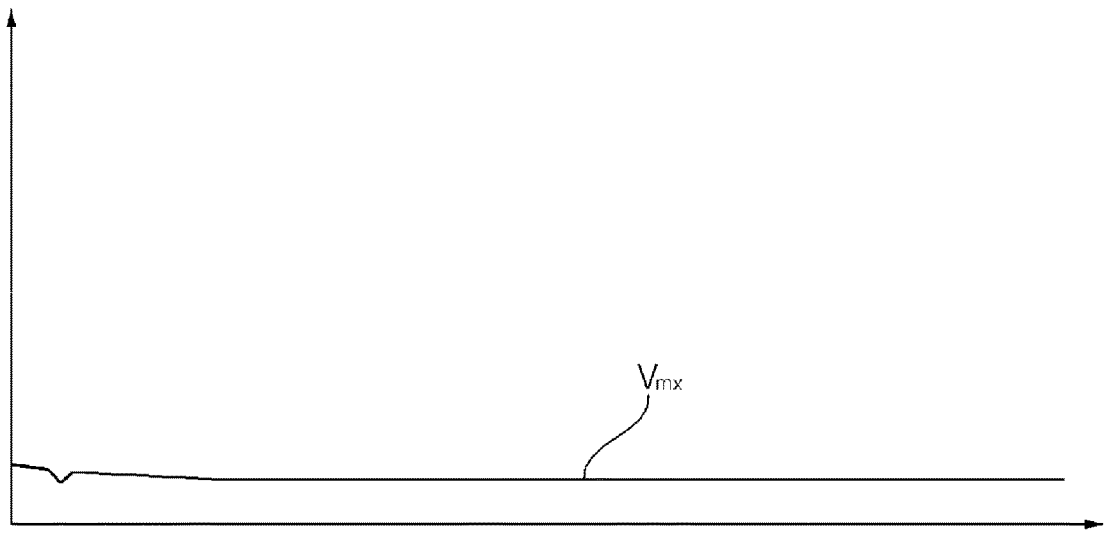

FIG. 3 is an example of a circuit diagram of a power converting apparatus according to a linear load; and FIGS. 4A and 4B are diagrams referred to in the description of operation of FIG. 3.

First, in a power converting apparatus 500x of FIG. 3, input DC power 505 is stored in the capacitor C, the inverter 540 converts the input DC power into AC power, and an output AC current io and an output AC voltage vo are output to the outside by passing through the filter 570 having the inductor Lf and the capacitor Cf which are passive elements.

Meanwhile, when an autonomous operation is performed with a load 595 being connected to an output terminal of the inverter 540 or an output terminal of the filter 570, the output AC current io and the output AC voltage vo may be output to the load 595.

Meanwhile, in the case where the load 595 is a linear load, an output AC current iox and an output AC voltage vox, which have no distortion, may be output.

Particularly, when a frequency of the output AC voltage vox is converted, the voltage has a low magnitude across all frequency bands, as illustrated in FIG. 4B.

Accordingly, when a linear load is connected as in the power converting apparatus 500x of FIG. 3, no distortion occurs in the output AC current iox and the output AC voltage vox, such that stable output AC current iox and output AC voltage vox may be output.

Figure 5:
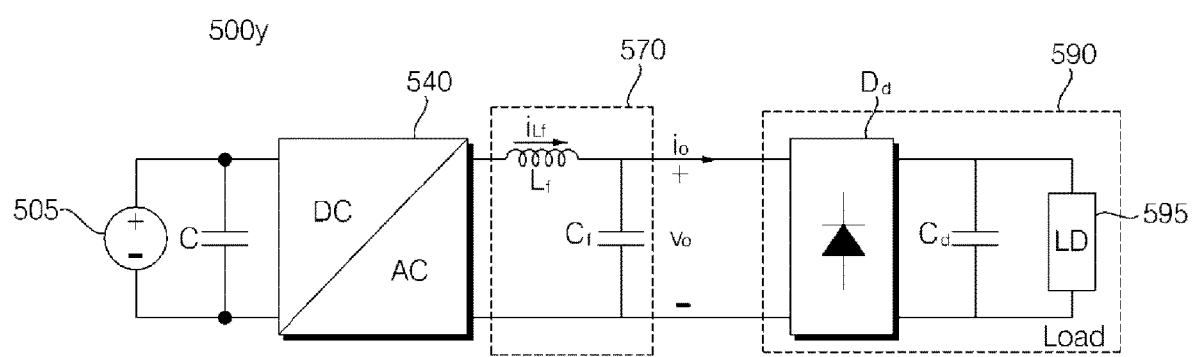
FIG. 5 is an example of a circuit diagram of a power converting apparatus according to a nonlinear load.

FIG. 5 is an example of a circuit diagram of a power converting apparatus according to a nonlinear load; and FIGS. 6 to 9B are diagrams referred to in the description of operation of FIG. 5.

First, in a power converting apparatus 500y of FIG. 5, input DC power 505 is stored in the capacitor C, the inverter 540 converts the input DC power into AC power, and an output AC current io and an output AC voltage vo are output to the outside by passing through the filter 570 having the inductor Lf and the capacitor Cf which are passive elements.

Meanwhile, when an autonomous operation is performed with a load 590 being connected to an output terminal of the inverter 540 or an output terminal of the filter 570, the output AC current io and the output AC voltage vo may be output to the load 590.

Figure 6A:
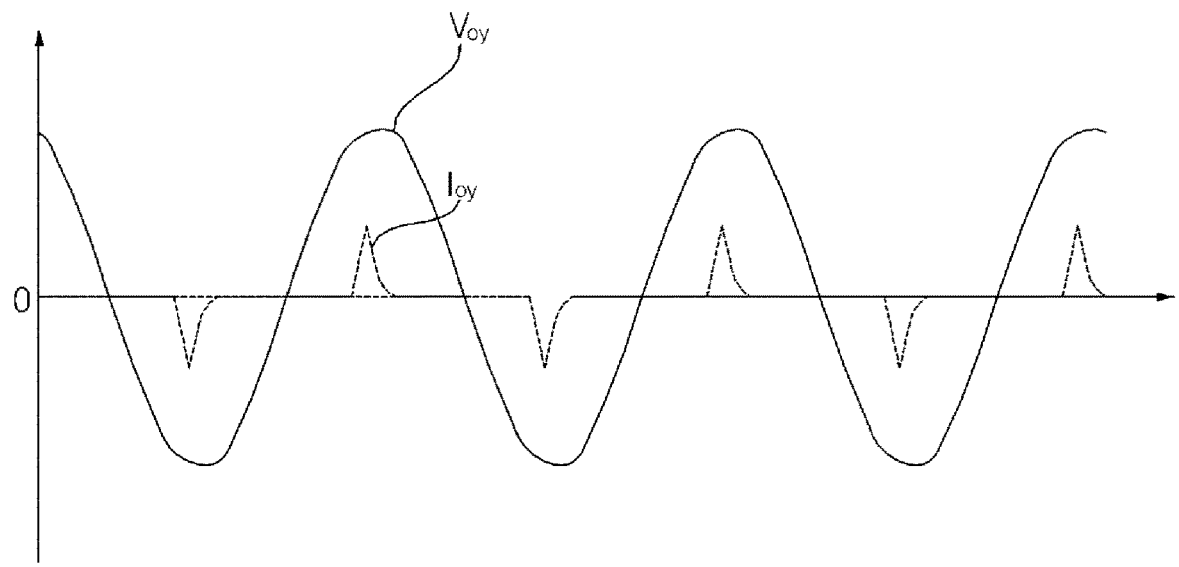
FIGS. 6 to 9B are diagrams referred to in the description of operation of FIG. 5.

Meanwhile, in the case where the load 590 is a nonlinear load including the diode Dd, the capacitor Cd, the linear load 595, etc., an output AC current ioy and an output AC voltage voy, which have distortion, are output as illustrated in FIG. 6A.

Figure 6B:
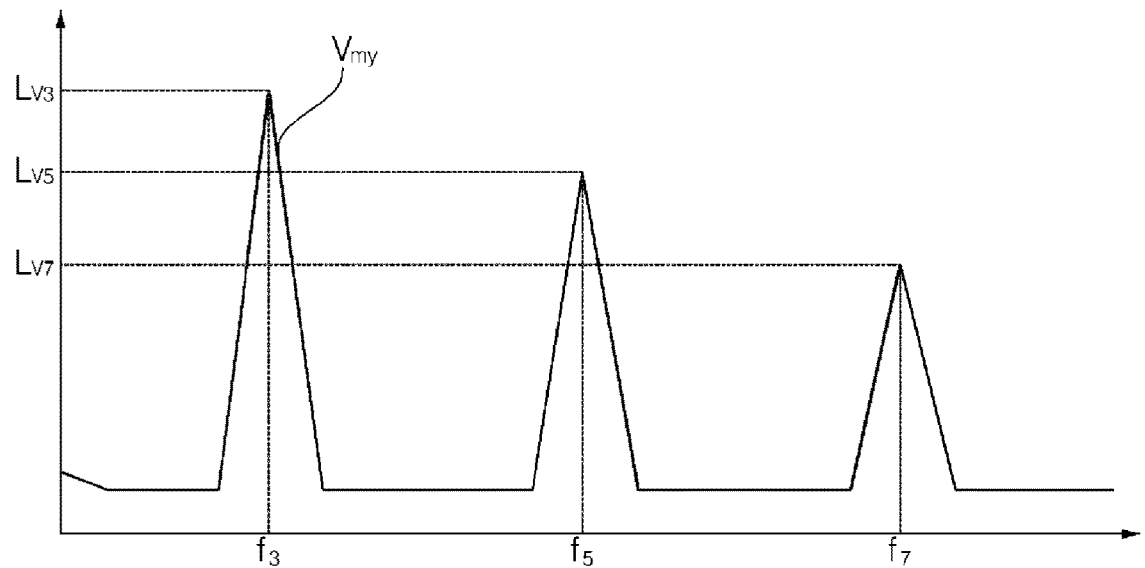

Particularly, when the frequency of the output AC voltage voy is converted, the voltage has corresponding magnitudes Lv3, Lv5, and Lv7 at a third frequency f3, a fifth frequency f5, and a seventh frequency f7 of the fundamental frequency of the output AC voltage voy in all frequency bands, as illustrated in FIG. 6B.

Accordingly, when a nonlinear load 500 is connected as in the power converting apparatus 500y of FIG. 5, distortion occurs in the output AC current ioy and the output AC voltage voy, such that unstable output AC current ioy and output AC voltage voy are output.

The present disclosure provides a method of reducing distortion in the output AC current ioy and the output AC voltage voy, which occurs when the nonlinear load is connected during the autonomous operation of the power converting apparatus.

To this end, the controller 550 in the power converting apparatus 500 according to an embodiment of the present disclosure performs proportional resonant control based on the output voltage Vo, and outputs the switching control signal Sic to the inverter 540 based on the proportional resonant control. Accordingly, it is possible to remove harmonics generated due to connection of the nonlinear load 590. Particularly, it is possible to remove the generated harmonics while performing the autonomous operation, thereby improving the quality of the AC power.

Alternatively, when harmonic components of each harmonic order are generated in the output voltage, the controller 550 in the power converting apparatus 500 according to an embodiment of the present disclosure may perform proportional resonant control during a first period and may output the switching control signal Sic based on the proportional resonant control; and the controller 550 may prevent each order harmonic component from being generated in the output voltage during a second period after the first period. Accordingly, it is possible to remove harmonics generated due to connection of the nonlinear load 590. Particularly, it is possible to remove the generated harmonics while performing the autonomous operation, thereby improving the quality of the output AC power.

Figure 7:
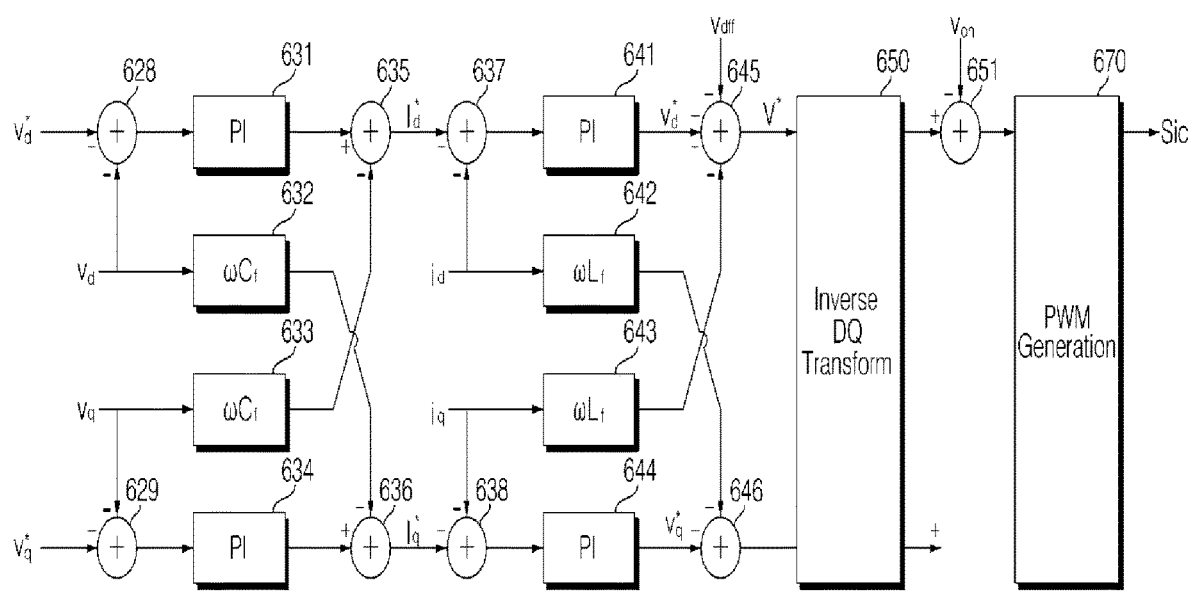

FIG. 7 illustrates an example of an internal block diagram of the controller 550 in the power converting apparatus 500 according to an embodiment of the present disclosure.

Referring to the drawing, the output voltage Vo detected by the output voltage detector F may be converted into a synchronous reference frame, such that the detected output voltage Vo may be converted into d-axis and q-axis voltages Vd and Vq.

Meanwhile, in the case where voltage reference values are input for the operation of the inverter 540, the voltage reference values may be converted into d-axis and q-axis voltage reference values V*d and V*g.

A calculator 628 may calculate a difference between the d-axis voltage Vd and the d-axis voltage reference value V*d, and the difference is input to a PI controller 631 for PI control.

Meanwhile, the d-axis voltage Vd is input to a frequency controller 632 for frequency control.

A calculator 629 may calculate a difference between the q-axis voltage Vq and the q-axis voltage reference value V*q, and the difference is input to a PI controller 634 for PI control.

Meanwhile, the q-axis voltage Vq is input to a frequency controller 633 for frequency control.

A calculator 635 may output a d-axis current reference value I*d based on the output of the PI controller 631 and the output of the frequency controller 633.

A calculator 636 may output a q-axis current reference value I*q based on the output of a PI controller 634 and the output of the frequency controller 632.

A calculator 637 may calculate a difference between the d-axis current Id and the d-axis current reference value I*d, and the difference is input to a PI controller 641 for PI control.

Meanwhile, the d-axis current Id is input to a frequency controller 642 for frequency control.

A calculator 638 calculates a difference between the q-axis current Iq and the q-axis current reference value I*q, and the difference is input to a PI controller 644 for PI control.

Meanwhile, the q-axis current Ig is input to a frequency controller 643 for frequency control.

A calculator 645 may output a d-axis voltage reference values V*d based on the output of the PI controller 641 and the output of the frequency controller 643.

A calculator 646 may output a q-axis voltage reference value V*g based on the output of a PI controller 644 and the output of the frequency controller 642.

Meanwhile, an offset voltage Voff may be further applied to the calculator 646 to offset the output voltage, and the calculator 646 may output the q-axis voltage reference value v*q based on the output of the PI controller 644, the output of the frequency controller 642, and the offset voltage Voff.

Meanwhile, the q-axis and d-axis voltage reference values V*q and V*d are input to an inverse transformation portion 650, such that the d-axis and q-axis voltage reference values in the synchronous reference frame may be changed into voltage reference values V* in the stationary reference frame.

Meanwhile, based on the voltage reference values in the stationary reference frame, a pulse width modulation (PWM)-based switching signal output portion 670 may output a pulse width modulation (PWM)-based inverter switching control signal Sic.

Meanwhile, in order to reduce output voltage distortion and the like due to the linear load during the autonomous operation, a voltage reference value Voh for removing harmonics in the output voltage is generated separately in addition to the voltage reference value in the stationary reference frame.

Accordingly, the PWM-based switching signal output portion 670 may output the PWM-based inverter switching control signal Sic based on the voltage reference value V* in the stationary reference frame and the voltage reference value Voh for removing harmonics in the output voltage.

Meanwhile, when the linear load 595 is connected to the power converting apparatus 500x as illustrated in FIG. 3, the voltage reference value Voh for removing harmonics is not generated but has a value of zero.

Meanwhile, when the nonlinear load 590 is connected to the power converting apparatus 500y as illustrated in FIG. 5, the voltage reference value Voh for removing harmonics may be generated and output.

That is, the controller 570 may selectively generate the voltage reference value Voh for removing harmonics.

Meanwhile, the controller 570 may include various controllers for selectively generating the voltage reference value Voh for removing harmonics, which will be described below with reference to FIG. 8C and the following figures.

Figure 8A:
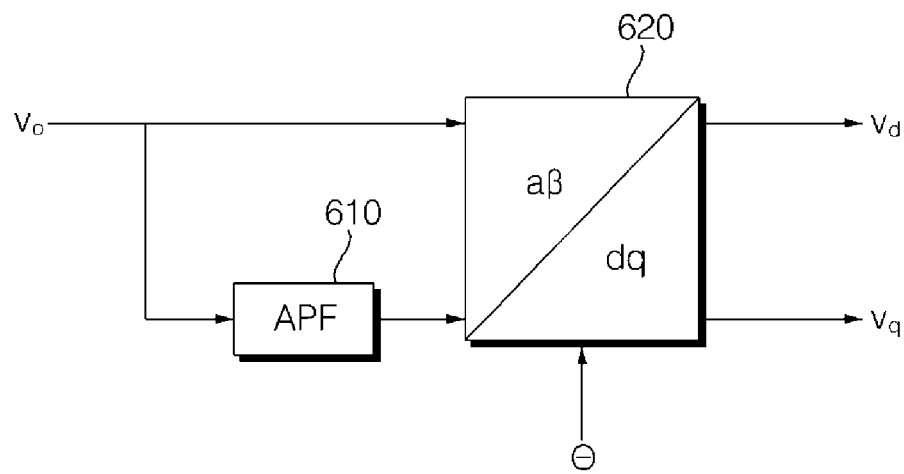

Meanwhile, FIG. 8A illustrates an example of converting the output voltage Vo in the stationary reference frame into d-axis and q-axis voltages Vd and Vq in a rotating reference frame.

For reference frame conversion, the output voltage Vo may be filtered by an all pass filter (APF) 610.

Further, the output voltage Vo input to an axis transformation portion 620 may be converted into the d-axis voltage Vd and the q-axis voltage Vg in the rotating reference frame, based on a phase difference θ between the output voltage Vo and the output current Io.

Figure 8B:
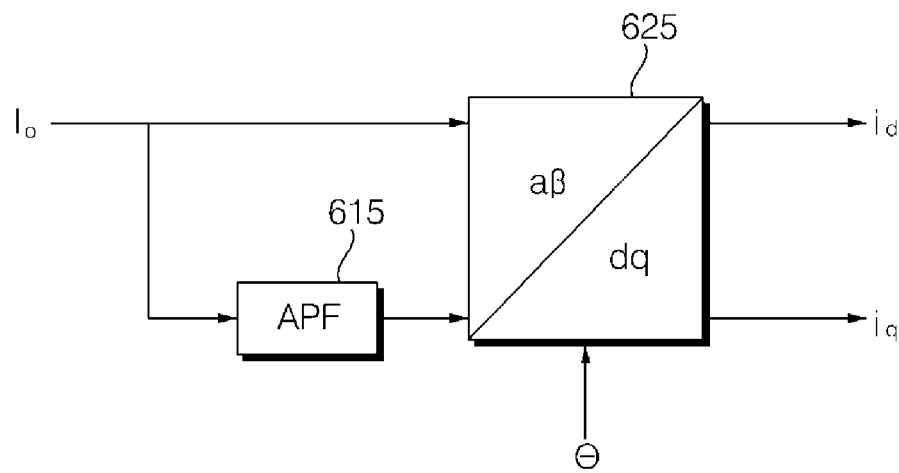

Meanwhile, FIG. 8B illustrates an example of converting the output current Io in the stationary reference frame into the d-axis current Id and the q-axis current Iq in the rotating reference frame.

For reference frame conversion, the output current Io may be filtered by an all pass filter (APF) 615.

Further, the output current Io input to the axis transformation portion 620 may be converted into the d-axis current Id and the q-axis current Ig in the rotating reference frame, based on a phase difference θ between the output voltage Vo and the output current Io.

Figure 8C:
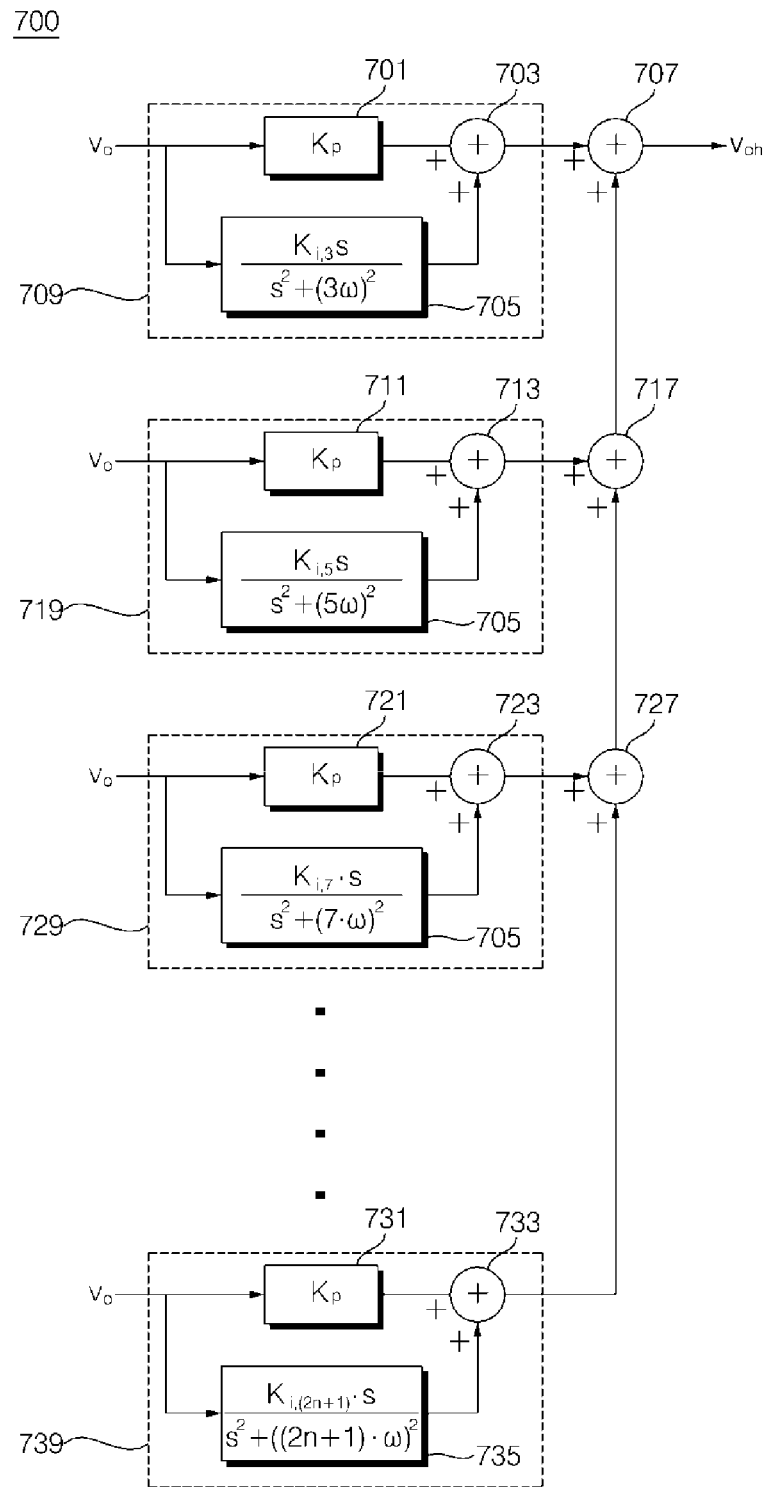

FIG. 8C is a diagram illustrating an example of a voltage reference generator 700 for removing harmonics.

Referring to the drawing, the voltage reference generator 700 for removing harmonics performs proportional resonant control based on the output voltage Vo from the output voltage detector F, and outputs a voltage reference value Voh for removing harmonics. Accordingly, the switching control signal Sic based on the proportional resonant control may be output from the controller 550 to the inverter 540.

Accordingly, it is possible to remove harmonics generated due to connection of the nonlinear load 590. Particularly, it is possible to remove the generated harmonics while performing the autonomous operation, thereby improving the quality of the output AC power.

Meanwhile, the controller 550 in the power converting apparatus 500 performs proportional resonant control based on the output voltage Vo, calculates a harmonic compensation value, and outputs the switching control signal Sic to the inverter 540 based on the calculated harmonic compensation value, thereby removing harmonics generated due to connection of the nonlinear load 590. Particularly, it is possible to remove the generated harmonics while performing the autonomous operation.

Meanwhile, the controller 550 in the power converting apparatus 500 extracts harmonics from the output voltage Vo, calculates the harmonic compensation value based on the extracted harmonics, and outputs the switching control signal Sic to the inverter 540 based on the calculated harmonic compensation value, thereby removing harmonics generated due to connection of the nonlinear load 590. Particularly, it is possible to remove the generated harmonics while performing the autonomous operation.

More specifically with reference to FIG. 8C, the voltage reference generator 700 for removing harmonics may include proportional resonant controllers 709, 719, 729, and 739 respectively for each order of harmonics.

A first proportional resonant controller 709 performs proportional resonant (PR) control for removing harmonics at a third harmonic frequency f3 of the fundamental frequency of the output voltage Vo.

To this end, the first proportional resonant controller 709 may include a proportional controller 701, a resonant controller 705, and an adder 703. Accordingly, the first proportional resonant controller 709 may calculate and output a harmonic compensation value for the third harmonic frequency.

A second proportional resonant controller 719 performs PR control for removing harmonics at a fifth harmonic frequency f5 of the fundamental frequency of the output voltage Vo.

To this end, the second proportional resonant controller 719 may include a proportional controller 711, a resonant controller 715, and an adder 713. Accordingly, the second proportional resonant controller 719 may calculate and output a harmonic compensation value for the fifth harmonic frequency.

A third proportional resonant controller 729 performs PR control for removing harmonics at a seventh harmonic frequency f7 of the fundamental frequency of the output voltage Vo.

To this end, the third proportional resonant controller 729 may include a proportional controller 721, a resonant controller 725, and an adder 723. Accordingly, the third proportional resonant controller 709 may calculate and output a harmonic compensation value for the seventh harmonic frequency.

An nth proportional resonant controller 739 performs PR control for removing harmonics at an nth harmonic frequency fn of the fundamental frequency of the output voltage Vo.

To this end, the nth proportional resonant controller 739 may include a proportional controller 731, a resonant controller 735, and an adder 733. Accordingly, the nth proportional resonant controller 739 may calculate and output a harmonic compensation value for the nth harmonic frequency.

Meanwhile, the adder 707 may add up the harmonic compensation values for the respective frequencies, which are outputs of the respective proportional resonant controllers 709, 719, 729, and 739 to output a final voltage reference value Voh for removing harmonics. Accordingly, the switching control signal Sic based on the proportional resonant control may be output from the controller 550 to the inverter 540.

As a result, the controller 550 in the power converting apparatus 500 extracts harmonics from the output voltage Vo, performs proportional resonant control by using the respective proportional resonant controllers 709, 719, 729, and 739 for each order of harmonics, and outputs the switching control signal Sic to the inverter 540 based on the calculated harmonic compensation value or the voltage reference value Voh for removing harmonics. Accordingly, it is possible to remove harmonics generated due to connection of the nonlinear load 590. Particularly, it is possible to remove the generated harmonics while performing an autonomous operation.

Meanwhile, the controller 550 in the power converting apparatus 500 may include a band pass filter, located on a front end of the respective proportional resonant controllers 709, 719, 729, and 739, to pass frequency bands of each order of harmonics.

Particularly, a band pass filter for passing frequency bands of each order of harmonics may be further disposed on the front end of the respective proportional resonant controllers 709, 719, 729, and 739.

For example, a first band bass filter may be disposed on the front end of the first proportional resonant controller 709; a second band bass filter may be disposed on the front end of the second proportional resonant controller 719; a third band bass filter may be disposed on the front end of the third proportional resonant controller 729; and an nth band bass filter may be disposed on the front end of the nth proportional resonant controller 739.

Meanwhile, if the order of harmonics is lower than or equal to a reference order, the controller 550 in the power converting apparatus 500 may control a gain of the proportional resonant controllers 709, 719, 729, and 739 to be infinite, thereby removing harmonics of the order lower than or equal to the reference order.

For example, if the reference order is 7th, the controller 550 controls gains of the proportional resonant controllers 709, 719, and 729 corresponding to the 3rd, 5th, and 7th harmonics to be infinite, thereby removing harmonics of the order lower than or equal to the reference order.

In another example, if the reference order is 9th, the controller 550 controls gains of the proportional resonant controllers corresponding to the 3rd, 5th, 7th, and 9th harmonics to be infinite, thereby removing harmonics of the order lower than or equal to the reference order.

In yet another example, if the reference order is 11th, the controller 550 controls gains of the proportional resonant controllers corresponding to 3rd, 5th, 7th, 9th, and 11th harmonics to be infinite, thereby removing harmonics of the order lower than or equal to the reference order.

Meanwhile, if the order of harmonics is lower than or equal to the reference order, the controller 550 in the power converting apparatus 500 may calculate a harmonic compensation value so that harmonic components in the corresponding proportional resonant controllers 709, 719, and 729 to be zero, and may output the switching control signal Sic to the inverter 540 based on the calculated harmonic compensation value, thereby removing harmonics of the order lower than or equal to the reference order.

For example, if the reference order is 7th, the controller 550 may calculate a harmonic compensation value so that 3rd, 5th, and 7th harmonic components may be zero, and may output the switching control signal Sic to the inverter 540 based on the calculated harmonic compensation value, thereby removing harmonics of the order lower than or equal to the reference order.

In another example, if the reference order is 9th, the controller 550 may calculate a harmonic compensation value so that 3rd, 5th, 7th, and 9th harmonic components may be zero, and may output the switching control signal Sic to the inverter 540 based on the calculated harmonic compensation value, thereby removing harmonics of the order lower than or equal to the reference order.

In yet another example, if the reference order is 11th, the controller 550 may calculate a harmonic compensation value so that 3rd, 5th, 7th, 9th, and 11th harmonic components may be zero, and may output the switching control signal Sic to the inverter 540 based on the calculated harmonic compensation value, thereby removing harmonics of the order lower than or equal to the reference order.

Meanwhile, unlike FIG. 8C, the controller 550 in the power converting apparatus 500 may include a repetitive controller 900 for extracting harmonics from t the output voltage Vo and performing repetitive control on harmonics.

Figure 8D:
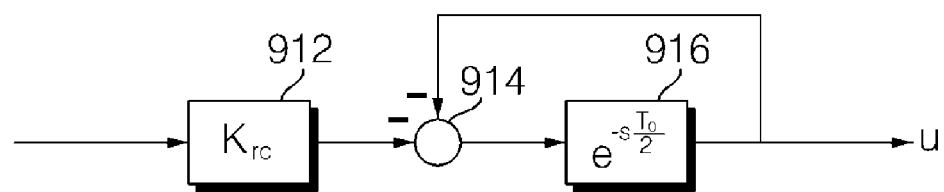

FIG. 8D is a diagram illustrating another example of a voltage reference generator 900 for removing harmonics.

Referring to the drawing, the voltage reference generator 900 for removing harmonics may include a proportional controller 912, a calculator 914, and a delay function controller 916.

Particularly, a result value of the delay function controller 916 is provided as feedback and input to the calculator 914 for repetitive control, such that the voltage reference generator 900 for removing harmonics of FIG. 9 may be referred to as a repetitive controller 900.

The following Equation 1 represents the operation of the repetitive controller.

$$\frac{U(s)}{E(s)} = \frac{-K_{rc}e^{-s\frac{T_0}{2}}}{1+e^{-s\frac{T_0}{2}}} = K_{rc}\left[-\frac{1}{2} + \frac{1}{2}\left(\frac{1-e^{-s\frac{T_0}{2}}}{1+e^{-s\frac{T_0}{2}}}\right)\right]$$
$$= K_{rc}\left[-\frac{1}{2} + \frac{1}{2}\frac{4}{T_0}\sum_{k=1}^{\infty}\frac{2s}{s^2+(2k-1)^2\omega_0^2}\right]$$
$$= -\frac{1}{2}K_{rc} + \sum_{k=1}^{\infty}\frac{2\frac{K_{rc}}{T_0}s}{s^2+(2k-1)^2\omega_0^2}$$

[Equation 1]

The operation of the repetitive controller 900 may be represented by an infinite sum of resonant controllers as expressed in Equation 1, thereby producing an effect in that it is not required to use a plurality of resonant controllers connected in parallel, as illustrated in FIG. 7C.

Meanwhile, as illustrated in FIGS. 8C and 8D, the controller 550 outputs the switching control signal Sic by using the harmonics compensate value based on the proportional resonant control or the voltage reference value Voh for removing harmonics in the output voltage, thereby reducing distortion in the output voltage and the output current.

Meanwhile, unlike FIGS. 8C and 8D, the controller 550 may perform proportional integral control, rather than proportional resonant control.

For example, the voltage reference generator 700 for removing harmonics may perform proportional integral control based on the output voltage Vo from the output voltage detector F, to output the voltage reference value Voh for removing harmonics. Accordingly, the switching control signal Sic based on the proportional integral control may be output from the controller 550 to the inverter 540.

Accordingly, it is possible to remove harmonics generated due to connection of the nonlinear load 590. Particularly, it is possible to remove the generated harmonics while performing the autonomous operation, thereby improving the quality of the output AC power.

Meanwhile, the controller 550 in the power converting apparatus 500 may perform proportional integral control based on the output voltage Vo, may calculate a harmonic compensation value, and may output the switching control signal Sic to the inverter 540 based on the calculated harmonic compensation value.

More specifically, the voltage reference generator 700 for removing harmonics may include a proportional integral controller (not shown) for each order of harmonics.

A first proportional integral controller 709 may perform proportional integral (PI) control for removing harmonics at a third harmonic frequency f3 of the fundamental frequency of the output voltage Vo.

To this end, the first proportional integral controller 709 may include a proportional controller (not shown), an integral controller (not shown), and an adder (not shown).

A second proportional integral controller 719 may perform proportional integral (PI) control for removing harmonics at a fifth harmonic frequency f5 of the fundamental frequency of the output voltage Vo.

To this end, the second proportional integral controller 719 may include a proportional controller (not shown), an integral controller (not shown), and an adder (not shown).

A third proportional integral controller 729 may perform proportional integral (PI) control for removing harmonics at a seventh harmonic frequency f7 of the fundamental frequency of the output voltage Vo.

To this end, the third proportional integral controller 729 may include a proportional controller (not shown), an integral controller (not shown), and an adder (not shown).

An nth proportional integral controller 739 may perform proportional integral (PI) control for removing harmonics at an nth harmonic frequency fn of the fundamental frequency of the output voltage Vo.

To this end, the nth proportional integral controller 739 may include a proportional controller (not shown), an integral controller (not shown), and an adder (not shown).

Meanwhile, the adder (not shown) may add up the harmonic compensation values for the respective frequencies, which are outputs of the respective proportional resonant controllers 709, 719, 729, and 739 to output a final voltage reference value Voh for removing harmonics. Accordingly, the switching control signal Sic based on the proportional integral control may be output from the controller 550 to the inverter 540.

Meanwhile, the controller 550 in the power converting apparatus 500 may include a band pass filter, located on a front end of the respective proportional integral controllers (not shown), to pass frequency bands of each order of harmonics.

Particularly, a band pass filter for passing frequency bands of each order of harmonics may be further disposed on end of the respective proportional integral the front controllers (not shown).

Figure 9A:
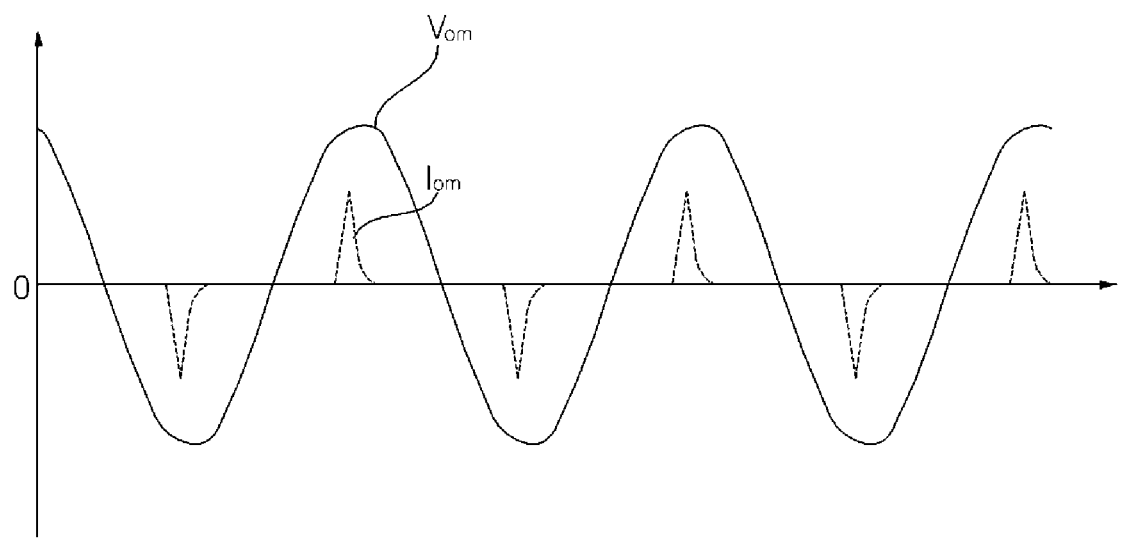

FIG. 9A illustrates an example of an output AC current iom and an output AC voltage vom which are output during an autonomous operation when the nonlinear load 590 is connected to the output terminal of the inverter 540 or the output terminal of the filter 570.

As described above with reference to FIGS. 7 to 8D, by calculating the harmonic compensation value based on the proportional resonant control or the voltage reference value Voh for removing harmonics in the output voltage, and by outputting the switching control signal Sic based on the values, the output AC current iom and the output AC voltage vom which have no distortion may be output.

Figure 9B:
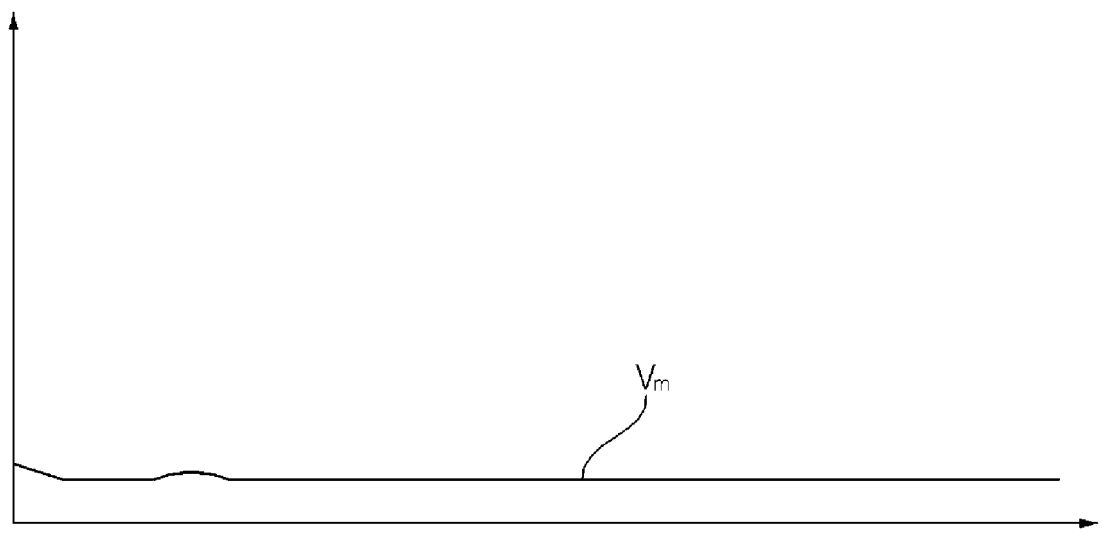

FIG. 9B is a diagram illustrating a frequency component of the output AC voltage vom.

It can be seen that when a frequency of the output AC voltage vom is converted, the voltage level has a low magnitude across all frequency bands, as illustrated in FIG. 9B.

Particularly, it can be seen that when compared to FIG. 6B, almost no 3rd, 5th, and 7th harmonic components are generated.

Meanwhile, as illustrated in FIG. 6A or FIG. 6B, when the linear load is connected during the autonomous operation, the harmonic components may be generated for each order of harmonics in the output voltage Vo during the first period.

In this case, the controller 550 performs proportional resonant control, and outputs the switching control signal Sic based on the proportional resonant control, and prevents harmonic components from being generated in the output voltage during the second period after the first period.

Accordingly, the output AC current iom and the output AC voltage vom may be output as illustrated in FIG. 9A or FIG. 9B. Accordingly, it is possible to remove harmonics generated due to connection of a nonlinear load. Particularly, it is possible to remove the generated harmonics while performing the autonomous operation.

Meanwhile, if the harmonic component is not generated in the output voltage Vo during the first period, the controller 550 in the power converting apparatus 500 may not perform the proportional resonant control. In this manner, the controller 550 may selectively perform the proportional resonant control, thereby improving control performance.

Figure 10:
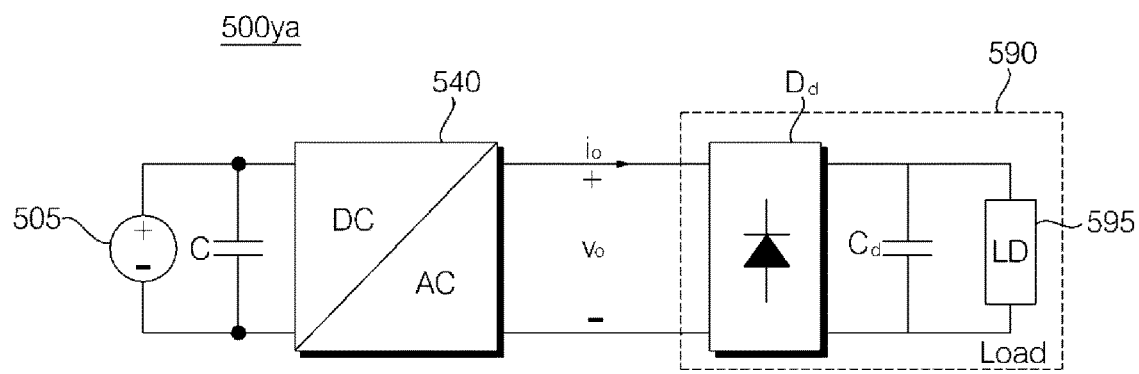
FIG. 10 is another example of a circuit diagram of a power converting apparatus according to a nonlinear load.

FIG. 10 is another example of a circuit diagram of a power converting apparatus according to a nonlinear load.

Referring to the drawing, a power converting apparatus 500ya of FIG. 10 is similar to the power converting apparatus 500y of FIG. 5, with a difference in that the filter 570 for filtering output AC power is omitted.

In the power converting apparatus 500ya of FIG. 10, input DC power 505 is stored in the capacitor C, the inverter 540 converts the input DC power into AC power, and an output AC current io and an output AC voltage vo are output to the outside.

Meanwhile, a load 595 is connected to an output terminal of the inverter 540, and when the load 590 is a nonlinear load including the diode Dd, the capacitor Cd, the linear load 595, etc., an output AC current ioy and an output AC voltage voy, which have distortion, may be output as illustrated in FIG. 6A.

Accordingly, as illustrated in the power converting apparatus 500ya of FIG. 10, when the nonlinear load 500ya is connected during the autonomous operation, distortion occurs in the output AC current io and the output AC voltage vo, such that unstable output AC io and output AC voltage vo are output.

Accordingly, the controller 550 in the power converting apparatus 500ya according to an embodiment of the present disclosure performs proportional resonant control based on the output voltage Vo, and outputs the switching control signal Sic to the inverter 540 based on the proportional resonant control, thereby removing harmonics generated due to connection of the nonlinear load 590. Particularly, it is possible to remove the generated harmonics while performing the autonomous operation, thereby improving the quality of the output AC power.

Alternatively, if harmonic components are generated for each order of harmonics in the output voltage Vo during the first period, the controller 550 in the power converting apparatus 500ya according to another embodiment of the present disclosure performs proportional resonant control, outputs the switching control signal Sic based on the proportional resonant control, and prevents the harmonic components from being generated for each order of harmonics in the output voltage during the second period after the first period, thereby removing harmonics generated due to connection of the nonlinear load 590. Particularly, it is possible to remove the generated harmonics while performing the autonomous operation, thereby improving the quality of the output AC power.

Figure 11:
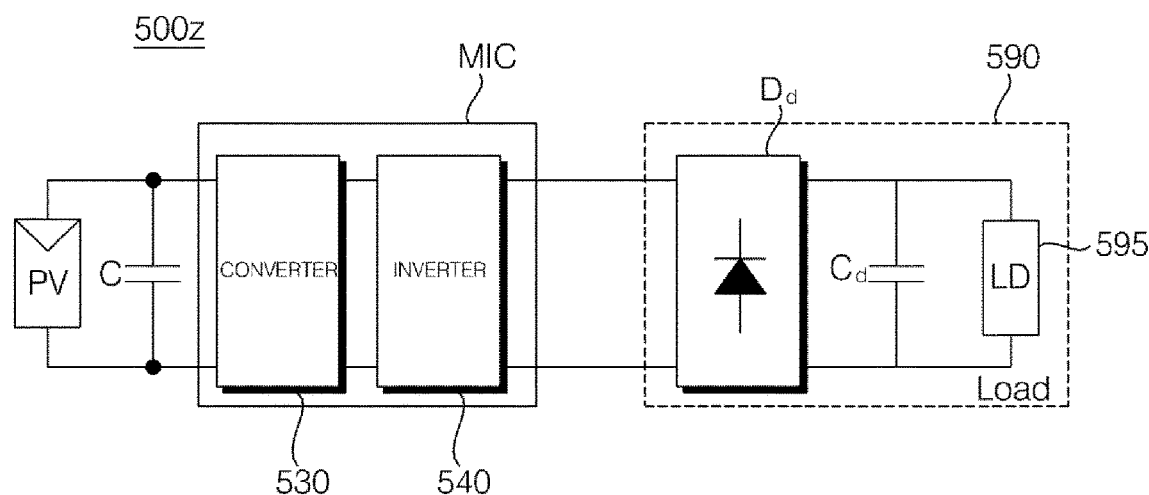
FIG. 11 is yet another example of a circuit diagram of a power converting apparatus according to a nonlinear load.

FIG. 11 is yet another example of a circuit diagram of a power converting apparatus according to a nonlinear load.

Referring to the drawing, a power converting apparatus 500z of FIG. 11 is similar to the power converting apparatus 500y of FIG. 5, with a difference in that the filter 570 for filtering output AC power is omitted, and the converter 530 is disposed on a front end of the inverter 540.

In the power converting apparatus 500z of FIG. 11, input DC power 505 is stored in the capacitor C, the DC power stored in the capacitor C is converted by the converter 540 such that the converted DC power is output, the inverter 540 converts the DC power from the converter 540 into AC power, and an output AC current io and an output AC voltage vo are output to the outside.

Meanwhile, the load 590 may be connected to the output terminal of the inverter 540, and when the load 590 is a nonlinear load including the diode Dd, the capacitor Cd, the linear load 595, etc., an output AC current ioy and an output AC voltage voy, which have distortion, may be output as illustrated in FIG. 6A.

Accordingly, as illustrated in the power converting apparatus 500z of FIG. 11, when the nonlinear load 590 is connected during the autonomous operation, distortion occurs in the output AC current ioy and the output AC voltage voy, such that unstable output AC current ioy and output AC voltage voy are output.

Accordingly, the controller 550 in the power converting apparatus 500z according to an embodiment of the present disclosure performs proportional resonant control based on the output voltage Vo, and outputs the switching control signal Sic to the inverter 540 based on the proportional resonant control, thereby removing harmonics generated due to connection of the nonlinear load 590. Particularly, it is possible to remove the generated harmonics while performing the autonomous operation, thereby improving the quality of the output AC power.

Alternatively, if harmonic components are generated for each order of harmonics in the output voltage Vo during the first period, the controller 550 in the power converting apparatus 500ya according to another embodiment of the present disclosure performs proportional resonant control, outputs the switching control signal Sic based on the proportional resonant control, and prevents the harmonic components from being generated for each order of harmonics in the output voltage during the second period after the first period, thereby removing harmonics generated due to connection of the nonlinear load 590. Particularly, it is possible to remove the generated harmonics while performing the autonomous operation, thereby improving the quality of the output AC power.

Figure 12:
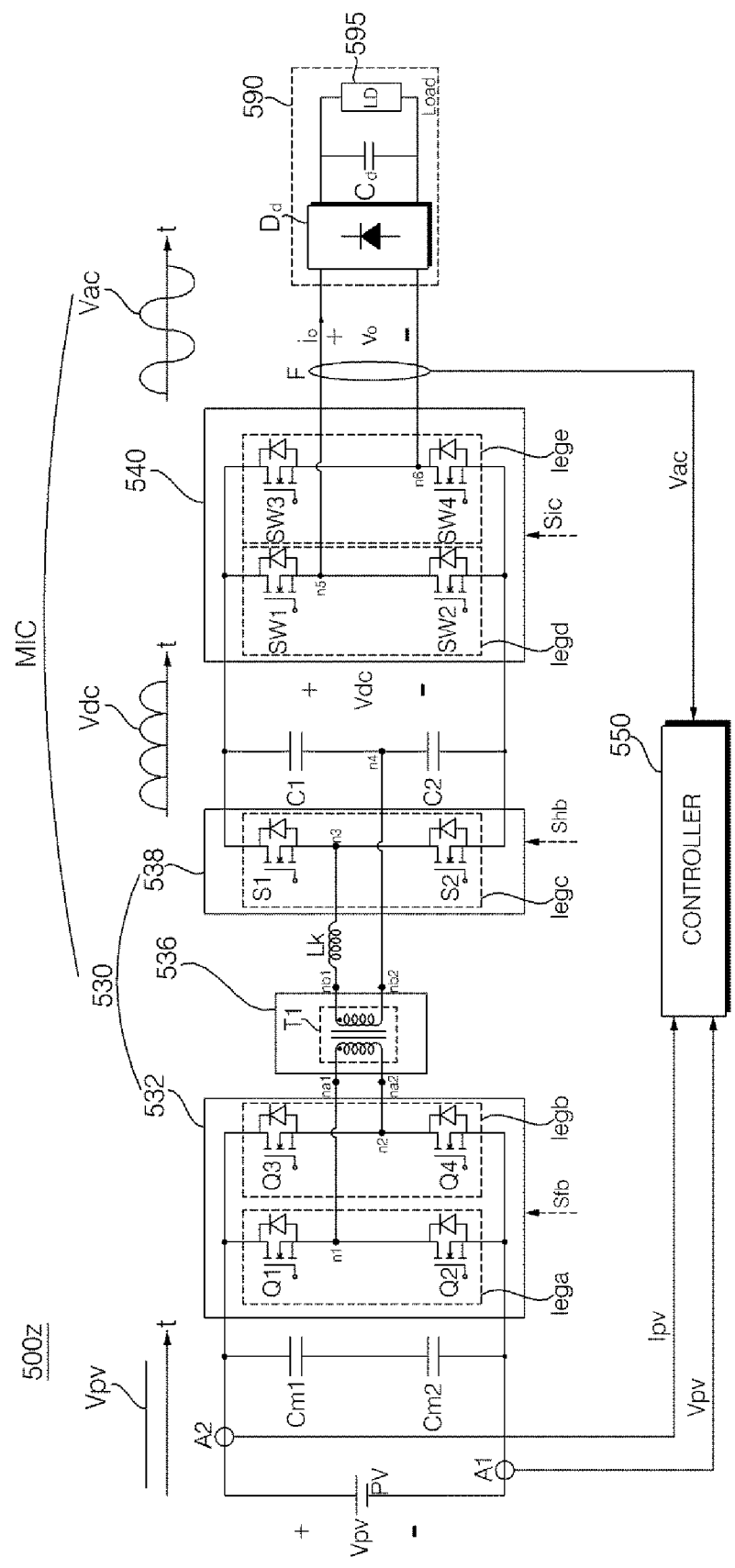
FIG. 12 is a diagram illustrating an example of an internal circuit of the power converting apparatus of FIG. 11.
Figure 13:
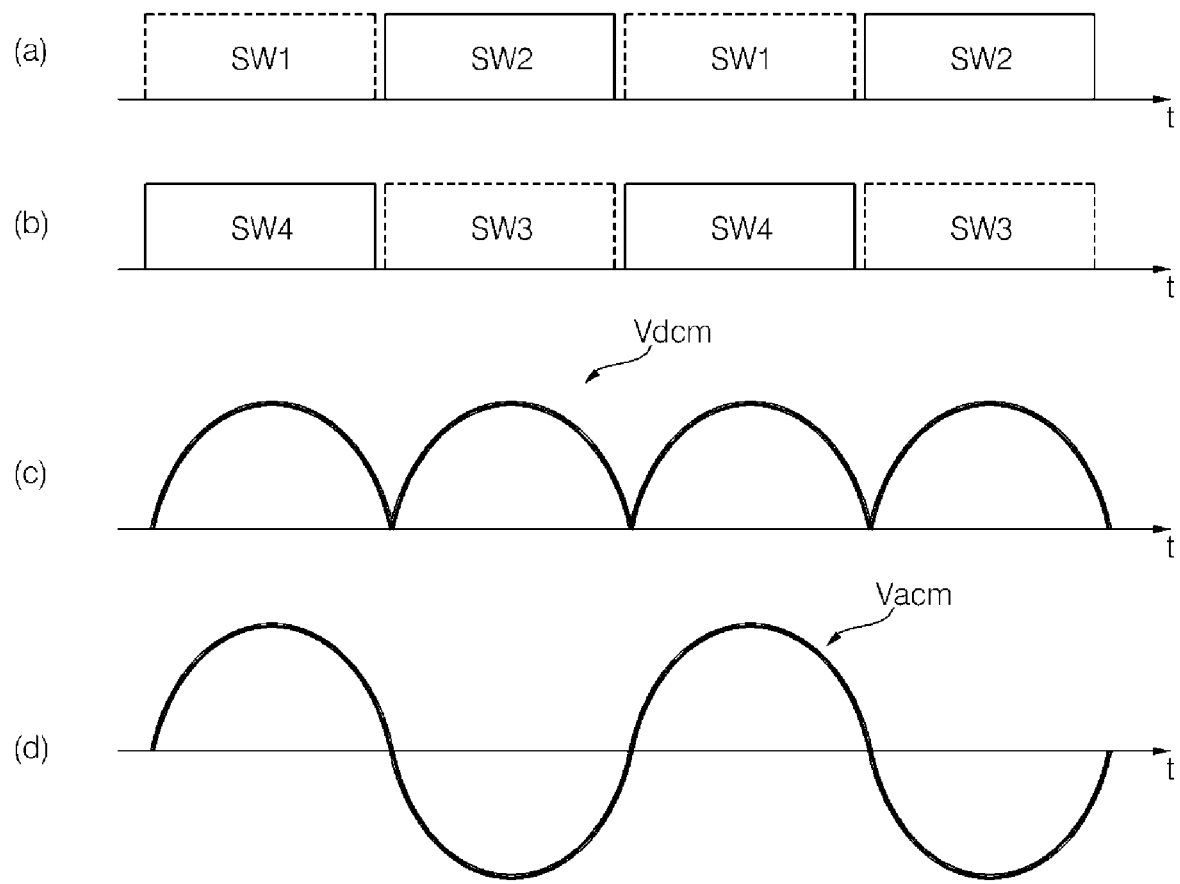
FIG. 13 is a diagram referred to in the description of the power converting apparatus of FIG. 12.

FIG. 12 illustrates an example of an internal circuit diagram of the power converting apparatus of FIG. 11, and FIG. 13 is a diagram referred to in the description of the power converting apparatus of FIG. 12.

Referring to the drawing, the power converting apparatus 500z according to an embodiment of the present disclosure includes the converter 530, the inverter 540, and the controller 550.

Meanwhile, if an output voltage, output from the inverter 540, increases to a level outside a first range Vrar, the controller 550 restarts the inverter 540 after turning off the inverter 540. Accordingly, it is possible to reduce overvoltage occurring due to a change in load connected to the output terminal of the inverter 540. Further, circuit elements may be protected when there is no filter at the output terminal of the inverter 540.

Meanwhile, when restarting the inverter 540, the controller 550 may control the inverter 540 to operate based on a second gain higher than a first gain before the inverter 540 is turned off. Accordingly, it is possible to stably operate the inverter 540 when restarting the inverter 540 due to a sudden load change.

Meanwhile, after restarting the inverter 540, the controller 550 may operate the inverter 540 based on the second gain, and then, if the output voltage output from the inverter 540 falls within the first range Vrar, the controller 550 may control the inverter 540 to operate based on the first gain. Accordingly, it is possible to stably operate the inverter 540 when restarting the inverter 540 due to a sudden load change.

The power converting apparatus 500z according to an embodiment of the present disclosure may further include an output voltage detector F for detecting output voltage Vac which is output from the inverter 540.

Meanwhile, based on the output voltage from the output voltage detector, the controller 550 may determine whether the output voltage output from the inverter 540 increases to a level outside the first range Vrar, thereby rapidly detecting a sudden load change.

Meanwhile, based on the output voltage Vac from the output voltage detector F, the controller 550 may calculate power of the load connected to the output terminal of the inverter 540.

The power converting apparatus 500z according to an embodiment of the present disclosure may further include the output voltage detector F for detecting the output voltage Vac output from the inverter 540, and an input voltage detector A1 for detecting a voltage Vpv of the input DC power.

Meanwhile, the controller 550 may output a control signal for controlling the converter 530 based on the output voltage Vac detected by the output voltage detector F and the input voltage Vpv detected by the input voltage detector A1.

The power converting apparatus 500z according to an embodiment of the present disclosure may further include the output voltage detector F for detecting the output voltage Vac output from the inverter 540, and an input current detector A2 for detecting a current Ipv of the input DC power.

Meanwhile, the controller 550 may output a converter switching control signal Scc for controlling the converter 530, based on the output voltage Vac detected by the output voltage detector F and the input current Ipv detected by the input current detector A2, thereby stably operating the power converting apparatus 500z.

Meanwhile, the controller 550 may generate a current reference value for controlling the converter 530, based on the output voltage of the inverter 540 and the voltage reference value, and may output the converter switching control signal Scc for controlling the converter 530 based on the current reference value, thereby stably operating the power converting apparatus 500z.

Meanwhile, the converter 530 according to an embodiment of the present disclosure includes include a full bridge switching device 532 for converting the input DC voltage Vpv, a transformer 536 having an input side connected to an output terminal of the full bridge switching device 532 and outputting the converted voltage, and a half bridge switching device 538 electrically connected to an output side of the transformer 536.

Accordingly, it is possible to improve the quality of the output AC power, particularly, it is possible to provide an output voltage gain over a wide range and perform zero voltage switching. Further, operations may be performed with high efficiency even over a wide voltage range with a low RMS current and low peak current. In addition, it is possible to perform power conversion in one power stage by half wave rectification.

Meanwhile, the converter 530 according to an embodiment of the present disclosure may further include a half bridge switching device 538 connected to the output side of the transformer 536 and a resonant inductor Lk connected between the transformer 536 and the half bridge switching device 538. Accordingly, an inductor current flows by a voltage difference between both ends of the resonant inductor Lk, and the converted power may be controlled by controlling a phase difference between both ends of the inductor.

Meanwhile, the ripple on the input current may be reduced by resonance of the transformer 536 and the resonant inductor Lk.

Meanwhile, by using the resonant inductor Lk and the like, the respective switching elements Q1 to Q4 in the full bridge switching device 532 may perform zero voltage switching (ZVS) and zero current switching (ZCS).

Meanwhile, the power converting apparatus 500z according to an embodiment of the present disclosure may further include a first capacitor C1 and a second capacitor C2 connected in series to each other and connected to a DC terminal corresponding to an output terminal of the half bridge switching device 538, thereby outputting a half-wave voltage or a pulsating voltage to the DC terminal.

Meanwhile, a first node nb1 on the output side of the transformer 536 is connected to the resonant inductor Lk, and a second node nb2 on the output side of the transformer 536 is connected to a fourth node n4 located between the first capacitor C1 and the second capacitor C2. Accordingly, a half-wave voltage or a pulsating voltage may be output to the DC terminal.

Meanwhile, the converter 530 according to an embodiment of the present disclosure may further include a third capacitor Cm connected to both ends of the input terminal of the full bridge switching device 532.

Meanwhile, a first node na1 on the input side is connected to the node n1 between the first switching element Q1 and the second switching element Q2, and a second node na is connected to a node n2 between the third switching element Q3 and a fourth switching element Q4.

As illustrated herein, the full bridge switching device 532 may include a first leg lega including the first switching element Q1 and the second switching element Q2 which are connected in series to each other; and a second leg legb including the third switching element Q3 and the fourth switching element Q4 which are connected in series to each other.

The first leg lega and the second leg legb may be connected in parallel to each other.

Further, the input side na1 and na2 of the transformer 536 may be connected between the first node n1, located between the first switching element Q1 and the second switching element Q2, and the second node n2 located between the third switching element Q3 and the fourth switching element Q4.

Meanwhile, the inverter 540 may further include a fourth leg legd including seventh and eighth switching elements SW1 and SW2 which are connected in series to each other; and a fifth leg lege including ninth and tenth switching elements SW3 and SW4 which are connected in series to each other.

The AC power may be output through the fifth node n5 between the seventh switching element SW1 and the eighth switching element SW2 and a sixth node n6 between the ninth switching element SW9 and the tenth switching element SW4.

Meanwhile, as illustrated herein, the half bridge switching device 538 may include a third leg legc including the fifth switching element S1 and the sixth switching element S2 which are connected in series to each other.

Meanwhile, the first capacitor C1 and the second capacitor C2, which are connected in series to each other, may be disposed at the DC terminal, which is the output terminal of the half bridge switching device 538.

In this case, the fifth switching element S1, the sixth switching element S2, the first capacitor C1, and the second capacitor C2 may be connected in parallel to each other.

The output side nb1 and nb2 of the transformer 536 may be connected between the third node n3, located between the fifth switching element S1 and the sixth switching element S2, and the fourth node n4 located between the first capacitor C1 and the second capacitor C2.

Meanwhile, the half bridge switching device 538, also referred to as a voltage doubler, may amplify the input voltage to a double level.

Meanwhile, the controller 550 may control the converter 530 and the inverter 540 together.

Particularly, the controller 550 may output a control signal Sfb to the full bridge switching device 532 in the converter 530 for maximum power point tracking control.

Meanwhile, the controller 550 may output a control signal Shb to the half bridge switching device 538 to control the half bridge switching device 538.

Meanwhile, the controller 550 may output a control signal Sic to the inverter 540 to control the inverter 540.

FIG. 13 is a diagram referred to in the description of operation of the inverter.

Referring to the drawing, as the switching element SW1 and the tenth switching element SW10 in the inverter 540 are turned on during a first period, a dc terminal voltage Vdc having a positive polarity may be converted into a positive voltage and the converted voltage may be output, and as the eighth switching element SW2 and the ninth switching element SW3 in the inverter 540 are turned on during a second period, a dc terminal voltage Vdc having a positive polarity may be converted into a negative voltage and the converted voltage may be output.

Accordingly, by the unfolding switching operation, a half-wave voltage or a pulsating voltage Vdcm at both ends of the DC terminal may be converted into an AC voltage Vacm having a frequency corresponding to a system voltage Vac, and the converted voltage may be output.

Figure 14:
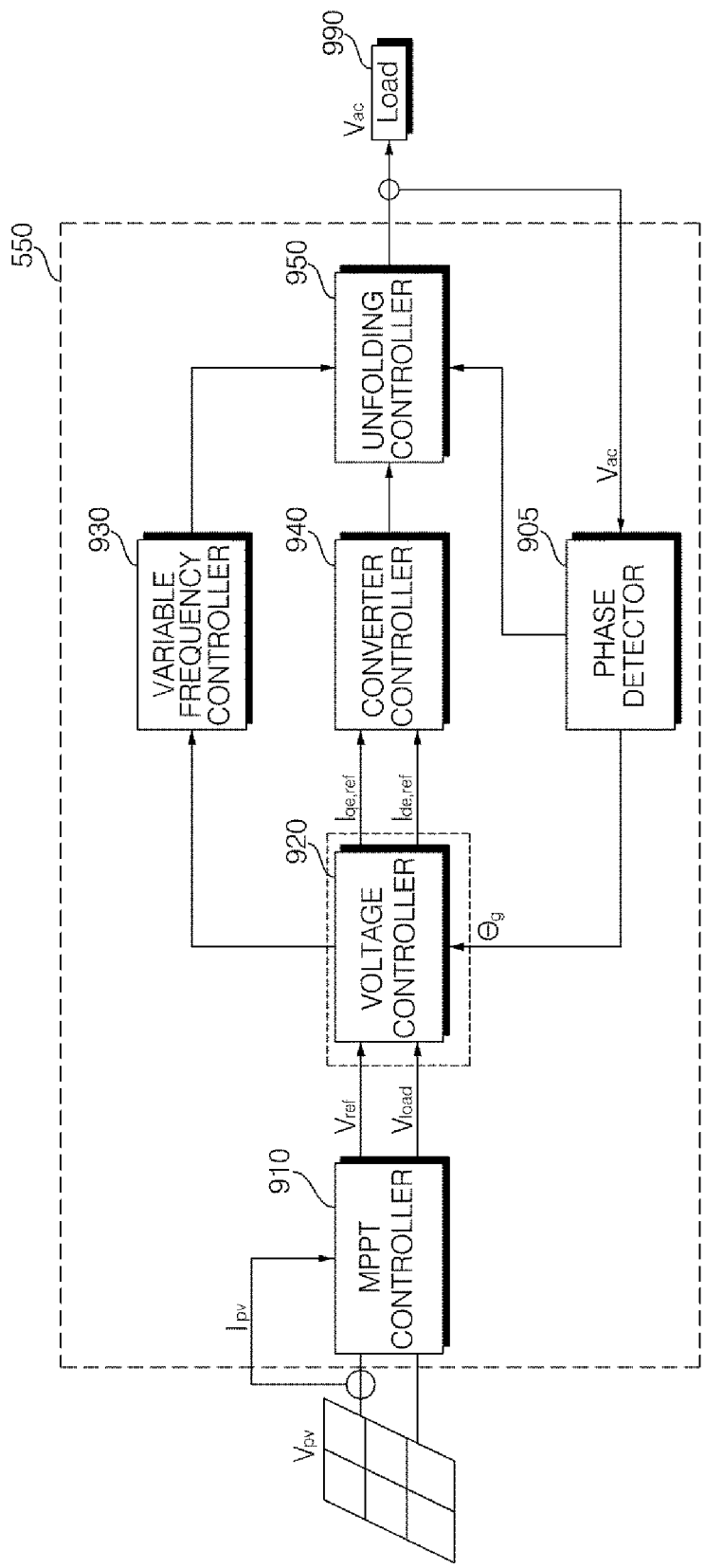
FIG. 14 is an example of an internal block diagram of a controller of FIG. 12.

FIG. 14 illustrates an example of an internal block diagram of the controller of FIG. 12.

Referring to the drawing, the controller 550 may include a voltage controller 920 configured to generate a current reference value for controlling the converter 530 based on the output voltage of the inverter 540 and the voltage reference value; and a converter controller 940 configured to generate a converter switching control signal Scc for controlling the converter 530 based on the current reference value, thereby stably operating the power converting apparatus. In addition, a load operation corresponding to a load may be performed by the operation of the converter 530.

Meanwhile, when restarting the inverter 540, the voltage controller 920 may generate the current reference value for controlling the converter 530 based on a second gain, which is higher than a first gain before the inverter 540 is turned off. Accordingly, it is possible to reduce overvoltage occurring due to a change in load connected to the output terminal of the inverter 540. Further, circuit elements may be protected when there is no filter at the output terminal of the inverter 540.

Meanwhile, the controller 550 may further include a phase detector 905 configured to detect a phase θg based on the output voltage Vac from the output voltage detector F.

The phase θg detected by the phase detector 905 may be input to the voltage controller 920.

Meanwhile, the controller 550 may further include an MPPT controller 910 configured to calculate a maximum power point for the solar cell module 100, and then to generate a voltage reference value Vref for outputting DC power corresponding to the maximum power.

The MPPT controller 910 may calculate the maximum power point based on the input voltage Vpv or the input current Ipv from the input voltage detector A1 or the input current detector A2, and then, may generate the voltage reference value Vref for outputting the DC power corresponding to the maximum power.

Meanwhile, the MPPT controller 910 may output a load voltage Vload.

In this case, the load voltage Vload may be generated based on the output voltage Vac detected by the output voltage detector F.

Meanwhile, the converter controller 920 may compare the load voltage Vload and the voltage reference value Vref, and may generate the d-axis current reference value Ide, ref and q-axis current reference value Iqe, ref based on a difference between the two voltages, and may output the generated values. Further, the converter controller 940 may generate a converter switching control signal Scc based on the input current reference values Ide, ref and Iqe, ref.

In this case, the converter switching control signal Scc may include a full bridge switching control signal Sfb for the full bridge switching element 532 of FIG. 12, and a half bridge switching control signal Shb for the half bridge switching element 538 of FIG. 12.

Meanwhile, the controller 550 may further include a variable frequency controller 930 for varying a switching frequency of the full bridge switching device 532.

For example, if a voltage at both ends of the DC terminal is greater than or equal to a target voltage, the variable frequency controller 930 may control the full bridge switching device 532 to operate in a buck mode and to operate at a first switching frequency; and if a voltage at both ends of the DC terminal is lower than the target voltage, the variable frequency controller 930 may control the half bridge switching device 538 to operate in a boost mode and may control the full bridge switching device 532 and the half bridge switching device 538 to operate at a second switching frequency which is lower than the first switching frequency.

Meanwhile, the controller 550 may further include an unfolding controller 950 for controlling unfolding switching of the inverter 540.

As illustrated in FIG. 13, the unfolding controller 950 may convert a DC terminal voltage Vdc having a positive polarity into a positive voltage by turning on the seventh switching element SW1 and the tenth switching element SW10 during the first period, and may convert the DC terminal voltage Vdc having a positive polarity into a negative voltage by turning on the eighth switching element SW2 and the ninth switching element SW3 in the inverter 540 during the second period.

Accordingly, by the unfolding switching operation, a half-wave voltage or a pulsating voltage Vdcm at both ends of the DC terminal may be converted into an AC voltage Vacm having a frequency corresponding to a system voltage Vac and the converted voltage may be output.

Figure 15A:
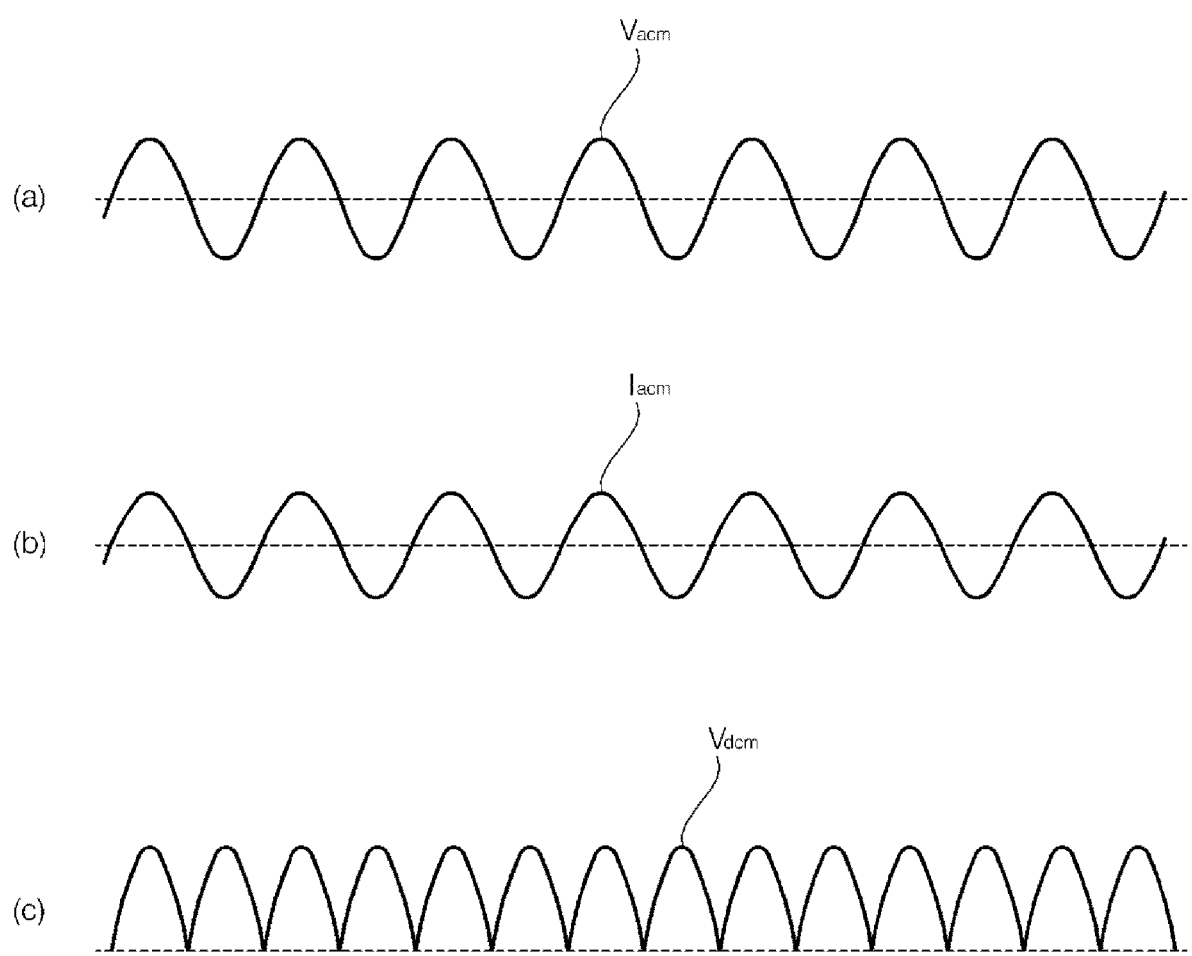
FIGS. 15A and 15B are diagrams referred to in the description of FIG. 14.

FIG. 15A is a diagram illustrating a load voltage Vacm, a load current Iacm, and a DC terminal voltage Vdcm when the load at the output terminal of the inverter 540 is at first power.

Referring to the drawing, if the first power is approximately 300 W, each of the load voltage Vacm and the load current IAcm may correspond to an AC waveform, and the DC terminal voltage Vdcm may correspond to a half-wave pulsating waveform.

Figure 15B:
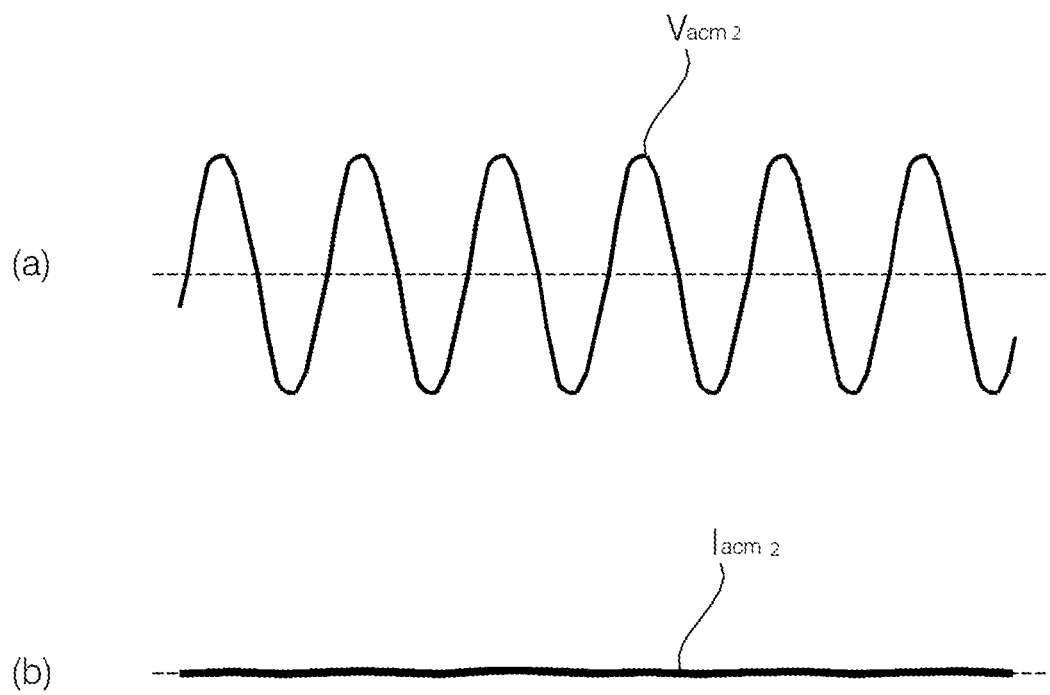

FIG. 15B is a diagram illustrating a load voltage Vacm2 and a load current Iacm2 when no load is connected to the output terminal of the inverter 540.

Referring to the drawing, when a system 90, which is the output terminal of the inverter 540, is powered off such that no load is present, it is desirable to output the load current Iacm2 corresponding to a zero DC level, since there is no load to consume the power flowing through the output terminal of the inverter 540.

In this case, the load voltage Vacm 2 has an AC voltage waveform, but it is desirable that the load current Iacm2 corresponds to an approximately zero DC level.

To this end, as described above, the controller 550 controls the converter 530 using the converter controller 920, and controls the converter 530 to perform an operation according to the load, thereby performing the load operation corresponding to the load. Further, by performing the load operation corresponding to the load, the quality of the output AC power may be improved.

Meanwhile, even when no load is present as the system 90, which is the output terminal of the inverter 540, is powered off, unnecessary power consumption may be reduced.

Meanwhile, the controller 550 of FIG. 12 may change the switching frequency of the full bridge switching device 532 based on the input voltage of the converter 530 or the voltage at both ends of the DC terminal.

Specifically, the controller 550 may control the full bridge switching device 532 to operate in a buck mode or a boost mode according to a voltage level at both ends of the DC terminal.

If a voltage at both ends of the DC terminal is greater than or equal to a target voltage, the controller 550 may control the full bridge switching device 532 to operate in the buck mode and if a voltage at both ends of the DC terminal is lower than the target voltage, the controller 550 may control the half bridge switching device 538 to operate in the boost mode.

Meanwhile, if a voltage at both ends of the DC terminal is greater than or equal to a target voltage, the controller 550 may control the full bridge switching device 532 to operate in the buck mode and to operate at a first switching frequency; and if a voltage at both ends of the DC terminal is lower than the target voltage, the controller 550 may control the half bridge switching device 538 to operate in the boost mode and may control the full bridge switching device 532 and the half bridge switching device 538 to operate at a second switching frequency which is lower than the first switching.

Meanwhile, the switching frequency of the full bridge switching device 532 is preferably higher than a system frequency.

For example, the first switching frequency may be 135 kHz, and the second switching frequency may be 90 KHz. In this embodiment, by performing high-speed switching, circuit elements in the converter 530 may be manufactured in a compact size, particularly the transformer 536 may be reduced in size.

As a result, the ripple of the voltage at both ends of the DC terminal may be reduced by the operation in the buck mode or the boost mode.

Meanwhile, the controller 550 may control some of the plurality of switching elements SW1 to SW4 in the inverter 540 to perform switching with a third switching frequency, and may control the others to perform switching with a fourth switching frequency which is higher than the third switching frequency.

That is, the controller 550 may perform asynchronous pulse width modulation on the inverter 540.

In this case, as the third switching frequency corresponds to the system frequency, and the fourth switching frequency is higher than the system frequency, the inverter 540 may perform high-speed switching, thus allowing the circuit elements in the power converting apparatus to be manufactured in a compact size, such that the power converting apparatus may be reduced in size.

Meanwhile, the controller 550 may control the seventh and eighth switching elements SW1 and SW2 to operate at the fourth switching frequency, and may control the ninth and tenth switching elements SW3 and SW4 to operate at the third switching frequency.

Meanwhile, while the ninth switching element SW3 is turned on, the controller 550 may control the seventh switching element SW1 and the eighth switching element SW2 to perform switching by pulse width modulation; and while the tenth switching element SW4 is turned on, the controller 550 may control the eighth switching element SW2 and the seventh switching element SW1 to perform switching by pulse width modulation.

Meanwhile, among the plurality of switching elements SW1 to SW4 in the inverter 540, some switching elements SW3 and SW4 and the other switching elements SW1 and SW2 may be different types of switching elements.

Meanwhile, among the plurality of switching elements SW1 to SW4 in the inverter 540, the other switching elements SW1 and SW2 may be, for example, switching elements for performing high-speed switching, and may include a Gallium nitride (GaN) transistor or a Silicon carbide (Sic) transistor, thereby reducing reverse recovery loss during the high-speed switching.

Meanwhile, some switching elements SW3 and SW4 among the plurality of switching elements SW1 to SW4 in the inverter 540 may be, for example, switching elements for performing low-speed switching, and may include a Metaloxide semiconductor field-effect transistor (MOSFET).

Figure 16A:
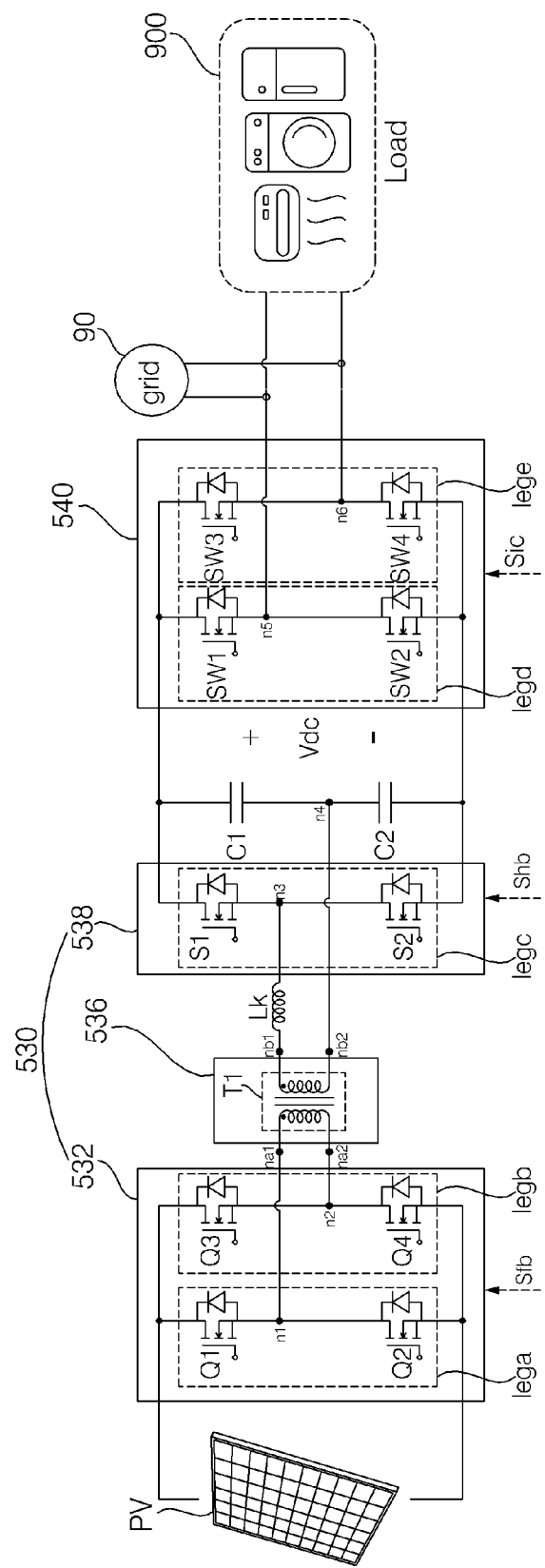
FIGS. 16A to 16C are diagrams referred to in the description of operation of the power converting apparatus of FIG. 12.
Figure 16B:
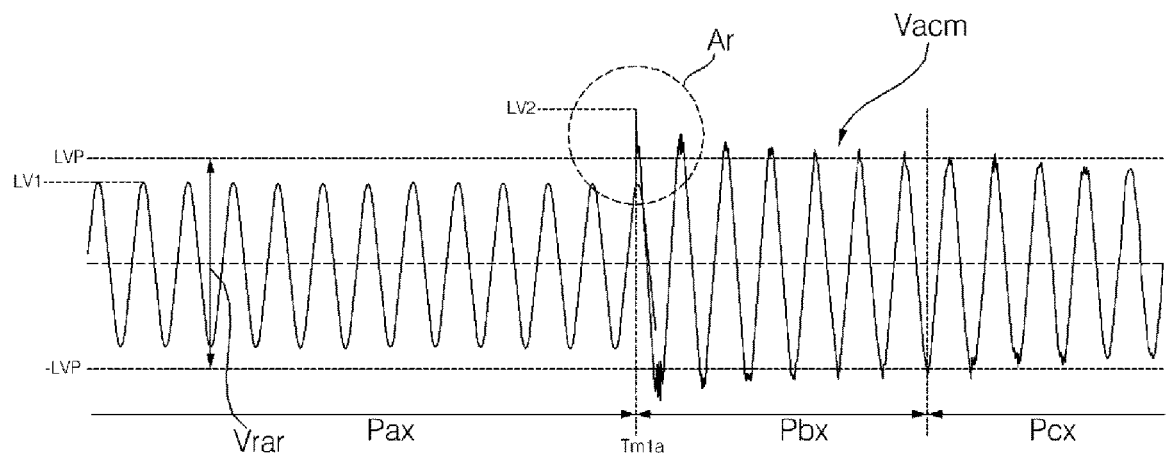
Figure 16C:
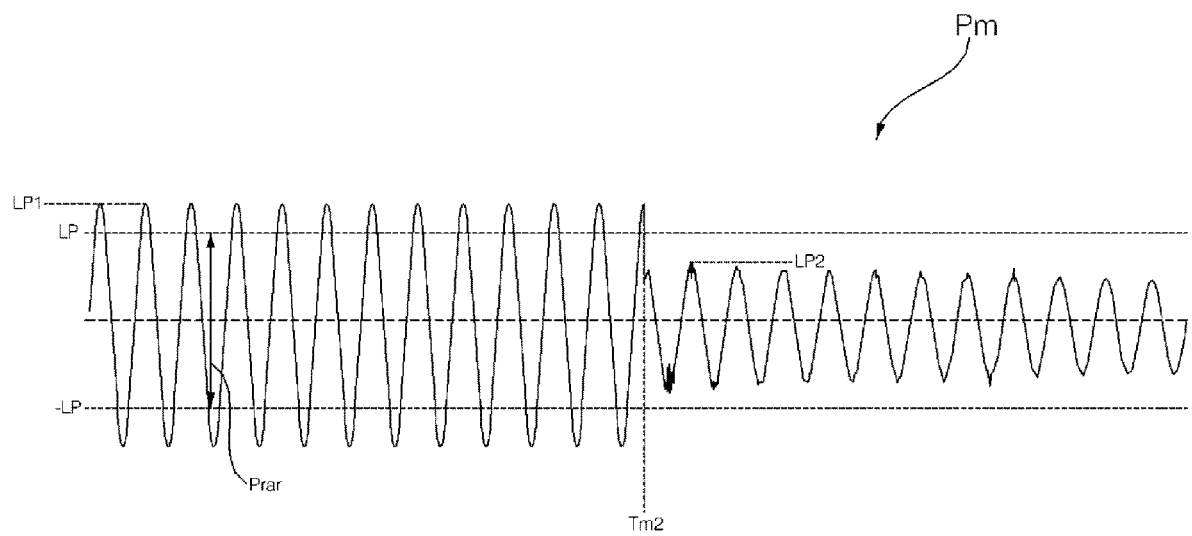

FIGS. 16A to 16C are diagrams referred to in the description of operation of the power converting apparatus of FIG. 12.

FIG. 16A is an example of an internal circuit diagram of a power converting apparatus according to an embodiment of the present disclosure.

Referring to the drawing, the power converting apparatus 500z according to an embodiment of the present disclosure includes: the converter 530 configured to vary a level of input DC power; the inverter 540 configured to convert DC power from the converter 530 into AC power and to output the converted AC power to an internal power grid or the system; and the controller 550 configured to control the converter 530 and the inverter 540.

In this case, a filter, including an inductor, a capacitor, etc., is not provided at the output terminal of the inverter 540. Accordingly, the power converting apparatus 500z may be reduced in size, thereby reducing unnecessary consumption of the output power.

The converter 530 may include: the full bridge switching device 532 configured to convert the input DC power Vpv; the transformer 536 having an input side connected to the output terminal of the full bridge switching device 532 and configured to output the converted voltage; and the half bridge switching device 538 electrically connected to the output side of the transformer 536.

The full bridge switching device 532 may include the first leg lega including the first switching element Q1 and the second switching element Q2 which are connected in series to each other; and the second leg legb including the third switching element Q3 and the fourth switching element Q4 which are connected in series to each other.

The half bridge switching device 538 may include a third leg legc including the fifth switching element S1 and the sixth switching element S2 which are connected in series to each other.

Meanwhile, the converter 530 may further include the half bridge switching device 538 connected to the output side of the transformer 536 and the resonant inductor Lk connected between the transformer 536 and the half bridge switching device 538.

Accordingly, the converter 530 may output the half-wave voltage or the pulsating voltage to the DC terminal by changing the level of the input DC voltage Vpv.

The inverter 540 may further include a fourth leg legd including seventh and eighth switching elements SW1 and SW2 which are connected in series to each other; and a fifth leg lege including ninth and tenth switching elements SW3 and SW4 which are connected in series to each other.

Meanwhile, by the unfolding switching operation, the inverter 540 may convert the half-wave voltage or the pulsating voltage Vdcm at both ends of the DC terminal into an AC voltage Vacm having a frequency corresponding to the system voltage Vac and may output the converted voltage.

The output terminal of the inverter 540 is electrically connected to the internal power grid or the system 90, and the output voltage output by the inverter 540 may be supplied to the load 900 in the internal power grid or to the system 90. FIG. 16B illustrates an example of a waveform Vacm of the output voltage of the inverter 540.

Referring to the drawing, an example is illustrated in which the output voltage of the inverter 540 is maintained within a first range Vrar between LVP and −LVP during a period Pax.

For example, if a level of the load 900 in the internal power grid is a first level, the output voltage of the inverter 540 may be maintained within the first range Vrar as illustrated in FIG. 16B.

Meanwhile, at a time point Tm1a, if a level of the load 900 in the internal power grid decreases to a second level which is much lower than the first level, no filter is disposed at the output terminal of the inverter 540, such that the output voltage of the inverter 540 rises sharply.

In the drawing, the level of the output voltage of the inverter 540 at the time point Tm1a is Lv2 which is outside the first range Vrar. Particularly, in a region Ar, the level of the output voltage of the inverter 540 is Lv2 which is outside the first range Vrar.

Further, during a period Pbx, the level of the output voltage of the inverter 540 may fall outside the first range Vrar.

During a period Pcx after the period Pbx, the level of the output voltage of the inverter 540 may be maintained within the first range Vrar again.

Meanwhile, as the period Pbx increases, i.e., as the period when the level of the output voltage of the inverter 540 falls outside the first range Vrar increases, the possibility of burnout of the respective circuit elements in the power converting apparatus 500z may increase.

Accordingly, the present disclosure provides a method of reducing the possibility of burnout of the respective circuit elements in the power converting apparatus 500z, which will be described later with reference to FIG. 17 and the following figures.

FIG. 16C illustrates an example of a waveform Pm of output power of the inverter 540.

Referring to the drawing, the output power of the inverter 540 falls outside a second range Prar between the LP and −LP until the time point Tm2. Accordingly, the output power may be output stably.

Meanwhile, at the time point Tm2, if the level of the load 900 in the internal power grid decreases to a second level which is much lower than the first level, no filter is disposed at the output terminal of the inverter 540, such that the output power of the inverter 540 decreases sharply.

In the drawing, the level of the output power of the inverter 540 at the time point Tm2 is maintained within the second range Prar, particularly, a peak level of the output power of the inverter 540 is Lp2 after the time point Tm2.

Meanwhile, at the time point Tm2, if the level of the output power of the inverter 540 decreases sharply, the possibility of burnout of the respective circuit elements in the power converting apparatus 500z may increase.

Accordingly, the present disclosure provides a method of reducing the possibility of burnout of the respective circuit elements in the power converting apparatus 500z, when the level of the output power of the inverter 540 decreases sharply while no filter is disposed at the output terminal of the inverter 540, which will be described below with reference to FIG. 17 and the following figures.

Figure 17:
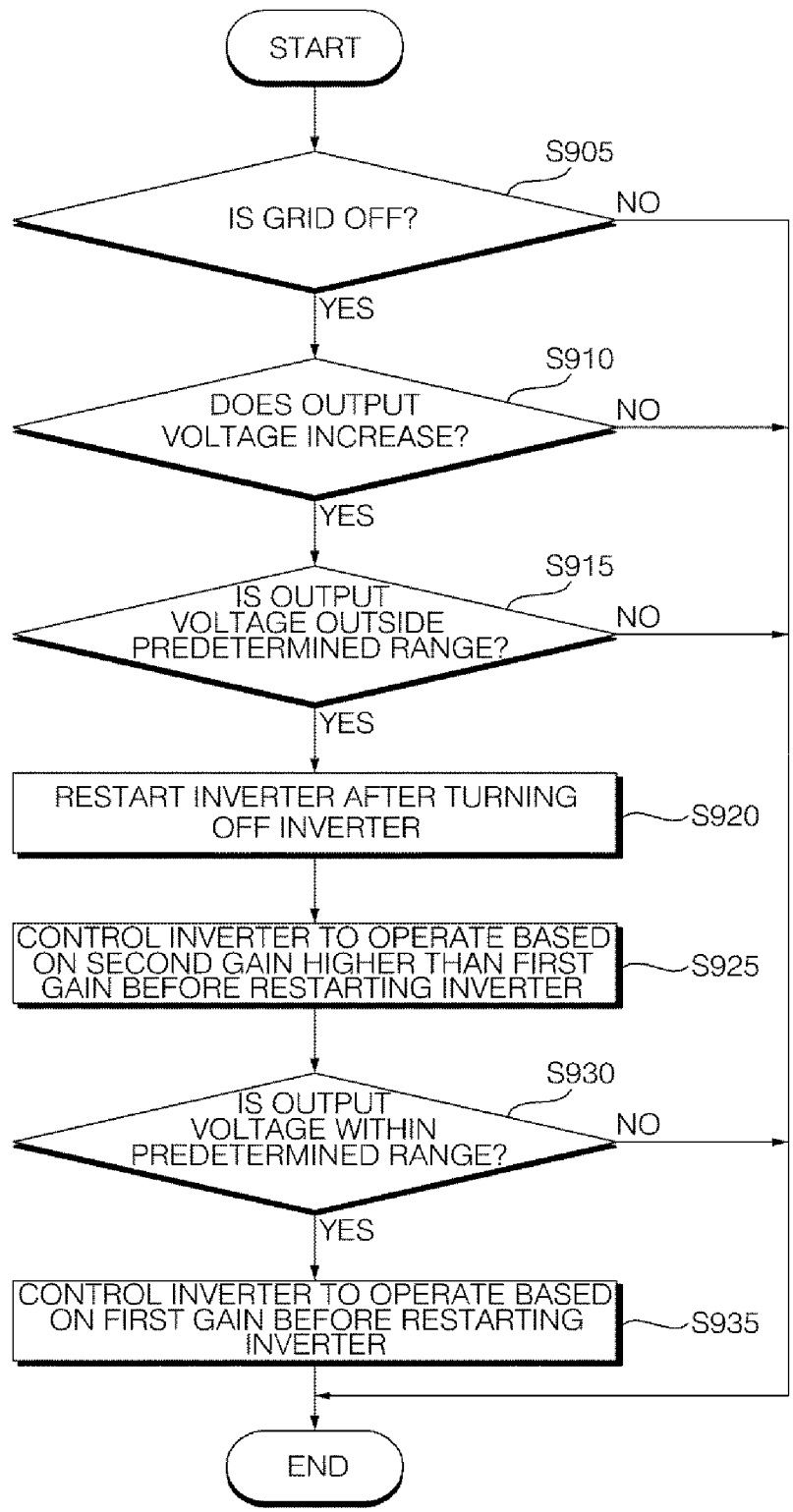
FIG. 17 is a flowchart illustrating a method of operating a power converting apparatus according to an embodiment of the present disclosure.

FIG. 17 is a flowchart illustrating a method of operating a power converting apparatus according to an embodiment of the present disclosure.

Referring to the drawing, the controller 550 in the power converting apparatus 500z according to an embodiment of the present disclosure determines whether a grid is turned off (S905).

For example, the controller 550 in the power converting apparatus 500z may receive grid-off information or power-off information from a communicator (not shown) and may determine whether the grid 90 is turned off based on the received information.

In another example, the controller 550 in the power converting apparatus 500z may determine whether the grid 90 is turned off, based on the level of the output voltage, detected by the output voltage detector A, while the operation of the inverter 540 is stopped.

Specifically, while the operation of the inverter 540 is stopped, if the level of the output voltage detected by the output voltage detector A is lower than or equal to a reference level, the controller 550 may determine that the grid 90 is turned off or powered off.

Meanwhile, when the inverter 540 is in operation while the grid is off or powered off, the controller 550 in the power converting apparatus 500z may determine whether the output voltage increases (S910), and if so, the controller 550 may determine whether the output voltage falls outside or within a predetermined range, e.g., a first range (S915).

For example, when the inverter 540 is in operation while the grid is turned off or powered off, if a level of the load 900 of FIG. 16A decreases sharply from the first level to the second level, the controller 550 in the power converting apparatus 500z may determine whether the level of the load decreases sharply, by using the output voltage.

Meanwhile, if the output voltage falls outside the first range, the controller 550 in the power converting apparatus 500z may determine that the level of the load 900 decreases sharply from the first level to the second level, and may restart the inverter 540 after turning off the inverter 540 (S920).

Then, when restarting the inverter 540, the controller 550 in the power converting apparatus 500z may control the inverter 540 to operate based on the second gain which is higher than the first gain (S925). Accordingly, when restarting the inverter 540 due to a sudden load change, the controller 550 may stably operate the inverter 540.

Meanwhile, after restarting the inverter 540, the controller 550 in the power converting apparatus 500z may operate the inverter 540 based on the second gain, and then may determine whether the output voltage, output from the inverter 540, falls within the first range Vrar (S930). If the output voltage output from the inverter 540 is within the first range Vrar, the controller 550 may control the inverter 540 to operate based on the first gain (S935). Accordingly, when restating the inverter 540 due to a sudden load change, the controller 550 may stably operate the inverter 540.

Figure 18A:
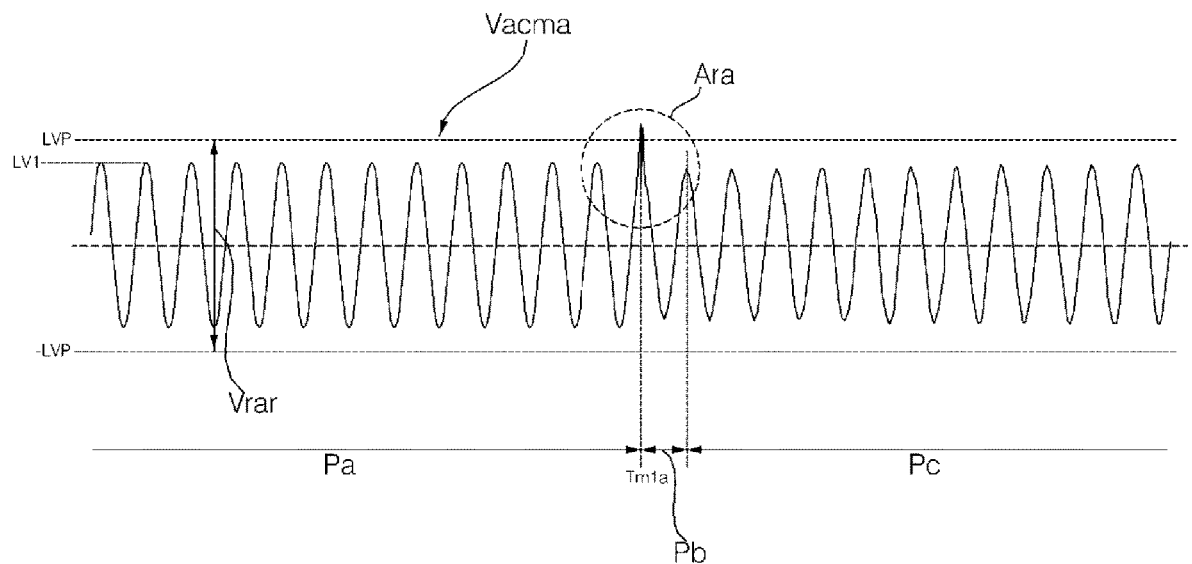
FIGS. 18A and 18B are diagrams referred to in the description of FIG. 17.
Figure 18B:
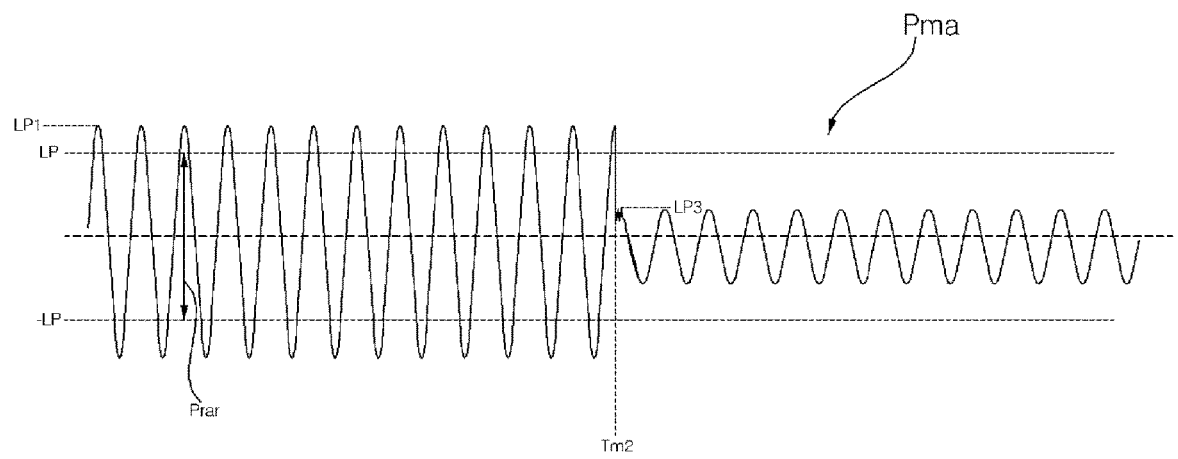

FIGS. 18A and 18B are diagrams referred to in the description of FIG. 17.

First, FIG. 18A illustrates a waveform Vacma of the output voltage of the inverter 540.

Referring to the drawing, an example is illustrated in which the output voltage of the inverter 540 is maintained within the first range Vrar between LVP and −LVP during the period Pa.

For example, if a level of the load 900 in the internal power grid of FIG. 16A is the first level, the output voltage of the inverter 540 may be maintained within the first range Vrar as illustrated in FIG. 18A.

Meanwhile, at the time point Tm1a, if the level of the load 900 in the internal power grid decreases to a second level which is much lower than the first level, no filter is disposed at the output terminal of the inverter 540, such that the output voltage of the inverter 540 rises sharply.

In the drawing, an example is illustrated in which the level of the output voltage of the inverter 540 falls outside the first range Vrar. Particularly, in a region Ara, the level of the output voltage of the inverter 540 falls outside the first range Vrar.

That is, the level of the output voltage of the inverter 540 may fall outside the first range Vrar during a period Pb. If the output voltage output from the inverter 540 increases to a level outside the first range Vrar at the time point Tm1a, the controller 550 may restart the inverter 540 after turning off the inverter 540.

Accordingly, the level of the output voltage of the inverter 540 may be maintained within the first range Vrar again during a period Pc after the period Pb.

Meanwhile, when restarting the inverter 540 during the period Pb, the controller 550 may control the inverter 540 to operate based on the second gain which is higher than the first gain before the inverter 540 is turned off. Accordingly, when restating the inverter 540 due to a sudden load change, the controller 550 may stably operate the inverter 540.

Meanwhile, after restarting the inverter 540, the controller 550 in the power converting apparatus 500z may operate the inverter 540 based on the second gain, and then if the output voltage, output from the inverter 540, falls within the first range Vrar, the controller 550 may control the inverter 540 to operate based on the first gain. Accordingly, when restating the inverter 540 due to a sudden load change, the controller 550 may stably operate the inverter 540.

When the output voltage falls outside the first range Vrar at the time point Tm1a, if a peak of the output voltage increases, the controller 550 may increase a level of the second gain after restarting the inverter 540. Accordingly, when restating the inverter 540 due to a sudden load change, the controller 550 may operate the inverter 540 rapidly and stably.

Meanwhile, when the output voltage falls outside the first range Vrar at the time point Tm1a, if a peak of the output voltage increases, the controller 550 may increase a period Pb of operation at the second gain after restarting the inverter 540. Accordingly, when restating the inverter 540 due to a sudden load change, the controller 550 may operate the inverter 540 rapidly and stably.

Meanwhile, after restarting the inverter 540, if the output voltage output from the inverter 540 is within the first range Vrar, i.e., during the period Pc, the controller 550 may control the inverter 540 to operate based on a gain equal to the first gain before the inverter 540 is turned off. Accordingly, when restating the inverter 540 due to a sudden load change, the controller 550 may stably operate the inverter 540.

Meanwhile, after restarting the inverter 540, if the output voltage output from the inverter 540 is within a predetermined range, the controller 550 may control the inverter 540 to operate based on a gain lower than the gain after restarting the inverter 540.

That is, the controller 550 may control the gain during the period Pb to be lower than the gain during the period Pc. Accordingly, when restating the inverter 540 due to a sudden load change, the controller 550 may stably operate the inverter 540.

Meanwhile, while the system is powered off, if the output voltage output from the inverter 540 increases to a level outside the first range Vrar, the controller 550 may turn off the inverter 540 and then may restart the inverter 540. Accordingly, when restating the inverter 540 due to a sudden load change, the controller 550 may stably operate the inverter 540.

Meanwhile the first gain, the second gain, and the like described above may be gains used in the voltage controller 920.

That is, when restarting the inverter 540, the voltage controller 920 may generate current reference values for controlling the converter 530 based on the second gain which is higher than the first gain before the inverter 540 is turned off.

FIG. 18B illustrates an example of a waveform Pma of output power of the inverter 540.

Referring to the drawing, an example is illustrated in which the output power of the inverter 540 falls outside the second range Prar between LP and −LP until the time point Tm2, thereby stably outputting the output power.

Meanwhile, at the time point Tm2, if a level of the load 900 in the internal power grid decreases to the second level which is much lower than the first level, no filter is disposed at the output terminal of the inverter 540, such that the output power of the inverter 540 decreases sharply.

Accordingly, at the time point Tm2, if the output power output from the inverter 540 increases to a level within the second range Prar, the controller 550 may restart the inverter

540 after turning off the inverter 540. Accordingly, when restating the inverter 540 due to a sudden load change, the controller 550 may stably operate the inverter 540.

Figure 19:
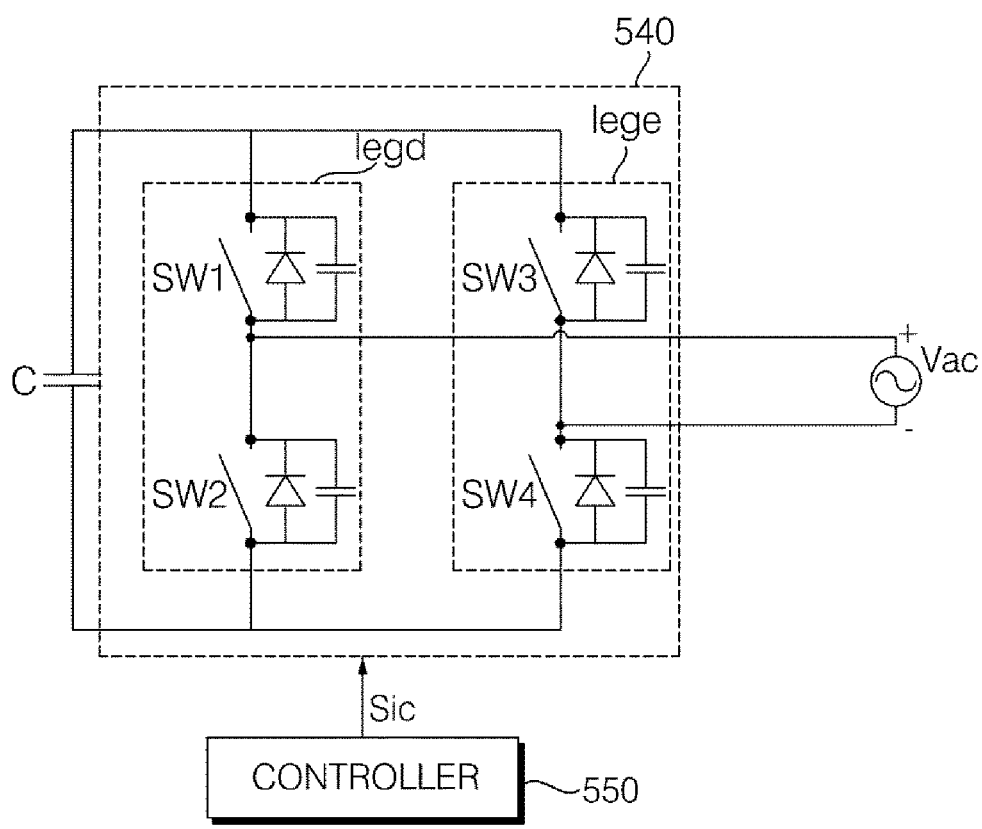
FIG. 19 is a circuit diagram of a power converting apparatus according to an embodiment of the present disclosure.

FIG. 19 is a circuit diagram of a power converting apparatus according to an embodiment of the present disclosure; and FIGS. 20A to 22C are diagrams referred to in the description of the power converting apparatus of FIG. 19.

Referring to FIG. 19, the power converting apparatus 500z according to an embodiment of the present disclosure may include the inverter 540, the controller 550 configured to control the inverter 540, and the filter 570.

The inverter 540 may include the fourth leg legd including the seventh and eighth switching elements SW1 and SW2 which are connected in series to each other; and the fifth leg lege including the ninth and tenth switching elements SW 3 and SW4 which are connected in series to each other. In this case, the fourth leg legd and the fifth leg lege are connected in parallel to each other.

Meanwhile, according to an embodiment of the present disclosure, the controller 550 performs asynchronous pulse width modulation in which switching frequencies of the fourth leg legd and the fifth lege of the inverter 540 are different, and at a zero-crossing point of the output voltage of the inverter 540, the controller 550 may turn off the switching elements SW3 and SW4 in the fifth leg lege and may control the seventh switching element SW1 or the eighth switching element SW2 to perform switching.

Meanwhile, the controller 550 may control the switching frequency of the seventh switching element SW1 and the eighth switching element SW2 in the fourth leg legd to be greater than the switching frequency of the ninth switching element SW3 and the tenth switching element SW4 in the fifth leg lege.

Meanwhile, the controller 550 may control the switching frequency of the ninth switching element SW3 and the tenth switching element SW4 in the fifth leg lege to be equal to the system frequency.

For example, the switching frequency of the fourth leg legd, which is a high-speed switching frequency, may be in a range of several kHz to several hundreds of kHz higher than the system frequency of 50 Hz or 60 Hz.

Meanwhile, the switching frequency of the fifth leg lege, which is a low-speed switching frequency, may be equal to the system frequency of 50 Hz or 60 Hz.

Meanwhile, according to an embodiment of the present disclosure, while performing asynchronous pulse width modulation, in order to prevent the generation of a peak current near the zero-crossing point of the output voltage of the inverter 540 when the switching elements SW1 to SW4 of the inverter 540 are turned off, the controller 550 may turn off the switching elements SW3 and SW4 in the fifth leg lege, and may control the seventh switching element SW1 or the eighth switching element SW2 to perform switching.

Accordingly, the quality of the output AC power may be improved. Particularly, while performing asynchronous pulse width modulation, current distortion of the output AC power may be improved. In addition, the controller 550 may control a power factor while performing asynchronous pulse width modulation.

Meanwhile, the controller 550 may perform asynchronous pulse width modulation in which switching frequencies of the fourth leg legd and the fifth lege of the inverter 540 are different, and at a zero-crossing point (Tzca of FIGS. 20A and 20B, or Tzcb of FIGS. 21A and 21B) of the output voltage of the inverter 540, at which the output voltage of the inverter 540 changes from a positive polarity to a negative polarity, the controller 550 may turn off the switching elements SW3 and SW4 in the fifth leg lege and may control the seventh switching element SW1 or the eighth switching element SW2 to perform switching. Accordingly, while performing asynchronous pulse width modulation, current distortion of the output AC power may be improved.

During a period between the first time point when the tenth switching element SW4 is turned off and the second time point when the ninth switching element SW3 is turned on, the controller 550 may control the inverter 540 to operate in a freewheeling mode. Accordingly, while performing asynchronous pulse width modulation, current distortion of the output AC power may be improved.

Meanwhile, during a period between the first time point when the tenth switching element SW4 is turned off and the second time point when the ninth switching element SW3 is turned on, the controller 550 may control the seventh switching element SW1 or the eighth switching element SW2 to perform switching. Accordingly, while performing asynchronous pulse width modulation, current distortion of the output AC power may be improved.

Figure 20A:
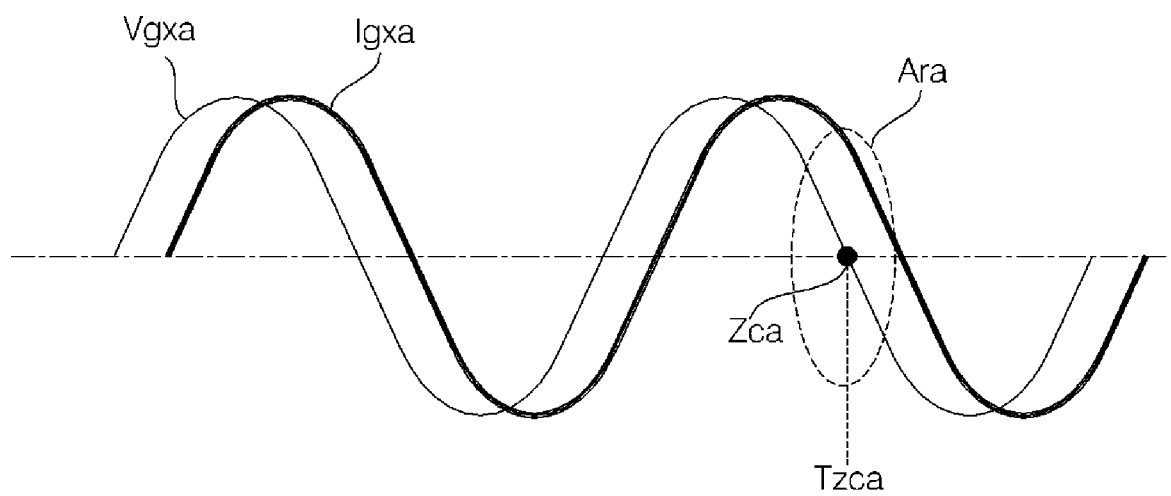
FIGS. 20A to 22C are diagrams referred to in the description of the power converting apparatus of FIG. 19.

FIG. 20A illustrates an example in which a current Igxa output from the inverter 540 lags behind a voltage Vgxa.

Meanwhile, as illustrated herein, the output voltage Vgxa output from the inverter 540 may cross zero at a point Zca. Particularly, the point Zca corresponds to a point where the output voltage Vgxa changes from a positive voltage to a negative voltage.

The inverter output voltage detector F may detect a voltage vc3 output from the inverter 540, and may particularly detect the zero-crossing point Zca of the voltage vc3 output from the inverter 540.

Figure 20B:
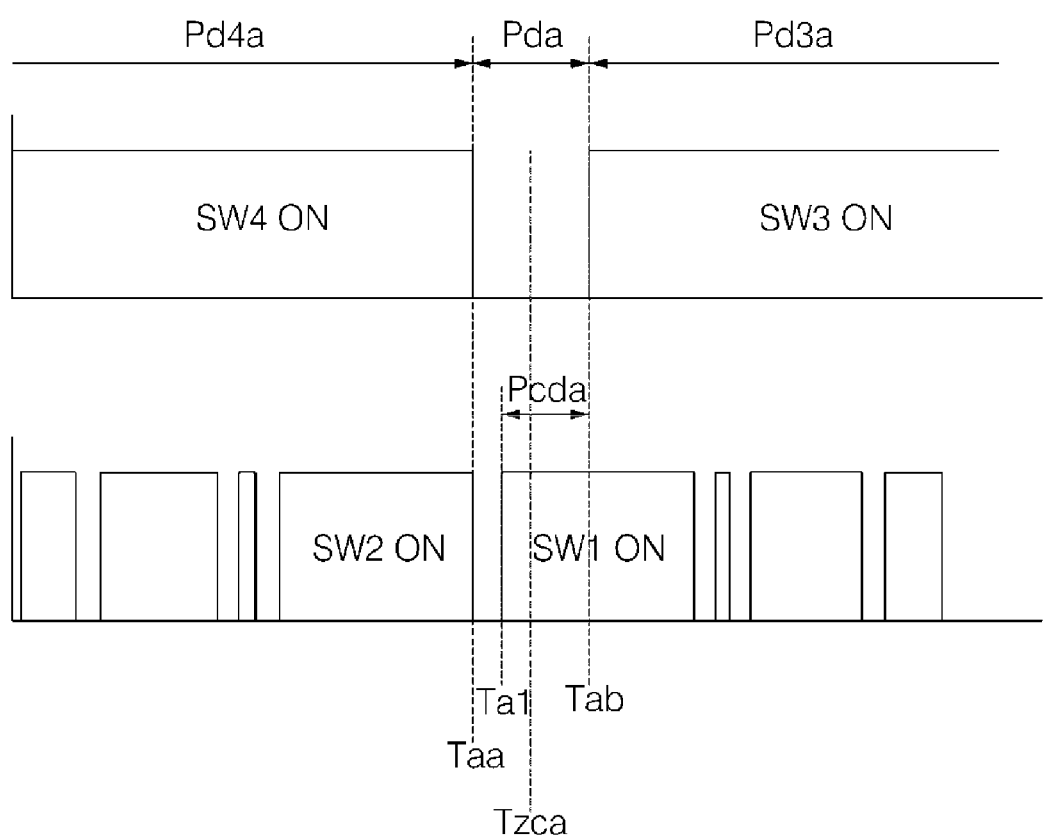

FIG. 20B illustrates a switching waveform of the switching elements of the inverter 540 when the current output from the inverter 540 is a lagging current.

Referring to the drawing, in the case where the current output from the inverter 540 is a lagging current, the controller 550 may control the seventh switching element SW1 to be turned on and to perform switching during a period Pda from a first time point Taa when the tenth switching element SW4 is turned off to a second time point Tbb when the ninth switching element SW3 is turned on, as illustrated in FIG. 20B. In the drawing, an example is illustrated in which the seventh switching element SW1 is turned on and performs switching at the time point Ta1 during the period Pda from the first time point Taa to the second time point Tbb when the ninth switching element SW3 is turned on.

Based on the example, in comparison with FIG. 3B, the seventh switching element SW1 is turned on and performs switching during the period Pda, during which switching has not been performed in the inverter 540.

Meanwhile, during periods Pd4a and Pd3a corresponding to a power supply mode for outputting AC power to the outside, a current path is formed by the switching operation of the respective switching elements which are turned on.

Figure 20C:
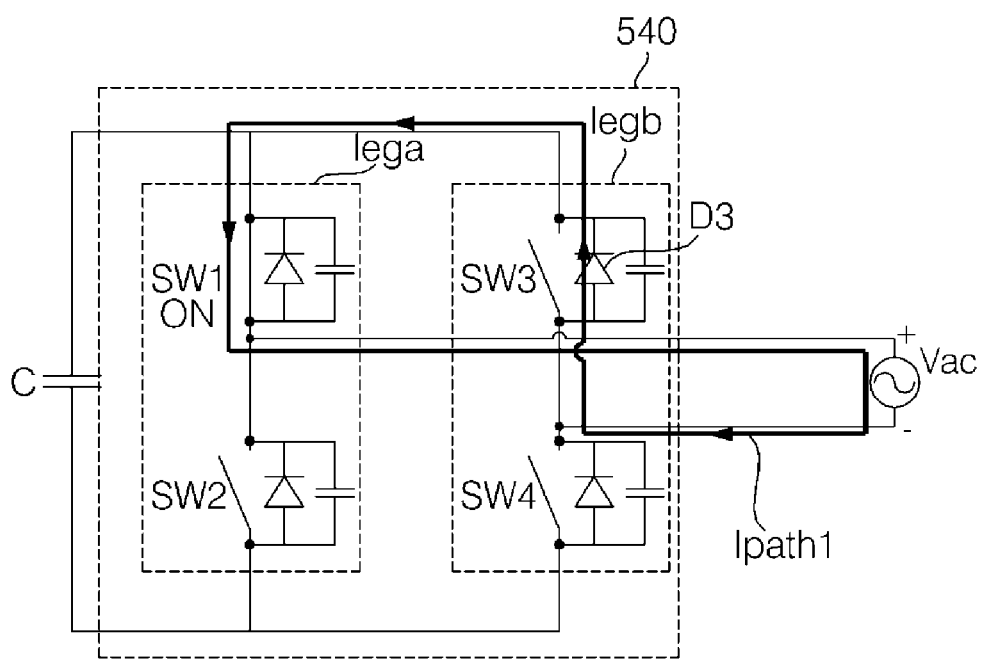
Figure 20D:
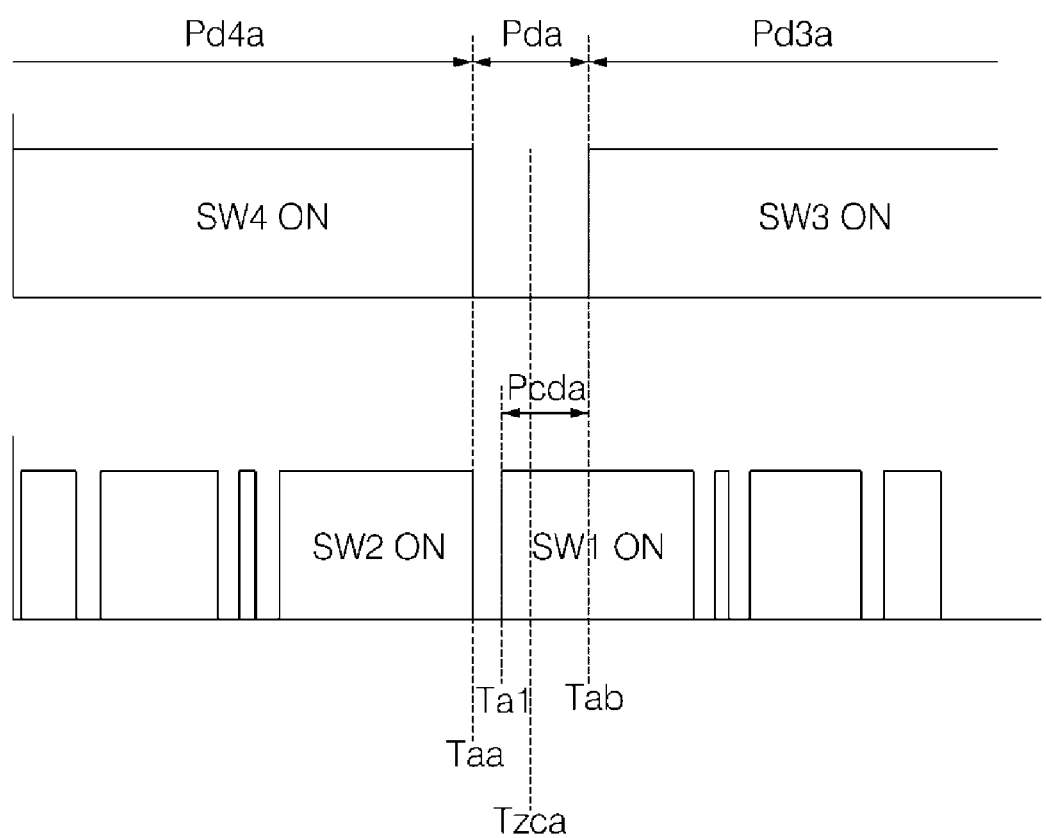

Further, during the period Pda, the freewheeling mode is performed such that a first current path path1 may be formed by a diode D3 which is connected in parallel to the seventh switching element SW1 and the ninth switching element SW3, as illustrated in FIG. 20C or FIG. 20D.

That is, as illustrated in FIG. 20A, if the current output from the inverter 540 is a lagging current, the controller 550 may control the first current path path1 to be formed by the diode D3 connected in parallel to the seventh switching element SW1 and the ninth switching element SW3.

Figure 20E:
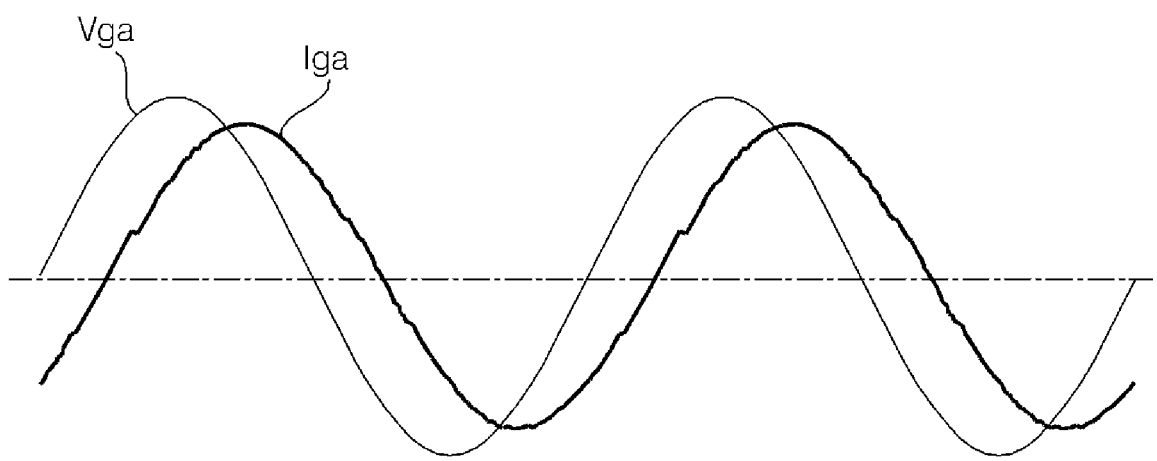

Accordingly, by controlling a power factor while performing asynchronous pulse width modulation control, the controller 550 may improve the current distortion of the output AC power, as illustrated in FIG. 20E. Particularly, the current distortion of the output AC power during the period Pda may be improved.

FIG. 20E illustrates an example in which a peak current is eliminated from a lagging current waveform Iga and a voltage waveform Vga, thereby improving the quality of current and voltage.

Meanwhile, if a current output from the inverter 540 is a lagging current, the controller 550 may control the eighth switching element SW2 to be turned off at the first time point Taa. Accordingly, by controlling a power factor while performing asynchronous pulse width modulation control, the controller 550 may improve the current distortion of the output AC power.

Meanwhile, the controller 550 may control a switching frequency of the seventh switching element SW1 or the eighth switching element SW2 to be greater than switching frequencies of the ninth switching element SW3 and the tenth switching element SW4 during a period Pda between the first time point Taa when the tenth switching element SW4 is turned off and the second time point Tbb when the ninth switching element SW3 is turned on. Accordingly, while performing asynchronous pulse width modulation control, the controller 550 may improve the current distortion of the output AC power.

Meanwhile, as illustrated in FIG. 2, the power converting apparatus 500z according to an embodiment of the present disclosure may further include the output voltage detector F configured to detect an output voltage Vc3 which is output from the inverter 540, and the output current detector E configured to detect an output current Ic3 which is output from the inverter 540, thereby controlling a power factor while performing asynchronous pulse width modulation control.

Meanwhile, the controller 550 may calculate a power factor based on the output voltage and the output current, thereby controlling the power factor while performing asynchronous pulse width modulation control.

For example, during the periods Pd4a and Pd3a, the controller 550 may adjust the power factor between the voltage and current which are output from the inverter 540.

Specifically, during the period Pd4a, the tenth switching element SW4 is turned on and the ninth switching element SW3 is turned off, and the seventh switching element SW1 and the eighth switching element SW2 are alternately switched.

Meanwhile, during the period Pd3a, the tenth switching element SW4 is turned off and the ninth switching element SW3 is turned on, and the seventh switching element SW1 and the eighth switching element SW2 are alternately switched.

Meanwhile, during the period Pda, the controller 550 may adjust the power factor between the voltage and current which are output from the inverter 540.

Meanwhile, the controller 550 may vary the switching frequencies of the seventh switching element SW1 and the eighth switching elements SW2 in the fourth leg legd based on the calculated power factor, thereby controlling the power factor while performing asynchronous pulse width modulation control.

Meanwhile, based on the calculated power factor, the controller 550 may vary a switching timing of the seventh switching element SW1 or the eighth switching element SW2 during the period Pda between the first time point Taa when the tenth switching element SW4 is turned off and the second time point Tbb when the ninth switching element SW3 is turned on.

For example, as the power factor decreases, the controller 550 may control Ta1, which is the switching timing of the seventh switching element SW1 or the eighth switching element SW2, to be closer to the time point Taa. Accordingly, by controlling the power factor while performing asynchronous pulse width modulation control, the controller 550 may improve the current distortion of the output AC power.

Figure 21A:
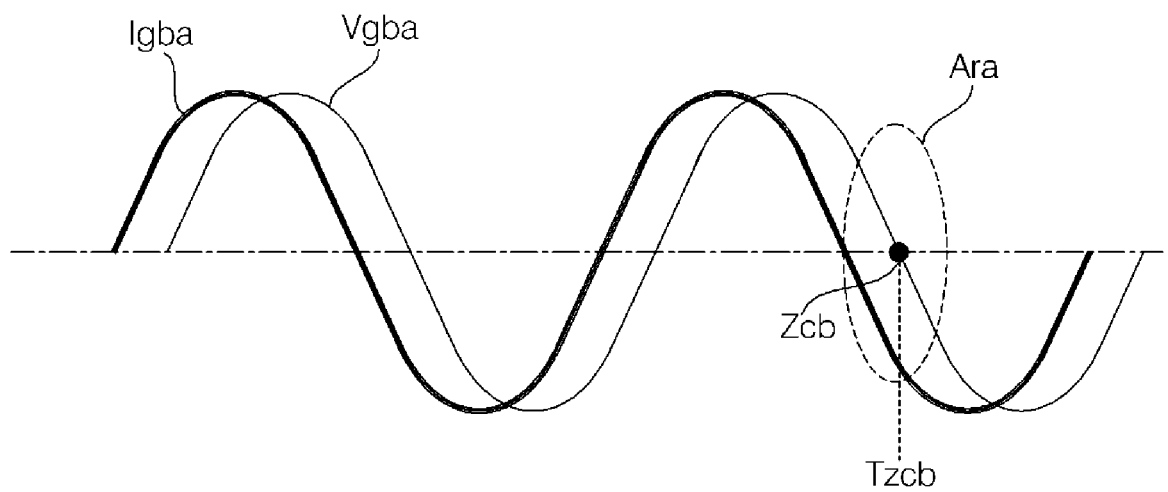

FIG. 21A is a diagram illustrating a case in which a current Igba output from the inverter 540 is a leading current that leads a voltage Vgba.

Meanwhile, as illustrated herein, the output voltage Vgba output from the inverter 540 may cross zero at a point Zcb. Particularly, the point Zcb corresponds to a point where the output voltage Vgba output from the inverter 540 changes from a positive voltage to a negative voltage.

The inverter output voltage detector F may detect a voltage vc3 output from the inverter 540, and may particularly detect the zero-crossing point Zcb of the voltage vc3 output from the inverter 540.

Figure 21B:
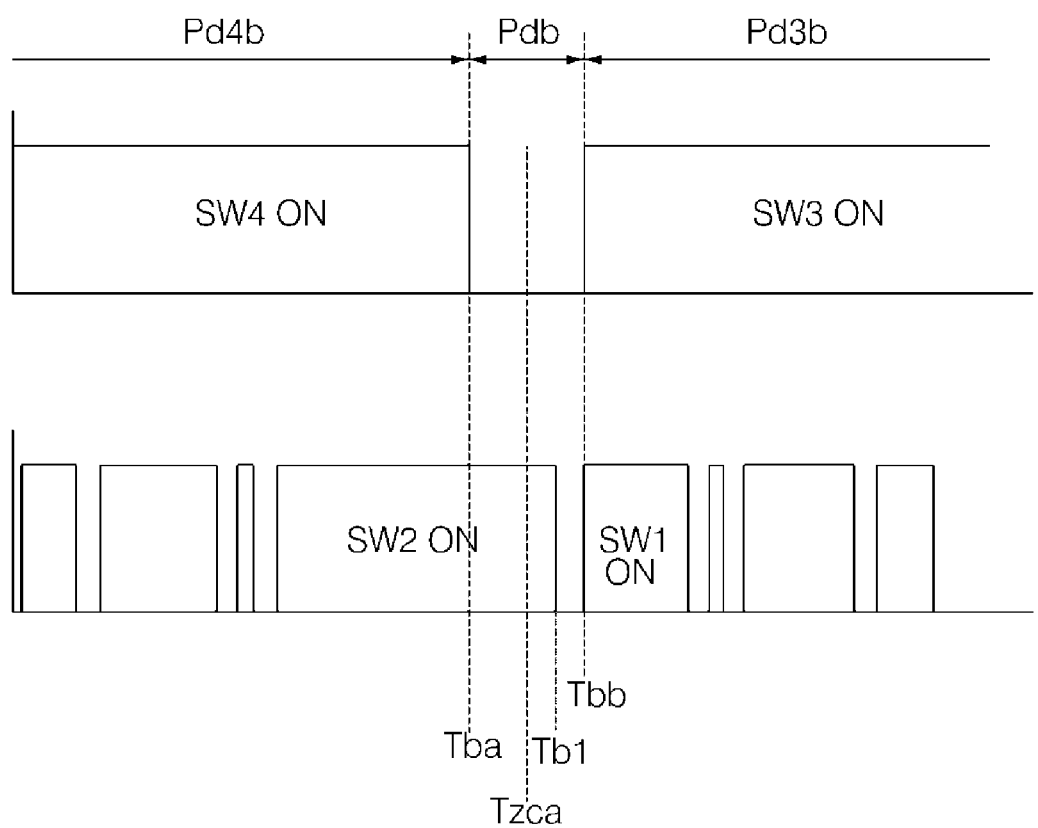

FIG. 21B illustrates a switching waveform of the switching elements of the inverter 540 in the case where the current output from the inverter 540 is the leading current.

Referring to the drawing, in the case where the current output from the inverter 540 is the leading current, the controller 550 may control the eighth switching element SW2 to be turned on and perform switching during a period Pdb from a first time point Tab when the tenth switching element SW4 is turned off to a second time point Tbb when the ninth switching element SW3 is turned on.

In the drawing, an example is illustrated in which the eighth switching element SW2 continuously performs switching during the period Pdb from the first time point Tba to the second time point Tbb when the ninth switching element SW3 is turned on.

Based on the example, in comparison with FIG. 3B, the eighth switching element SW2 performs switching during the period Pdb, during which switching has not been performed in the inverter 540.

Meanwhile, during periods Pd4b and Pd3b corresponding to a power supply mode for outputting AC power to the outside, a current path is formed by the switching operation of the respective switching elements which are turned on.

Figure 21C:
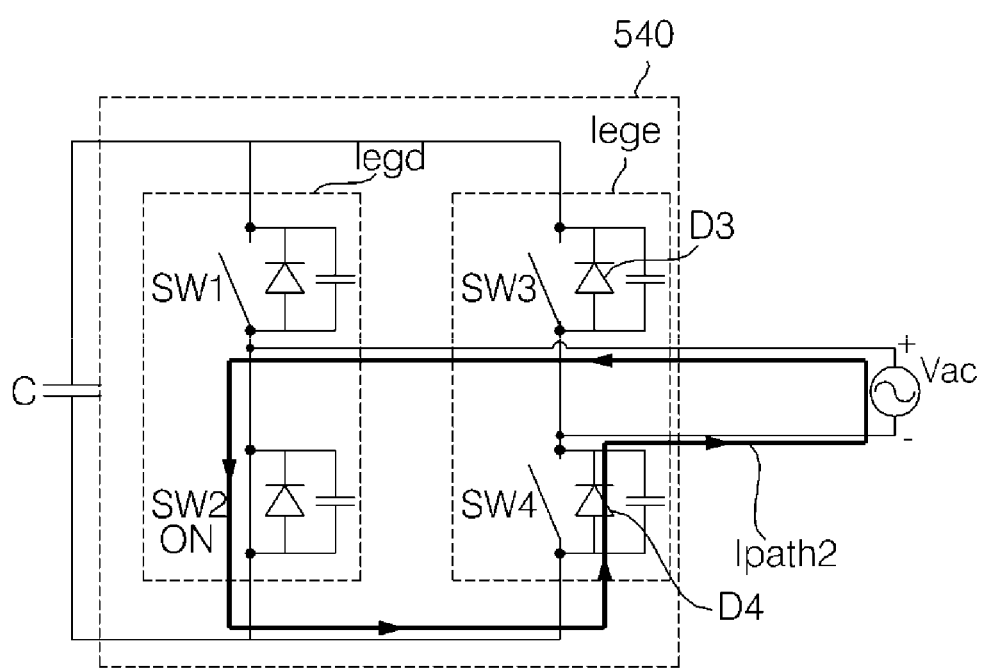
Figure 21D:
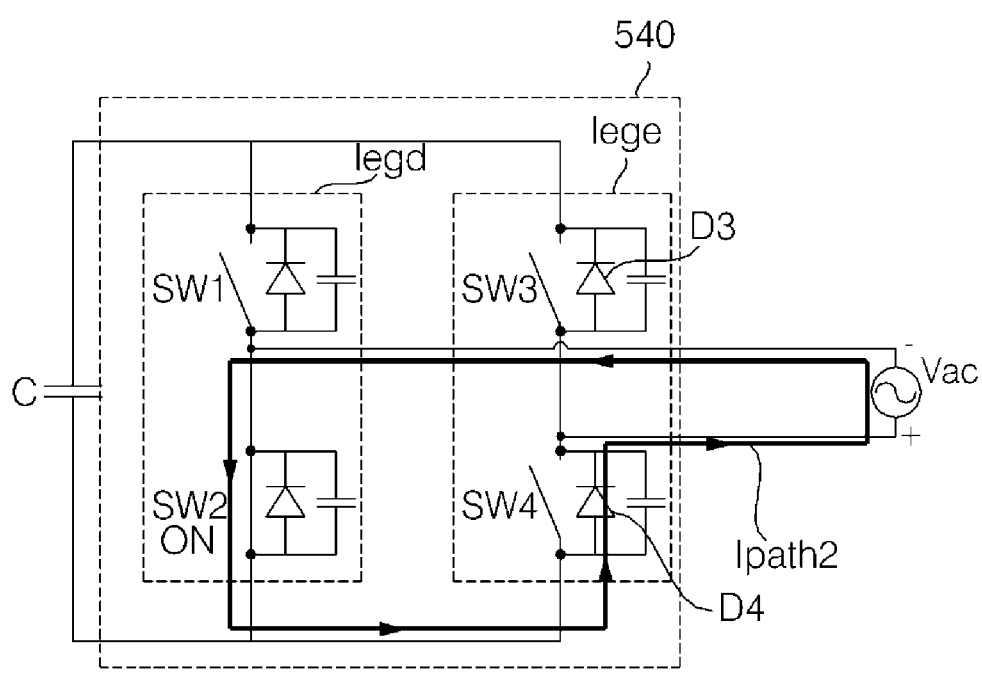

Further, during the period Pdb, the freewheeling mode is performed such that a second current path path2 may be formed by a diode D4 which is connected in parallel to the eighth switching element SW2 and the tenth switching element SW4, as illustrated in FIG. 21C or FIG. 21D.

That is, as illustrated FIG. 21A, if the current output from the inverter 540 is the leading current, the controller 550 may control the second current path path2 to be formed by the diode D3 connected in parallel to the eighth switching element SW2 and the tenth switching element SW4.

Figure 21E:
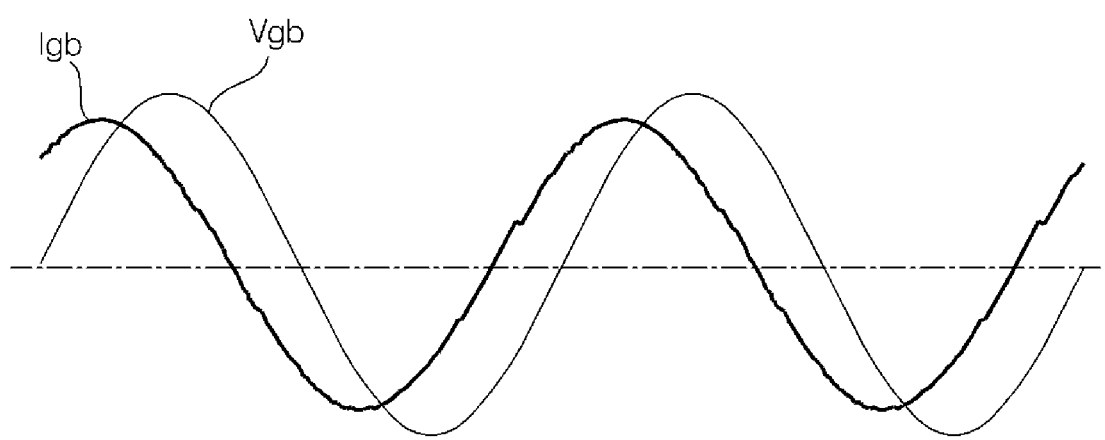

Accordingly, by controlling the power factor while performing asynchronous pulse width modulation control, the controller 550 may improve the current distortion of the output AC power, as illustrated in FIG. 21E. Particularly, the controller 550 may improve the current distortion of the output AC power during the period Pdb.

FIG. 21E illustrates an example in which a peak current is eliminated from a leading current waveform Igb and a voltage waveform Vgb, thereby improving the quality of current and voltage.

Meanwhile, if a current output from the inverter 540 is a leading current, the controller 550 may control the seventh switching element SW1 to be turned on and perform switching at the second time point Tbb. Accordingly, by controlling the power factor while performing asynchronous pulse width modulation control, the controller 550 may improve the current distortion of the output AC power.

Meanwhile, the controller 550 may control a switching frequency of the seventh switching element SW1 or the eighth switching element SW2 to be greater than switching frequencies of the ninth switching element SW3 and the tenth switching element SW4 during the period Pdb between the first time point Tba when the tenth switching element SW4 is turned off and the second time point Tbb when the ninth switching element SW3 is turned on. Accordingly, while performing asynchronous pulse width modulation control, the controller 550 may improve the current distortion of the output AC power.

Meanwhile, the controller 550 may calculate a power factor based on the output voltage from the output voltage detector F and the output current from the output current detector E, thereby controlling the power factor while performing asynchronous pulse width modulation control.

For example, during the periods Pd4b and Pd3b, the controller 550 may adjust the power factor between the voltage and current which are output from the inverter 540.

Specifically, during the period Pd4b, the tenth switching element SW4 is turned on and the ninth switching element SW3 is turned off, and the seventh switching element SW1 and the eighth switching element SW2 are alternately switched.

Meanwhile, during the period Pd3b, the tenth switching element SW4 is turned off and the ninth switching element SW3 is turned on, and the seventh switching element SW1 and the eighth switching element SW2 are alternately switched.

Meanwhile, during the period Pdb, the controller 550 may adjust the power factor between the voltage and current which are output from the inverter 540.

Meanwhile, the controller 550 may vary the switching frequencies of the seventh switching element SW1 and the eighth switching elements SW2 in the first leg legb based on the calculated power factor, thereby controlling the power factor while performing asynchronous pulse width modulation control.

Meanwhile, based on the calculated power factor, the controller 550 may vary a switching timing of the seventh switching element SW1 or the eighth switching element SW2 during the period Pdb between the first time point Tba when the tenth switching element SW4 is turned off and the second time point Tbb when the ninth switching element SW3 is turned on.

For example, as the power factor decreases, the controller 550 may control Tb1, which is the switching timing of the seventh switching element SW1 or the eighth switching element SW2, to be closer to the time point Tbb. Accordingly, by controlling the power factor while performing asynchronous pulse width modulation control, the controller 550 may improve the current distortion of the output AC power.

Figure 22A:
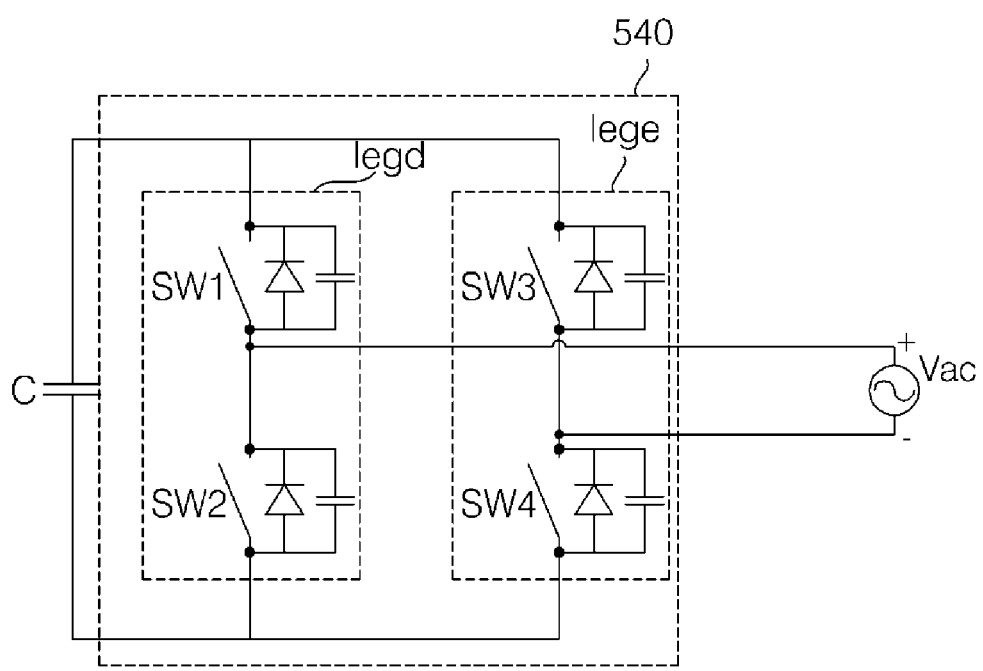
Figure 22B:
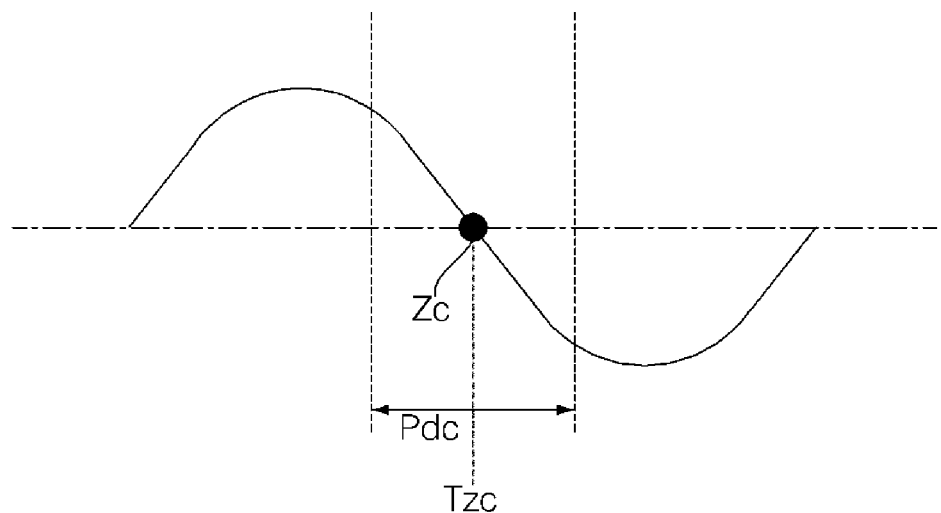
Figure 22C:
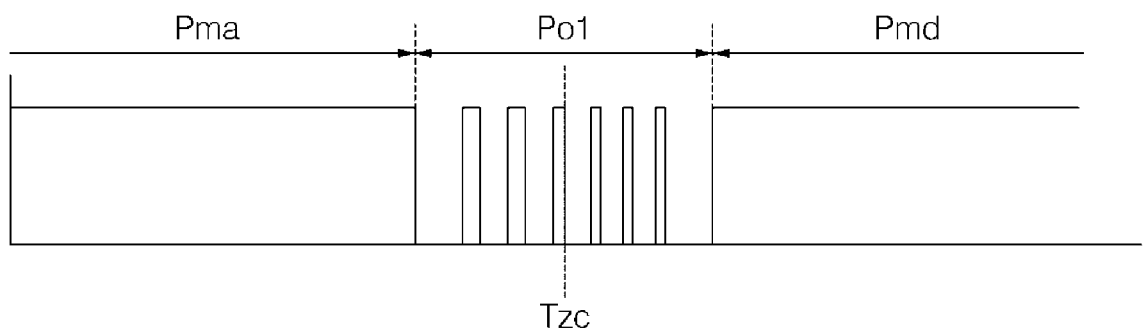

FIGS. 22A to 22C are diagrams illustrating a method of operating a power converting apparatus according to an embodiment of the present disclosure.

Referring to FIG. 22A, the power converting apparatus 500z according to an embodiment of the present disclosure may include the inverter 540, and the current and voltage output from the inverter 540 may be output to an external grid or a load connected to an internal power grid.

FIG. 22B is a diagram illustrating a zero-crossing point Zc of the voltage output from the inverter 540.

The controller 550 may control a power factor during a period Pdc including the zero-crossing point Zc of the voltage output from the inverter, and may control high-speed switching to be performed near the zero-crossing point Zc of the voltage output from the inverter.

Particularly, the controller 550 may perform asynchronous pulse width modulation control in which switching frequencies of the fourth leg legd and the fifth lege of the inverter 540 are different, and during a period between the first time point (Taa of FIG. 20A) when the tenth switching element SW4 is turned off and the second time point Tab when the ninth switching element SW3 is turned on, the controller 550 may control the switching frequency of the fifth leg lege to be greater than the switching frequency of the fifth leg lege before the first time point Taa.

That is, as illustrated in FIG. 22C, during a period Pma before the first time point Taa and a period Pmb after the time point Tab, the controller 550 may perform asynchronous pulse width modulation control in which the switching frequencies of the fourth leg legd and the fifth lege of the inverter 540 are different.

In this case, the switching frequency of the fourth leg legd may be in a range of several kHz to several hundreds of kHz, and the switching frequency of the fifth leg lege may be a system frequency.

Meanwhile, while controlling the power factor during a period Pol including the zero-crossing point Tzc, the controller 550 may control the switching frequency of the fifth leg lege to be higher than the switching frequency during the period Pma before the first time point Taa and the period Pmb after the second time point Tab.

For example, during the period Pol including the zero-crossing point Tzc, the controller 550 may control the switching frequency of the fifth leg lege to be in a range of several kHz to several hundreds of kHz, thereby improving the current distortion of the output AC power.

In addition, during the period Pol including the zero-crossing point Tzc, a bidirectional current path may be formed in a direction of the system, as well as in a direction of the inverter.

FIG. 23 is a diagram referred to in the description of the full bridge switching device 532 operating in a buck mode. Referring to the drawing, (a) of FIG. 23 illustrates a waveform Vdca of a DC terminal voltage which is a voltage at both ends of the DC terminal.

In FIG. 23, (b) illustrates switching control signals SQ1 and SQ4 applied to gates of the first switching element Q1 and the fourth switching element Q4.

In FIG. 23, (c) illustrates switching control signals SQ2 and SQ3 applied to gates of the second switching element Q2 and the third switching element Q3.

In FIG. 23, (d) illustrates a voltage waveform VQ4 and a current waveform IQ4 at both ends of the fourth switching element Q4.

In the buck mode, the first switching element Q1 and the fourth switching element Q4, and the second switching element Q2 and the third switching element Q3, which are included in the full bridge switching device 532, are not alternately turned on, but may partially overlap each other by a phase shift, as illustrated herein.

That is, a phase difference between the first switching element Q1 and the fourth switching element Q4 is not fixed to 180 degrees, but the phase or turn-on timing thereof may be changed by a phase shift.

In the drawing, an example is illustrated in which a phase difference between the first switching element Q1 and the fourth switching element Q4 is DLa.

Meanwhile, in the buck mode, the controller 550 may operate the full bridge switching device 532 with a maximum switching frequency, and may change the phase difference DLa between the switching elements in the full bridge switching device 532.

Meanwhile, if a voltage at both ends of the DC terminal is greater than or equal to a target voltage, and as a difference between the voltage at both ends of the DC terminal and the target voltage increases, the controller 550 may increase the phase difference DLa between the switching elements in the full bridge switching device 532.

Particularly, as the difference between the voltage at both ends of the DC terminal and the target voltage increases, the controller 550 may increase the phase difference DLa between the first switching element Q1 and the fourth switching element Q4.

Meanwhile, in the buck mode, the controller 550 may control a turn-on timing of the fourth and third switching elements Q4 and Q3 in the full bridge switching element 532 to lag behind a turn-on timing of the first and second switching elements Q1 and Q2 in the full bridge switching element 532, thereby varying the DC terminal voltage Vdc.

For example, if the first and fourth switching elements Q1 and Q4 are turned on, a current flows such that a resonant capacitor Cr and a resonant inductor Lr may resonate.

Then, when the fourth switching element Q4 is turned off and the third switching element Q3 is turned on, a current flowing through the transformer 536 drops to ground GRD or zero, and the converter 530 may perform zero current switching (ZCS) with a secondary side switch operating in a discontinuous conduction mode (DCM).

Meanwhile, the switching elements Q9 and Q10 in the half bridge switching device 538 may be switched by being synchronized with the first and second switching elements Q1 and Q2 in the full bridge switching device 532.

Meanwhile, if a voltage at both ends of the DC terminal is greater than or equal to a target voltage, and as a difference between the voltage at both ends of the DC terminal and the target voltage increases, the controller 550 may increase the turn-on timing delay.

Accordingly, the controller 550 may reduce the difference between the voltage at both ends of the DC terminal and the target voltage, and as a result, the DC terminal voltage waveform Vdca with less ripple may be output as illustrated in (a) of FIG. 23.

Meanwhile, zero-voltage turn-on switching 705a and 705b and zero-voltage turn-off switching 705a and 705b are performed by the switching elements in the full bridge switching device 532 at the time points Ta, Tb, etc., thereby allowing high efficiency and high boost power conversion.

Figure 24:
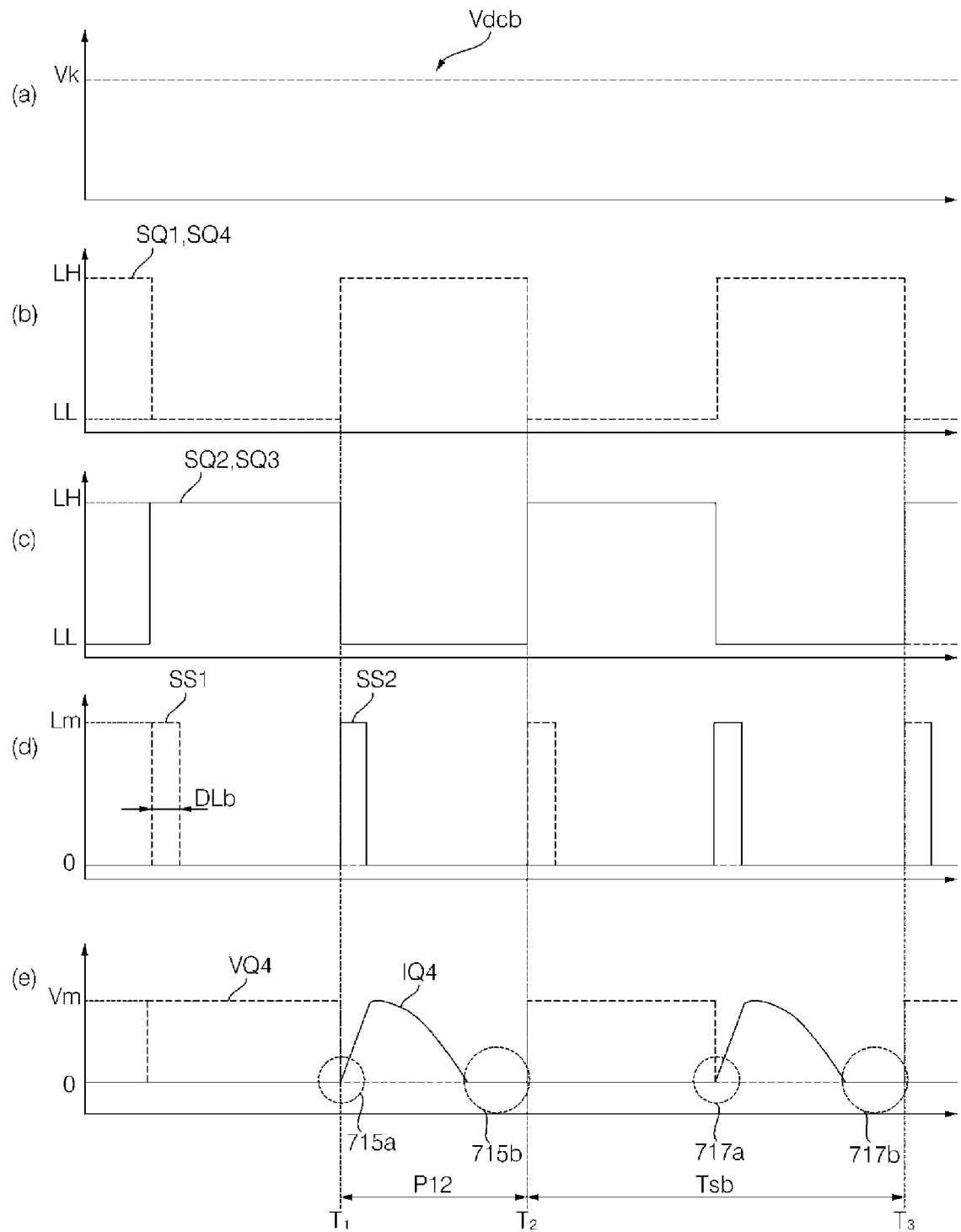
FIG. 24 is a diagram referred to in the description of operation in a boost mode.

FIG. 24 is a diagram referred to in the description of the half bridge switching device 538 operating in a boost mode.

Referring to the drawing, (a) of FIG. 24 illustrates a waveform Vdcb of a DC terminal voltage which is a voltage at both ends of the DC terminal.

In FIG. 24, (b) illustrates switching control signals SQ1 and SQ4 applied to gates of the first switching element Q1 and the fourth switching element Q4.

In FIG. 24, (c) illustrates switching control signals SQ2 and SQ3 applied to gates of the second switching element Q2 and the third switching element Q3.

In FIG. 24, (d) illustrates switching control signals SS1 and SS2 applied to gates of the fifth switching element S1 and the sixth switching element S10 in the half bridge switching device 538.

In FIG. 24, (e) illustrates a voltage waveform VQ4 and a current waveform 104 at both ends of the fourth switching element Q4.

In the boost mode, the controller 550 may control the first switching element Q1 and the fourth switching element Q4, and the second switching element Q2 and the third switching element Q3, which are included in the full bridge switching device 532, to be alternately turned on, as illustrated in (b) and (c) of FIG. 24.

Meanwhile, in the boost mode, the controller 550 may operate the full bridge switching device 532 with a minimum switching frequency, and may change a turn-on duty of the switching elements in the half bridge switching device 538. In (d) of FIG. 24, DLb is illustrated as an example of the turn-on duty.

For example, while the first switching element Q1 and the fourth switching element Q4, and the second switching element Q2 and the third switching element Q3 are alternately turned on, the duties of the fifth switching element S1 and the tenth switching element S2 in the half bridge switching device 538 are changed such that the fifth and tenth switching elements S1 and S2 are turned on.

Meanwhile, while the fifth switching element S1 and the tenth switching element S2 in the half bridge switching device 538 are turned on, the resonant inductor Lr is charged with energy, thereby boosting the voltage.

Meanwhile, if a voltage at both ends of the DC terminal is lower than a target voltage, and as a difference between the voltage at both ends of the DC terminal and the target voltage increases, the controller 550 may increase the turn-on duty DLb of the fifth switching element S1 and the tenth switching element S2 in the half bridge switching device 538.

Meanwhile, if a voltage at both ends of the DC terminal is lower than a target voltage, and as a difference between the voltage at both ends of the DC terminal and the target voltage increases, the controller 550 may increase the turn-on duty of the switching elements in the half bridge switching device 538.

Accordingly, the controller 550 may reduce the difference between the voltage at both ends of the DC terminal and the target voltage, and as a result, the DC terminal voltage waveform Vdca with less ripple may be output as illustrated in (a) of FIG. 24.

Meanwhile, zero-voltage turn-on switching 715a and 715b and zero-voltage turn-off switching 715a and 715b are performed by the switching elements in the full bridge switching device 532 at time points Ta, Tb, etc., thereby allowing high efficiency and high boost power conversion.

The power converting apparatus and the photovoltaic module including the same according to the present disclosure are not limited to the configuration and method of the embodiments described above, but the embodiments may be configured by selectively combining all or part of each embodiment so that various modifications can be made.

While the present disclosure has been particularly shown and described with reference to preferred embodiments thereof, it will be understood by those skilled in the art that the disclosure is not limited to those exemplary present embodiments and various changes in form and details may be made therein without departing from the scope and spirit of the invention as defined by the appended claims and should not be individually understood from the technical spirit or prospect of the present disclosure.

What is claimed is:

1. A power converting apparatus comprising:
    an inverter configured to convert input DC power into AC power by a switching operation;
    an output voltage detector configured to detect an output voltage of the inverter; and
    a controller configured to control the inverter,
    wherein the controller is configured to:
        perform proportional resonant control based on the output voltage, and
        output a switching control signal to the inverter based on the proportional resonant control, and
    wherein:
        the controller is configured to, in response to a nonlinear load being connected to an output terminal of the inverter, (i) perform the proportional resonant control based on the output voltage and (ii) output the switching control signal to the inverter based on the proportional resonant control, and
        the controller is configured to, in response to a linear load being connected to the output terminal of the inverter, not perform the proportional resonant control.

2. The apparatus of claim 1, wherein by performing the proportional resonant control based on the output voltage, the controller is configured to calculate a harmonic compensation value, and output the switching control signal to the inverter based on the calculated harmonic compensation value.

3. The apparatus of claim 1, wherein the controller is configured to extract harmonics from the output voltage, calculate a harmonic compensation value based on the extracted harmonics, and output the switching control signal to the inverter based on the calculated harmonic compensation value.

4. The apparatus of claim 3, wherein the controller is configured to extract harmonics from the output voltage, perform the proportional resonant control by using respective proportional resonant controllers for each order of the harmonics, and output the switching control signal to the inverter based on the calculated harmonic compensation value.

5. The apparatus of claim 4, wherein the controller comprises a band pass filter that is located on a front end of the respective proportional resonant controllers and that is configured to pass frequency bands of each order of harmonics.

6. The apparatus of claim 4, wherein the controller is configured to, based on an order of the harmonics being less than or equal to a reference order, control a gain of a corresponding proportional resonant controller to be infinite.

7. The apparatus of claim 4, wherein the controller is configured to, based on an order of the harmonics being less than or equal to a reference order, (i) calculate a harmonic compensation value for a harmonic component in a corresponding proportional resonant controller being zero and (ii) output the switching control signal to the inverter based on the calculated harmonic compensation value.

8. The apparatus of claim 1, wherein in response to harmonic components of each harmonic order being generated in the output voltage during a first period, the controller is configured to perform the proportional resonant control and output the switching control signal based on the proportional resonant control, and prevent each order harmonic component from being generated in the output voltage during a second period after the first period.

9. The apparatus of claim 8, wherein in response to the harmonic components of each harmonic order not being generated in the output voltage during the first period, the controller does not perform the proportional resonant control.

10. The apparatus of claim 1, wherein the controller comprises a repetitive controller configured to extract harmonics from the output voltage and to perform repetitive control on the harmonics,
    wherein the controller is configured to output the switching control signal to the inverter based on a harmonic compensation value from the repetitive controller.

11. The apparatus of claim 10, wherein the repetitive controller corresponds to summation of a plurality of resonant controllers.

12. The apparatus of claim 1, further comprising a converter configured to change a level of the input DC power and to output the DC power,
    wherein the converter comprises:
        a full bridge switching device configured to convert the input DC power, and including a first leg including a first switching element and a second switching element connected in series to each other, and a second leg including a third switching element and a fourth switching element connected in series to each other;
        a transformer having an input side connected to an output terminal of the full bridge switching device; and a half bridge switching device electrically connected to an output side of the transformer, and including third leg including a fifth switching element and a sixth switching element connected in series to each other.

13. The apparatus of claim 12, wherein the converter further comprises:
 a resonant inductor connected between the transformer and the half bridge switching device; and
 a first capacitor and a second capacitor connected in series to each other and connected to a DC terminal corresponding to an output terminal of the half bridge switching device.

14. The apparatus of claim 12, wherein the inverter comprises a fourth leg including seventh and eighth switching elements connected in series to each other and connected to a DC terminal corresponding to the output terminal of the half bridge switching device, and a fifth leg including ninth and tenth switching elements connected in series to each other, and converts a voltage at the DC terminal to output an AC voltage,
 wherein:
  the inverter is configured to, based on the seventh switching element and the tenth switching element being turned on during a first period, convert a DC terminal voltage into a positive voltage and output the converted voltage, and
  the inverter is configured to, based on the eighth switching element and the ninth switching element being turned on during a second period after the first period, convert the DC terminal voltage into a negative voltage and output the converted voltage.

15. A power converting apparatus comprising:
 an inverter configured to convert input DC power into AC power by a switching operation;
 an output voltage detector configured to detect an output voltage of the inverter;
 a controller configured to control the inverter; and
 a converter configured to (i) change a level of the input DC power and (ii) output the DC power,
 wherein the controller is configured to:
  perform proportional resonant control based on the output voltage, and
  output a switching control signal to the inverter based on the proportional resonant control,
 wherein the controller is configured to, in response to the output voltage output from the inverter increasing to a level outside a first range, restart the inverter after turning off the inverter, and
 wherein the controller is configured to, when restarting the inverter, control the inverter to operate based on a second gain greater than a first gain, the first gain being used before the inverter is turned off.

16. A power converting apparatus comprising:
 an inverter configured to convert input DC power into AC power by a switching operation;
 an output voltage detector configured to detect an output voltage of the inverter; and
 a controller configured to control the inverter,
 wherein the controller is configured to:
  in response to harmonic components of each harmonic order being generated in the output voltage during a first period, perform proportional resonant control and output a switching control signal based on the proportional resonant control, and
  prevent each order harmonic component from being generated in the output voltage during a second period after the first period,
 wherein the controller is configured to, in response to a nonlinear load being connected to an output terminal of the inverter during the first period, (i) perform the proportional resonant control based on the output voltage and (ii) output the switching control signal to the inverter based on the proportional resonant control.

17. A photovoltaic module comprising a power converting apparatus, the power converting apparatus comprising:
 an inverter configured to convert input DC power into AC power by a switching operation;
 an output voltage detector configured to detect an output voltage of the inverter; and
 a controller configured to control the inverter,
 wherein the controller is configured to:
  perform proportional resonant control based on the output voltage, and
  output a switching control signal to the inverter based on the proportional resonant control, and
 wherein:
  the controller is configured to, in response to a nonlinear load being connected to an output terminal of the inverter, (i) perform the proportional resonant control based on the output voltage and (ii) output the switching control signal to the inverter based on the proportional resonant control, and
  the controller is configured to, in response to a linear load being connected to the output terminal of the inverter, not perform the proportional resonant control.

* * * * *